(12) United States Patent
Gravelle

(10) Patent No.: US 12,503,311 B2
(45) Date of Patent: Dec. 23, 2025

(54) MANUFACTURING SYSTEM WITH AN INTERCONNECTED STORAGE STRUCTURE AND MANUFACTURING CELLS SHARING A COMMON ROBOTIC FLEET

(71) Applicant: LAFAYETTE SYSTEMS CANADA ULC, Calgary (CA)

(72) Inventor: Scott Gravelle, Calgary (CA)

(73) Assignee: LAFAYETTE SYSTEMS CANADA ULC, Calgary (CA)

( * ) Notice: Subject to any disclaimer, the term of this patent is extended or adjusted under 35 U.S.C. 154(b) by 783 days.

(21) Appl. No.: 17/618,868

(22) PCT Filed: Jun. 11, 2020

(86) PCT No.: PCT/IB2020/055479
§ 371 (c)(1),
(2) Date: Dec. 13, 2021

(87) PCT Pub. No.: WO2020/250166
PCT Pub. Date: Dec. 17, 2020

(65) Prior Publication Data
US 2022/0371825 A1    Nov. 24, 2022

Related U.S. Application Data

(60) Provisional application No. 62/860,024, filed on Jun. 11, 2019.

(51) Int. Cl.
*B65G 1/137* (2006.01)
*B65G 1/04* (2006.01)
*G05D 1/00* (2024.01)

(52) U.S. Cl.
CPC ......... *B65G 1/1373* (2013.01); *B65G 1/0464* (2013.01); *B65G 1/0478* (2013.01); *G05D 1/0291* (2013.01)

(58) Field of Classification Search
CPC .. B65G 1/1373; B65G 1/0464; B65G 1/0478; B65G 1/04; G05B 19/4182;
(Continued)

(56) References Cited

U.S. PATENT DOCUMENTS 1,465,135 A    8/1923   Kehr
4,088,232 A    5/1978   Lilly
(Continued)

FOREIGN PATENT DOCUMENTS

AU    2020231623 A1    7/2021
AU    2020234099 A1    7/2021
(Continued)

OTHER PUBLICATIONS

Aized, "Materials handling in flexible manufacturing systems", Future Manufacturing Systems, Aug. 17, 2010, pp. 121-136.
(Continued)

*Primary Examiner* — Jacob S. Scott
*Assistant Examiner* — Erin Morris
(74) *Attorney, Agent, or Firm* — Knobbe, Martens, Olson & Bear, LLP

(57) ABSTRACT

A manufacturing system including an automated storage and retrieval system (ASRS) structure with a three-dimensional array of storage locations distributed throughout a two-dimensional footprint of the ASRS structure at multiple storage levels; workpieces stored within the storage locations of the ASRS structure; robotic storage/retrieval vehicles (RSRVs) navigable within the ASRS structure in three dimensions to access the storage locations, and multiple manufacturing cells positioned outside the ASRS structure, is provided. The manufacturing system includes a track structure attached to the ASRS structure and defining one or more travel paths traversable by the RSRVs from the ASRS structure. The same fleet of RSRVs that is navigable within (Continued)

the ASRS structure is operable to deliver the workpieces to the manufacturing cells. One or more of the manufacturing cells are positioned along the track structure, thereby receiving convenient access to the workpieces along with associated tool pieces and workpiece supports for manufacturing goods.

53 Claims, 37 Drawing Sheets

(58) Field of Classification Search
CPC ........... G05B 2219/31266; G05B 2219/31268; G05B 2219/31269; G05B 2219/40013; G05B 2219/45045; G05B 19/4189; B25J 9/0084; B25H 3/00
See application file for complete search history.

(56) References Cited

U.S. PATENT DOCUMENTS

| | | | |
|---|---|---|---|
| 4,428,708 A | 1/1984 | Burt | |
| 4,750,633 A | 6/1988 | Schäfer | |
| 4,815,190 A | 3/1989 | Haba et al. | |
| 4,817,071 A | 3/1989 | Carlson et al. | |
| 5,024,571 A | 6/1991 | Shahar et al. | |
| 5,174,707 A | 12/1992 | Suekane et al. | |
| 5,190,427 A | 3/1993 | Lai | |
| 5,272,805 A | 12/1993 | Akeel et al. | |
| 5,314,285 A | 5/1994 | Lai | |
| 5,374,231 A | 12/1994 | Obrist et al. | |
| 5,595,263 A | 1/1997 | Pignataro | |
| 6,148,291 A | 11/2000 | Radican | |
| 6,236,901 B1 | 5/2001 | Goss et al. | |
| 6,665,582 B1 | 12/2003 | Moritz et al. | |
| 6,711,798 B2 | 3/2004 | Sanders et al. | |
| 6,853,875 B1 | 2/2005 | Moritz et al. | |
| 6,974,928 B2 | 12/2005 | Bloom | |
| 7,168,548 B2 * | 1/2007 | Naumann | B23Q 7/1426 |
| | | | 198/346.2 |
| 7,209,887 B2 | 4/2007 | Yen et al. | |
| 7,267,518 B2 | 9/2007 | Kinzer | |
| 7,289,969 B1 | 10/2007 | Ballenger et al. | |
| 7,308,330 B2 | 12/2007 | Jones | |
| 7,331,471 B1 | 2/2008 | Shakes et al. | |
| 7,381,022 B1 | 6/2008 | King | |
| 7,591,630 B2 | 9/2009 | Lert | |
| 7,596,508 B1 | 9/2009 | McGuffie et al. | |
| 7,669,763 B2 | 3/2010 | Ernesti et al. | |
| 7,686,171 B1 | 3/2010 | Shakes et al. | |
| 7,711,657 B1 | 5/2010 | Huberman et al. | |
| 7,770,792 B2 | 8/2010 | Bruns et al. | |
| 7,861,844 B2 | 1/2011 | Hayduchok et al. | |
| 7,931,431 B2 | 4/2011 | Benedict et al. | |
| 7,963,384 B2 | 6/2011 | Lafontaine | |
| 8,090,626 B1 | 1/2012 | Wijaya et al. | |
| 8,104,601 B2 | 1/2012 | Hayduchok et al. | |
| 8,104,681 B2 | 1/2012 | Eisenson | |
| 8,276,740 B2 | 10/2012 | Hayduchok et al. | |
| 8,306,650 B1 | 11/2012 | Antony et al. | |
| 8,527,373 B1 | 9/2013 | Ricci et al. | |
| 8,533,053 B2 | 9/2013 | Brown et al. | |
| 8,622,194 B2 | 1/2014 | Dewitt et al. | |
| 8,628,289 B1 | 1/2014 | Benedict et al. | |
| 8,682,473 B1 | 3/2014 | Ramey et al. | |
| 8,731,708 B2 | 5/2014 | Shakes et al. | |
| 8,896,442 B1 | 11/2014 | Khan et al. | |
| 8,928,481 B2 | 1/2015 | Abe | |
| 8,965,560 B2 | 2/2015 | Franz et al. | |
| 8,965,562 B1 | 2/2015 | Wurman et al. | |
| 8,972,045 B1 | 3/2015 | Mountz et al. | |
| 8,983,647 B1 | 3/2015 | Dwarakanath et al. | |
| 8,996,157 B2 | 3/2015 | Collin | |
| 9,009,072 B2 | 4/2015 | Mountz et al. | |
| 9,010,517 B2 | 4/2015 | Hayduchok et al. | |
| 9,020,632 B2 | 4/2015 | Naylor | |
| 9,073,736 B1 | 7/2015 | Hussain et al. | |
| 9,120,621 B1 | 9/2015 | Curlander et al. | |
| 9,122,566 B2 | 9/2015 | Bastian, II et al. | |
| 9,122,586 B2 | 9/2015 | Ma et al. | |
| 9,139,363 B2 | 9/2015 | Lert | |
| 9,187,244 B2 | 11/2015 | Toebes et al. | |
| 9,202,194 B1 | 12/2015 | Mistry | |
| 9,218,585 B2 | 12/2015 | Gupta et al. | |
| 9,309,056 B2 | 4/2016 | Lafontaine | |
| 9,315,320 B2 | 4/2016 | Kawano | |
| 9,422,108 B2 | 8/2016 | Hognaland | |
| 9,533,828 B1 | 1/2017 | Dwarakanath et al. | |
| 9,551,987 B1 | 1/2017 | Mountz et al. | |
| 9,580,248 B2 | 2/2017 | Hasman et al. | |
| 9,598,239 B2 | 3/2017 | Lert | |
| 9,600,798 B2 | 3/2017 | Battles et al. | |
| 9,604,781 B2 | 3/2017 | Stevens et al. | |
| 9,682,822 B2 | 6/2017 | Lindbo et al. | |
| 9,687,883 B2 | 6/2017 | Hayduchok et al. | |
| 9,725,242 B2 | 8/2017 | Issing et al. | |
| 9,733,646 B1 | 8/2017 | Nusser et al. | |
| 9,792,577 B2 | 10/2017 | Mountz et al. | |
| 9,796,080 B2 | 10/2017 | Lindbo et al. | |
| 9,796,527 B1 | 10/2017 | Kaukl et al. | |
| 9,802,759 B2 | 10/2017 | Lert, Jr. | |
| 9,815,625 B2 | 11/2017 | Dewitt et al. | |
| 9,821,960 B2 | 11/2017 | Issing | |
| 9,845,208 B2 | 12/2017 | Lindbo | |
| 9,884,721 B2 | 2/2018 | Suemitsu et al. | |
| 9,932,170 B2 | 4/2018 | Munholland | |
| 10,000,338 B2 | 6/2018 | Lert | |
| 10,018,397 B2 | 7/2018 | Hognaland et al. | |
| 10,040,632 B2 | 8/2018 | Lert | |
| 10,051,599 B2 | 8/2018 | Lowe et al. | |
| 10,052,661 B2 | 8/2018 | Hayduchok et al. | |
| 10,062,047 B2 | 8/2018 | Kadaba et al. | |
| 10,086,999 B2 | 10/2018 | Stadie et al. | |
| 10,106,323 B2 | 10/2018 | Terrill et al. | |
| 10,189,641 B2 | 1/2019 | Hognaland | |
| 10,202,240 B2 | 2/2019 | De Angelis et al. | |
| 10,345,818 B2 | 7/2019 | Sibley | |
| 10,427,872 B2 | 10/2019 | Li | |
| 10,430,756 B2 | 10/2019 | Greenberg | |
| 10,549,915 B1 | 2/2020 | Theobald | |
| 10,689,195 B2 | 6/2020 | Collin et al. | |
| 10,745,164 B2 | 8/2020 | Prahlad et al. | |
| 2002/0121521 A1 | 9/2002 | Beal et al. | |
| 2003/0208902 A1 | 11/2003 | Sanders et al. | |
| 2003/0212602 A1 | 11/2003 | Schaller | |
| 2003/0228196 A1 | 12/2003 | Satchwell et al. | |
| 2004/0010337 A1 | 1/2004 | Mountz | |
| 2004/0153379 A1 | 8/2004 | Joyce et al. | |
| 2005/0043850 A1 | 2/2005 | Stevens et al. | |
| 2005/0047895 A1 | 3/2005 | Lert, Jr. | |
| 2005/0055260 A1 | 3/2005 | Yamamoto | |
| 2005/0209731 A1 | 9/2005 | Penkar et al. | |
| 2005/0241129 A1 | 11/2005 | Naumann et al. | |
| 2006/0038010 A1 | 2/2006 | Lucas | |
| 2006/0085235 A1 | 4/2006 | Nguyen et al. | |
| 2006/0085296 A1 | 4/2006 | Strickland | |
| 2006/0111989 A1 | 5/2006 | Church et al. | |
| 2006/0158043 A1 | 7/2006 | Brouwer et al. | |
| 2006/0228196 A1 | 10/2006 | Li | |
| 2007/0059132 A1 | 3/2007 | Akamatsu | |
| 2007/0188322 A1 | 8/2007 | English et al. | |
| 2008/0131241 A1 | 6/2008 | King | |
| 2008/0301068 A1 | 12/2008 | Fager et al. | |
| 2008/0314981 A1 | 12/2008 | Eisenson | |
| 2009/0185884 A1 | 7/2009 | Wurman et al. | |
| 2010/0138037 A1 | 6/2010 | Adelberg et al. | |
| 2011/0238207 A1 | 9/2011 | Bastian et al. | |
| 2012/0030070 A1 | 2/2012 | Keller et al. | |
| 2012/0118845 A1 | 5/2012 | Wada | |
| 2012/0197431 A1 | 8/2012 | Toebes et al. | |
| 2012/0233028 A1 | 9/2012 | Brown et al. | |
| 2012/0272500 A1 | 11/2012 | Reuteler | |
| 2012/0290125 A1 | 11/2012 | Perry | |
| 2012/0321423 A1 | 12/2012 | Macknight et al. | |

(56) References Cited

U.S. PATENT DOCUMENTS

| | | |
|---|---|---|
| 2013/0080454 A1 | 3/2013 | Raghunathan et al. |
| 2013/0181586 A1 | 7/2013 | Hognaland |
| 2013/0245810 A1 | 9/2013 | Sullivan et al. |
| 2013/0325159 A1 | 12/2013 | Kilibarda et al. |
| 2013/0343843 A1 | 12/2013 | Venkataraman et al. |
| 2013/0343844 A1* | 12/2013 | Fosnight ............ H01L 21/67733 414/281 |
| 2014/0100715 A1 | 4/2014 | Mountz et al. |
| 2014/0100998 A1 | 4/2014 | Mountz et al. |
| 2014/0100999 A1 | 4/2014 | Mountz et al. |
| 2014/0271069 A1 | 9/2014 | Salichs et al. |
| 2014/0277693 A1 | 9/2014 | Naylor |
| 2014/0279294 A1 | 9/2014 | Field-Darragh et al. |
| 2015/0046364 A1 | 2/2015 | Kriss |
| 2015/0052019 A1 | 2/2015 | Field-Darragh et al. |
| 2015/0071743 A1 | 3/2015 | Lert |
| 2015/0088302 A1 | 3/2015 | Mountz et al. |
| 2015/0127143 A1 | 5/2015 | Lindbo et al. |
| 2015/0151912 A1 | 6/2015 | Mountz et al. |
| 2015/0225187 A1 | 8/2015 | Razumov |
| 2015/0291357 A1 | 10/2015 | Razumov |
| 2016/0042315 A1 | 2/2016 | Field-Darragh et al. |
| 2016/0129587 A1 | 5/2016 | Lindbo et al. |
| 2016/0130086 A1 | 5/2016 | Yamashita |
| 2016/0137418 A1 | 5/2016 | Traversa et al. |
| 2016/0140488 A1 | 5/2016 | Lindbo |
| 2016/0167888 A1 | 6/2016 | Messina |
| 2016/0194151 A1 | 7/2016 | Lindbo et al. |
| 2016/0283898 A1 | 9/2016 | Reuther et al. |
| 2016/0347545 A1 | 12/2016 | Lindbo et al. |
| 2016/0355337 A1 | 12/2016 | Lert et al. |
| 2016/0355339 A1 | 12/2016 | Peng |
| 2017/0086011 A1 | 3/2017 | Neves et al. |
| 2017/0129703 A1 | 5/2017 | Lindbo et al. |
| 2017/0140327 A1 | 5/2017 | Lindbo |
| 2017/0152106 A1 | 6/2017 | Hofmann |
| 2017/0166400 A1 | 6/2017 | Hofmann |
| 2017/0217681 A1 | 8/2017 | Tai |
| 2017/0256428 A1 | 9/2017 | Kawamura |
| 2017/0305668 A1 | 10/2017 | Bestic et al. |
| 2017/0313514 A1 | 11/2017 | Lert et al. |
| 2017/0323250 A1 | 11/2017 | Lindbo et al. |
| 2017/0369246 A1 | 12/2017 | Dewitt et al. |
| 2018/0025460 A1 | 1/2018 | Watanabe et al. |
| 2018/0036845 A1 | 2/2018 | Thorwarth et al. |
| 2018/0037412 A1 | 2/2018 | Lynch et al. |
| 2018/0039282 A1 | 2/2018 | Gupta et al. |
| 2018/0053148 A1 | 2/2018 | Nelson, Jr. |
| 2018/0093828 A1 | 4/2018 | Lindbo et al. |
| 2018/0127212 A1 | 5/2018 | Jarvis et al. |
| 2018/0128532 A1 | 5/2018 | Hognaland |
| 2018/0134492 A1 | 5/2018 | Lert |
| 2018/0148259 A1 | 5/2018 | Gravelle et al. |
| 2018/0150793 A1 | 5/2018 | Lert et al. |
| 2018/0162639 A1 | 6/2018 | Ingram-Tedd et al. |
| 2018/0170650 A1 | 6/2018 | Lindbo et al. |
| 2018/0194556 A1 | 7/2018 | Lert et al. |
| 2018/0215543 A1 | 8/2018 | Lert et al. |
| 2018/0216342 A1 | 8/2018 | Lert |
| 2018/0218320 A1 | 8/2018 | Lee et al. |
| 2018/0218469 A1 | 8/2018 | Lert et al. |
| 2018/0247257 A1 | 8/2018 | Lert et al. |
| 2018/0257863 A1 | 9/2018 | Lert |
| 2018/0290831 A1 | 10/2018 | Wolf et al. |
| 2018/0305122 A1 | 10/2018 | Moulin et al. |
| 2018/0305123 A1 | 10/2018 | Lert et al. |
| 2018/0319590 A1 | 11/2018 | Lindbo et al. |
| 2018/0322444 A1 | 11/2018 | Todeschini |
| 2018/0335502 A1 | 11/2018 | Lowe et al. |
| 2018/0341908 A1 | 11/2018 | Lert et al. |
| 2018/0346243 A1 | 12/2018 | Lindbo et al. |
| 2019/0027591 A1 | 1/2019 | Naito |
| 2019/0168964 A1 | 6/2019 | Lert |
| 2019/0176323 A1 | 6/2019 | Coady et al. |
| 2019/0194971 A1 | 6/2019 | Shinnaka et al. |
| 2019/0198370 A1 | 6/2019 | Abe et al. |
| 2019/0233213 A1 | 8/2019 | Phan-Quiroga et al. |
| 2020/0024114 A1 | 1/2020 | Uchimura et al. |
| 2020/0031576 A1 | 1/2020 | Lert et al. |
| 2020/0071076 A1 | 3/2020 | Fosnight et al. |
| 2020/0302391 A1 | 9/2020 | Li et al. |
| 2021/0253348 A1* | 8/2021 | Austrheim ........... B65G 1/1378 |
| 2021/0261336 A1 | 8/2021 | Ingram-Tedd et al. |
| 2021/0395012 A1 | 12/2021 | Liu et al. |

FOREIGN PATENT DOCUMENTS

| | | | |
|---|---|---|---|
| CA | 2077165 C | 4/1993 | |
| CA | 2673932 A1 | 7/2008 | |
| CA | 2795022 A1 | 10/2011 | |
| CA | 2872496 A1 | 10/2013 | |
| CA | 2885984 A1 | 5/2014 | |
| CA | 2890843 A1 | 6/2014 | |
| CA | 2846273 A1 | 9/2014 | |
| CA | 2920361 A1 | 12/2014 | |
| CA | 2942445 A1 | 9/2015 | |
| CA | 2944332 A1 | 10/2015 | |
| CA | 2953028 A1 | 12/2015 | |
| CN | 1452105 A | 10/2003 | |
| CN | 204612307 U | 9/2015 | |
| CN | 106029529 A | 10/2016 | |
| CN | 106185152 A | 12/2016 | |
| CN | 107466203 A | 12/2017 | |
| CN | 107922115 A * | 4/2018 | ............... B65G 1/04 |
| CN | 108349652 A | 7/2018 | |
| CN | 108430890 A | 8/2018 | |
| CN | 108502431 A | 9/2018 | |
| CN | 110065750 A | 7/2019 | |
| CN | 110356752 A | 10/2019 | |
| CN | 111661538 A * | 9/2020 | ............... B65G 1/04 |
| DE | 10011205 A1 | 9/2001 | |
| DE | 102009017241 A1 | 10/2010 | |
| DE | 102017222801 A1 | 6/2019 | |
| EP | 0071883 A1 | 12/1986 | |
| EP | 0262526 A2 | 4/1988 | |
| EP | 0599032 A1 | 1/1994 | |
| EP | 1452462 A2 | 9/2004 | |
| EP | 2121204 A2 | 11/2009 | |
| EP | 3056453 A1 | 8/2016 | |
| EP | 3385893 A1 | 10/2018 | |
| EP | 3166876 B1 | 11/2018 | |
| FR | 2614609 A1 | 11/1988 | |
| GB | 1432224 A | 4/1973 | |
| GB | 2419977 A | 10/2006 | |
| GB | 2461722 A | 1/2010 | |
| GB | 2542651 A | 3/2017 | |
| GB | 2544348 A | 5/2017 | |
| GB | 2544648 A * | 5/2017 | .......... B25J 15/0616 |
| GB | 2544649 A | 5/2017 | |
| GB | 2544650 A | 5/2017 | |
| GB | 2565883 A | 2/2019 | |
| JP | S56-155362 A | 12/1981 | |
| JP | S61-256799 A | 11/1986 | |
| JP | H01-133802 A | 5/1989 | |
| JP | H03-143802 A | 6/1991 | |
| JP | H05-224606 A | 9/1993 | |
| JP | H06-20930 B2 | 3/1994 | |
| JP | H06-305353 A | 11/1994 | |
| JP | 2000-327111 A | 11/2000 | |
| JP | 2002-032449 A | 1/2002 | |
| JP | 2002-056308 A | 2/2002 | |
| JP | 3271509 B2 | 4/2002 | |
| JP | 2002-269417 A | 9/2002 | |
| JP | 2003-341810 A | 12/2003 | |
| JP | 2004-323169 A | 11/2004 | |
| JP | 2005-177905 A | 7/2005 | |
| JP | 2005-519828 A | 7/2005 | |
| JP | 2006-176304 A | 7/2006 | |
| JP | 2007-246226 A | 9/2007 | |
| JP | 2010-235212 A | 10/2010 | |
| JP | 2013-256371 A | 12/2013 | |
| JP | 2014-503924 A | 2/2014 | |
| JP | 5562646 B2 | 7/2014 | |
| JP | 2015-087964 A | 5/2015 | |

(56) References Cited

FOREIGN PATENT DOCUMENTS

| | | | |
|---|---|---|---|
| JP | 2015-518591 A | 7/2015 | |
| JP | 2015-157687 A | 9/2015 | |
| JP | 2015-199563 A | 11/2015 | |
| JP | 2016-055963 A | 4/2016 | |
| JP | 2016-525053 A | 8/2016 | |
| JP | 2016-525490 A | 8/2016 | |
| JP | 2016-533999 A | 11/2016 | |
| JP | 2017-512166 A | 5/2017 | |
| JP | 2017-206352 A | 11/2017 | |
| JP | 2018-502388 A | 1/2018 | |
| JP | 6271509 B2 | 1/2018 | |
| JP | 2018-512076 A | 5/2018 | |
| JP | 2018-517646 A | 7/2018 | |
| JP | 2018-526701 A | 9/2018 | |
| JP | 2019-008678 A | 1/2019 | |
| KR | 10-1289249 B1 | 1/2013 | |
| KR | 101489337 B1 | 2/2015 | |
| KR | 10-2016-0040690 A | 4/2016 | |
| KR | 10-2018-0063315 A | 6/2018 | |
| KR | 10-2018-0081740 A | 7/2018 | |
| NO | 20181005 A1 | 12/2019 | |
| TW | 201328951 A | 7/2013 | |
| WO | WO 2000/068859 A2 | 5/2000 | |
| WO | WO 2003/060752 A1 | 1/2003 | |
| WO | WO 2003/079153 A2 | 9/2003 | |
| WO | WO 2007/011814 A2 | 1/2007 | |
| WO | WO 2007/068406 A1 | 6/2007 | |
| WO | WO 2011/150131 A1 | 12/2011 | |
| WO | WO 2012/083060 A1 | 6/2012 | |
| WO | WO 2012/122090 A1 | 9/2012 | |
| WO | WO 2013/142106 A1 | 9/2013 | |
| WO | WO 2013/155107 A1 | 10/2013 | |
| WO | WO 2014/022791 A1 | 2/2014 | |
| WO | WO 2014/055716 A1 | 4/2014 | |
| WO | WO 2014/090684 A1 | 6/2014 | |
| WO | WO 2014/203126 A1 | 12/2014 | |
| WO | WO-2015019055 A1 * | 2/2015 | ............. B61B 13/00 |
| WO | WO 2015/042587 A2 | 3/2015 | |
| WO | WO 2015/052830 A1 | 4/2015 | |
| WO | WO 2015/124610 A1 | 8/2015 | |
| WO | WO 2015/134529 A1 | 9/2015 | |
| WO | WO 2015/197696 A1 | 12/2015 | |
| WO | WO-2015185628 A2 * | 12/2015 | ............. B60L 58/12 |
| WO | WO 2016/183541 A1 | 5/2016 | |
| WO | WO 2016/100045 A1 | 6/2016 | |
| WO | WO 2016/112037 A1 | 7/2016 | |
| WO | WO 2016/130222 A1 | 8/2016 | |
| WO | WO 2016/166323 A1 | 10/2016 | |
| WO | WO 2016/172253 A1 | 10/2016 | |
| WO | WO 2016/173445 A1 | 11/2016 | |
| WO | WO-2016172793 A1 * | 11/2016 | ............. B65G 1/04 |
| WO | WO 2016/196815 A1 | 12/2016 | |
| WO | WO 2017/097724 A1 | 6/2017 | |
| WO | WO 2017/108383 A1 | 6/2017 | |
| WO | WO 2017/121512 A1 | 7/2017 | |
| WO | WO 2017/197121 A1 | 11/2017 | |
| WO | WO 2017/211596 A1 | 12/2017 | |
| WO | WO 2017/211640 A1 | 12/2017 | |
| WO | WO 2018/033426 A1 | 2/2018 | |
| WO | WO 2018/069282 A1 | 4/2018 | |
| WO | WO 2018/072924 A1 | 4/2018 | |
| WO | WO 2018/094286 A1 | 5/2018 | |
| WO | WO 2018/102444 A1 | 6/2018 | |
| WO | WO 2018/132500 A1 | 7/2018 | |
| WO | WO 2018/144622 A1 | 8/2018 | |
| WO | WO 2018/144625 A1 | 8/2018 | |
| WO | WO 2018/144626 A1 | 8/2018 | |
| WO | WO 2018/156966 A1 | 8/2018 | |
| WO | WO 2018/162757 A1 | 9/2018 | |
| WO | WO 2018/187308 A1 | 10/2018 | |
| WO | WO 2018/195200 A1 | 10/2018 | |
| WO | WO 2019/000106 A1 | 1/2019 | |
| WO | WO 2019/001816 A1 | 1/2019 | |
| WO | WO 2019/094511 A1 | 5/2019 | |
| WO | WO-2019141877 A1 * | 7/2019 | ........... B65G 1/0414 |
| WO | WO 2019/145237 A2 | 8/2019 | |
| WO | WO 2019/197497 A1 | 10/2019 | |
| WO | WO 2019/232613 A1 | 12/2019 | |
| WO | WO 2019/232651 A1 | 12/2019 | |
| WO | WO 2019/232652 A1 | 12/2019 | |
| WO | WO 2019/238641 A1 | 12/2019 | |
| WO | WO 2019/238645 A2 | 12/2019 | |
| WO | WO 2019/238664 A1 | 12/2019 | |
| WO | WO 2019/238698 A1 | 12/2019 | |
| WO | WO-2019243549 A1 * | 12/2019 | ............... B07C 3/08 |
| WO | WO 2020/006010 A1 | 1/2020 | |
| WO | WO 2020/178692 A1 | 9/2020 | |
| WO | WO 2020/183427 A1 | 9/2020 | |
| WO | WO 2020/229973 A1 | 11/2020 | |
| WO | WO 2020/250166 A1 | 12/2020 | |
| WO | WO 2021/038437 A1 | 3/2021 | |
| WO | WO 2021/108899 A1 | 6/2021 | |

OTHER PUBLICATIONS

Alicke et al., "Supply Chain 4.0—the next-generation digital supply chain", Supply Chain Management, McKinsey & Company, Jun. 2016, 16 pages.
"Consolidation to Free up Storage Bins / Bulk Bin Consolidation", SAP, Extended Warehouse Management, Feb. 2020, 3 pages.
Dematic RapidStore ASRS, Dematic, Apr. 2016, 20 pages.
Dittmer et al. "The Intelligent Container as a Part of the Internet of Things", Proceedings of the 2012 IEEE International Conference on Cyber Technology in Automation, Control and Intelligent Systems, May 27-31, 2012, Bankok, Thailand, pp. 209-214.
Exotec | Our Projects—Site Specificity | Cdiscount, Document D3 in in Pre-Grant Opposition by Third Party filed on Jun. 8, 2023 in respect of Indian Patent Application No. IN202147055222, 5 pages.
Ferguson, M., "What We Like This Week: Bricks, Bots, and Better Architecture", Autodesk, Jul. 27, 2018, 2 pages.
Penske, "Streamline the returnable container process", https://www.penskelogistics.com/technology/improve-efficiency/streamline-container-process/, accessed on Dec. 4, 2024, 6 pages.
Robinson, "How Supply Chain Systems Integration is a Game Changer", Industry Week, Jul. 3, 2018, 9 pages.
Schrauf et al., "How Digitization Makes the Supply Chain More Efficient, Agile, and Customer-focused", Strategy&—Industry 4.0, 2016, 32 pages.
Twede, D., et al. "Cartons, Crates and Corrugated Board", Handbook of Paper and Wood Packaging Technology, 2nd edition, DEStech Publications, Inc., 2015, 585 pages.
Vogt et al. "Explorative Investigation of Application Scenarios for Smart Bin Systems", International Conference on Competitive Manufacturing Proceedings, Jan. 30, 2019,Stellenbosch, South Africa, pp. 124-130.
Witron, "All-in-one—Order Fulfillment at a new level", https://www.witron.de/en/a:o-all-in-one/html, accessed on Dec. 4, 2024, 6 pages.
Yornew, CIM and FMS Systems, http://www.yornew.com/en/cim.asp, accessed on Dec. 4, 2024, 5 pages.
International Search Report and Written Opinion mailed Oct. 23, 2020 for PCT Application No. PCT/IB2020/055479, filed Jun. 11, 2020, in 10 pages.
International Preliminary Report on Patentability mailed Dec. 14, 2021 for PCT Application No. PCT/IB2020/055479, filed Jun. 11, 2020, in 6 pages.

* cited by examiner

MANUFACTURING SYSTEM WITH AN INTERCONNECTED STORAGE STRUCTURE AND MANUFACTURING CELLS SHARING A COMMON ROBOTIC FLEET

CROSS-REFERENCE TO RELATED APPLICATIONS

This application is a national stage application of the Patent Cooperation Treaty (PCT) international stage application titled "Manufacturing System with an Interconnected Storage Structure and Manufacturing Cells sharing a Common Robotic Fleet", numbered PCT/IB2020/055479, filed at the International Bureau of the World Intellectual Property Organization (WIPO) on Jun. 11, 2020. The aforementioned PCT international phase application claims priority to and the benefit of the provisional patent application titled "Manufacturing Facility with Interconnected Storage Structure and Manufacturing Cells Sharing a Common Robotic Fleet"", application Ser. No. 62/860,024, filed in the United States Patent and Trademark Office (USPTO) on Jun. 11, 2019. The specifications of the above referenced patent applications are incorporated herein by reference in their entirety.

BACKGROUND

Technical Field

The embodiments herein, in general, relate to manufacturing. More particularly, the embodiments herein relate to a manufacturing system with an interconnected automated storage and retrieval system (ASRS) and manufacturing cells sharing a common fleet of robotic storage/retrieval vehicles (RSRVs) that navigate within the ASRS structure and deliver componentry from the ASRS structure to various manufacturing cells of the manufacturing system.

Description of the Related Art

Automation in manufacturing generally refers to implementing systems that perform rote operations such as processing, assembly, material handling, etc., in a completely automated manner. Automated manufacturing comprises automating steps of a manufacturing process in addition to automating steps involved in the delivery of particular componentry such as workpieces, workpiece supports, tool pieces, etc., required at various manufacturing cells of a manufacturing facility according to the particular manufacturing process being carried out at each of the manufacturing cells. With growing advances in automation technology, most operations in manufacturing facilities are typically performed using automated machines and robots with minimal human intervention. In some automated manufacturing facilities, the sequence of processing operations is fixed by the configuration of the manufacturing equipment and cannot be changed from one order to another. In other automated manufacturing facilities that implement programmable automation, reprogramming and changeover of the manufacturing equipment for each order is time consuming and results in significant downtime, thereby reducing the manufacturing rates. To account for the time-intensive reprogramming and changeover of the manufacturing equipment, other automated manufacturing facilities substantially limit the number and variety of goods manufactured, thereby further reducing manufacturing rates.

Conventionally, manufacturing follows a linear workflow, where each manufacturing step occurs in a sequence defined by a typical one-way flow of a conveyor system or a transportation path. Once the workflow is designed and conveyors bolted down to a factory floor, the manufacturing workflow is substantially difficult to modify to changing requirements. As customer expectations are rapidly increasing towards customized products, manufacturers aim to differentiate themselves by focusing on customer experience. As a result, there is a need for automation and manufacturing systems to have the ability to be adapted to changing conditions easily and flexibly.

Conventional manufacturing facilities include manufacturing zones divided into two or more scattered, and mostly detached or separated lines in which manufacturing cells are interlinked by extensive, long-range conveyor systems and transportation paths. The layouts of the conventional manufacturing facilities typically rely on extensive, long-range conveyor systems, numerous aisles between racks, and widely spaced out and discontinuous manufacturing zones, and are, therefore, space, service and equipment intensive. Conventional systems split each manufacturing process into separate functions managed by independent entities connected by fixed conveyor belts or ground based transport. Manufacturing processes typically include receiving, kitting, building sub-assemblies, and final assembly, which are typically separate processes serviced by independent manufacturing equipment connected by linear conveyors or ground based transport. Depending on the assembly process, manufacturing cells are typically configured for a single subassembly with many transportation paths needed to complete the final assembly. There is a need for completing all manufacturing processes by a single automated material handling system that does not require long-range conveyors or ground transport, with manufacturing cells being software configurable and programmable as needed.

Automated storage and retrieval systems (ASRSs) that are used in some manufacturing facilities are typically disconnected from the manufacturing cells, thereby making it difficult to access componentry that is stored in the ASRSs and required for executing manufacturing processes at the manufacturing cells. Moreover, ASRS equipment relies on downstream sortation solutions to deliver goods to service areas at the right time and sequence. There is a need for integrating an ASRS capable of handling substantial volumes of inventory into a manufacturing environment by connecting scalable manufacturing cells to the ASRS to provide convenient access to an abundance of componentry such as workpieces and workpiece kits along with associated tool pieces and workpiece supports for optimizing the manufacture of goods. Moreover, there is a need for configuring manufacturing cells on-the-fly for a wide variety of manufacturing processes on-demand and transporting goods between all manufacturing cells in any sequence, thereby allowing any number of processes to be completed multiple times in any order. Furthermore, there is a need for just-in-time delivery of workpieces, tool pieces, and workpiece supports to the manufacturing cells for just-in-time manufacturing of subassemblies at any stage of the manufacturing process.

Another difficulty of conventional approaches to manufacturing is that due to the reliance of one-way conveyors and flow paths between processes, buffer storage is required if flow rates differ. Without buffer storage, if an upstream process processes goods faster than a downstream process at any given time, material can quickly accumulate and overwhelm the system to a halt. Due to the complexity and expense of buffer storage for each process, conventional automation solutions attempt to solve the problem with careful upfront equipment and workflow design and meticulous management during operation to ensure acceptable flow between processes. As a result, once established, workflows cannot be flexibly changed and manufacturers remain vulnerable to interruptions from unforeseen circumstances.

Moreover, in conventional approaches, componentry such as workpieces have to be physically transferred from one manufacturing cell to another manufacturing cell. Furthermore, each manufacturing cell receives and identifies the componentry, for example, by a barcode scan, a radio frequency identification (RFID) scan, etc., to complete the logical transfer of custody between entities, which is another drawback of conventional logistics. Furthermore, since conventional automated solutions rely on miles of ground-fixed conveyors or travel paths, the footprint of the entire operation is relatively large since most of the vertical space above the conveyor systems and workstations is not used.

Hence, there is a long-felt need for a manufacturing system with an interconnected ASRS and manufacturing cells sharing a common fleet of robotic storage/retrieval vehicles (RSRVs) that navigate within the ASRS structure and deliver componentry from the ASRS structure to various manufacturing cells of the manufacturing system for manufacture of goods with time, space and service efficiency, while addressing the above-recited problems associated with the related art.

SUMMARY

This summary is provided to introduce a selection of concepts in a simplified form that are further disclosed in the detailed description. This summary is not intended to determine the scope of the claimed subject matter.

The embodiments herein address the above-recited need for a manufacturing system with an interconnected automated storage and retrieval system (ASRS) and manufacturing cells sharing a common fleet of robotic storage/retrieval vehicles (RSRVs) that navigate within the ASRS structure and deliver componentry from the ASRS structure to various manufacturing cells of the manufacturing system for manufacture of goods with time, space and service efficiency. The manufacturing system disclosed herein is adaptable to changing conditions easily and flexibly. The embodiments herein allow completion of all manufacturing processes by a single automated manufacturing system that does not require long-range conveyors or ground transport, with manufacturing cells being software configurable as needed. The embodiments herein integrate an ASRS capable of handling substantial volumes of inventory into a manufacturing environment by connecting scalable manufacturing cells to the ASRS to provide convenient access to multiple items of componentry such as workpieces and workpiece kits along with associated tool pieces and workpiece supports for optimizing the manufacture of goods.

In the manufacturing system disclosed herein, the manufacturing cells are configurable on-the-fly for a wide variety of manufacturing processes on-demand. Moreover, the manufacturing system allows transport of componentry and goods between all manufacturing cells in any order and sequence, instead of linearly with conveyors, thereby allowing any number of processes to be completed multiple times in any order. Furthermore, the manufacturing system disclosed herein executes just-in-time delivery of the componentry to the manufacturing cells for just-in-time manufacturing of subassemblies at any stage of the manufacturing process. Furthermore, the manufacturing system disclosed herein allows buffering of the componentry and finished goods in the ASRS structure between the processes performed at the manufacturing cells. Furthermore, the continuity between each of the ASRS structure and the manufacturing cells outside the ASRS structure allows a direct physical transfer of the componentry and the finished goods free of identification or scanning of the componentry and the finished goods.

The manufacturing system disclosed herein comprises a storage arrangement comprising an ASRS structure, a supply of workpieces, and a fleet of RSRVs. The ASRS structure comprises a three-dimensional (3D) array of storage locations distributed throughout a two-dimensional (2D) footprint of the ASRS structure at multiple storage levels within the ASRS structure. The supply of workpieces is stored within the storage locations of the ASRS structure for use in manufacturing goods from the workpieces. Each of the RSRVs in the fleet is navigable within the ASRS structure in three dimensions to access the storage locations in the 3D array. In an embodiment, the ASRS structure comprises at least one track-equipped level comprising a 2D gridded track layout. The fleet of RSRVs is navigable within the ASRS structure in at least two dimensions on the 2D gridded track layout. The manufacturing system disclosed herein further comprises multiple manufacturing cells positioned outside the ASRS structure. In an embodiment, the manufacturing system disclosed herein further comprises a track structure attached to the ASRS structure and extending beyond the 2D footprint of the ASRS structure to define an extension thereof. In an embodiment, the track structure is an extension of the 2D gridded track layout of the track-equipped level of the ASRS structure. The track structure is configured to define one or more travel paths on which the RSRVs are navigable and along which the manufacturing cells are distributed. The same fleet of RSRVs navigable within the ASRS structure in the three dimensions is operable to deliver the workpieces to the manufacturing cells. In an embodiment, the workpieces are transportable between each of the manufacturing cells in any order. In another embodiment, the workpieces are received at a first one of the manufacturing cells for performance of one or more of multiple process steps of a manufacturing process and subsequently stored in the storage locations of the ASRS structure and retrieved from the storage locations of the ASRS structure for the transfer of the workpieces to a second one of the manufacturing cells. In another embodiment, each of the manufacturing cells is configured to receive the workpieces multiple times for performance of one or more of the process steps of the manufacturing process.

In an embodiment, the storage arrangement of the manufacturing system disclosed herein further comprises a supply of tool pieces for use in manufacturing the goods. The tool pieces are stored in the same ASRS structure as the workpieces. The tool pieces are retrievable from the same ASRS structure and deliverable to the manufacturing cells by the same fleet of RSRVs.

In an embodiment, the storage arrangement of the manufacturing system disclosed herein further comprises a supply of storage units of compatible size and shape for storage in the storage locations of the ASRS structure. The storage units are configured to be carried by the RSRVs for transfer of the storage units to and from the storage locations and to and from the manufacturing cells. In an embodiment, the storage units comprise workpiece storage units or tool piece storage units or any combination thereof. Each of the workpiece storage units is configured to hold one or more of the workpieces. Each of the tool piece storage units is configured to hold one or more of the tool pieces. In an embodiment, the manufacturing cells are configured in a continuous arrangement outside the ASRS structure. In this embodiment, the storage units are configured to be transferred to and from the storage locations of the ASRS structure and between the manufacturing cells, free of identification of the storage units, due to the continuous arrangement of the manufacturing cells.

In an embodiment, the workpiece storage units comprise inventory storage units and kit storage units. Each of the inventory storage units is configured to contain a collection of inventory workpieces. Each of the kit storage units is configured to contain a kit of mixed workpieces picked from one or more of the inventory storage units according to a manufacturing process to be performed on the mixed workpieces once delivered to one of the manufacturing cells. In another embodiment, the manufacturing system disclosed herein further comprises at least one kitting workstation configured to accept delivery of the inventory storage units from the ASRS structure by the RSRVs for allowing picking of the inventory workpieces from the inventory storage units at the kitting workstation(s). In an embodiment, the kitting workstation(s) is configured to receive a drop-off of the workpiece storage units and/or a travel of the workpiece storage units through the kitting workstation(s) by the same fleet of RSRVs.

In an embodiment, the storage arrangement of the manufacturing system disclosed herein further comprises a supply of workpiece supports. Each of the workpiece supports is configured to hold one or more of the workpieces in predetermined positions during the manufacture of the goods. The workpiece supports are stored in the same ASRS structure as the workpieces. The workpiece supports are retrievable from the same ASRS structure and deliverable to the manufacturing cells by the same fleet of RSRVs. In an embodiment, each of the workpiece supports is of a common footprint of a standardized shape and size as each of a supply of storage units of compatible size and shape configured to fit within the storage locations of the ASRS structure. Each of the workpiece supports comprises a base of a standardized shape and size configured to fit within the storage locations of the ASRS structure. In an embodiment, each of the workpiece supports and each of the storage units are configured to have a matching layout of interface features by which the RSRVs interact with the workpiece supports and the storage units to allow loading and unloading of the workpiece supports and the storage units to and from the RSRVs.

In an embodiment, in addition to the supply of workpieces stored within the storage locations of the ASRS structure, the storage arrangement comprises either a supply of tool pieces or a supply of workpiece supports stored in the ASRS structure. Each of the tool pieces is useful for performance of one or more process steps of a manufacturing process on one or more of the workpieces during the manufacture of the goods. Each of the workpiece supports is configured to hold one or more of the workpieces in predetermined positions during the manufacture of the goods. In this embodiment, the fleet of RSRVs is operable to extract from the storage locations both the workpieces and at least one of the tool pieces and the workpiece supports. The same fleet of RSRVs navigable within the ASRS structure in the three dimensions is operable to deliver supplies or componentry, for example, the workpieces and the tool pieces and/or the workpiece supports among the manufacturing cells. In an embodiment, the componentry is transportable between each of the manufacturing cells in any order. In another embodiment, each of the manufacturing cells is configured to receive the componentry multiple times for performance of one or more of the process steps of the manufacturing process.

In an embodiment, each of the manufacturing cells comprises at least one workpiece holding area configured to hold the workpieces awaiting processing at the corresponding manufacturing cell. The workpiece holding area(s) is configured to accept placement of one of the workpiece storage units thereon. In an embodiment, the workpiece holding area comprises two workpiece holding areas. Each of the two workpiece holding areas is configured to hold a respective set of workpieces required at a corresponding manufacturing cell.

In an embodiment, at least a subset of the manufacturing cells is positioned at the track structure or within an area of the track structure. In an embodiment, the track structure is a gridded track structure comprising sets of intersecting rails on which the RSRVs are navigable in two dimensions. In an embodiment, a width of the workpiece holding area in each of the two dimensions is generally equal to a whole number multiple of a distance measured between two adjacent parallel rails of the gridded track structure. In another embodiment, a width of the workpiece holding area in each of the two dimensions does not exceed a distance measured between two adjacent parallel rails of the gridded track structure.

In an embodiment, the gridded track structure comprises square spots. Each of the square spots is delimited by a first pair of parallel rails lying in a first direction and a second pair of parallel rails lying in a second direction perpendicular to the first direction. Each of the manufacturing cells occupies a cell space of an area equal to a predetermined number of the square spots. In an embodiment, at least one cell space is a square space whose area is divisible into nine square subspaces. Each of the nine square subspaces is equal in area to one of the square spots of the gridded track structure. Four corner subspaces of the nine square subspaces are configured as holding areas for holding supplies needed by the corresponding manufacturing cell. In an embodiment, a first pair of mid-perimeter subspaces positioned between the four corner subspaces at a first pair of opposing perimeter sides of the cell space is occupied by robotic workers. In an embodiment, a central subspace positioned between the robotic workers is configured as a working area to which the workpieces are transferred and at which the workpieces are processed by the robotic workers. In an embodiment, the working area is neighboured by a second pair of mid-perimeter subspaces positioned between the four corner subspaces at a second pair of opposing perimeter sides of the cell space. In an embodiment, at least one of the second pair of mid-perimeter subspaces is an unoccupied open area by which the RSRVs are configured to enter and exit the working area. In another embodiment, both of the second pair of mid-perimeter subspaces are unoccupied open areas, whereby the RSRVs are configured to travel fully through the corresponding manufacturing cell.

In an embodiment, each of the manufacturing cells comprises at least one robotic picker operable to pick the workpieces from the workpiece holding area. In another embodiment, each of the manufacturing cells further comprises a working area to which the picked workpieces are transferred from the workpiece holding area by the robotic picker(s).

In an embodiment, each of the manufacturing cells in the subset comprises at least one tool holding area configured to hold tool pieces required at a corresponding manufacturing cell. In an embodiment, a width of the tool holding area in each of the two dimensions is generally equal to a distance measured between two adjacent parallel rails of the gridded track structure. In another embodiment, a width of the tool holding area in each of the two dimensions does not exceed a distance measured between two adjacent parallel rails of the gridded track structure. In an embodiment, each of the manufacturing cells in the subset comprises at least one robotic worker mounted atop a mounting base that is installed on or within the gridded track structure. In an embodiment, a width of the mounting base in each of the two dimensions is generally equal to a whole number multiple of a distance measured between two adjacent parallel rails of the gridded track structure. In another embodiment, a width of the mounting base in each of the two dimensions does not exceed a distance measured between two adjacent parallel rails of the gridded track structure.

In an embodiment, the manufacturing cells of the manufacturing system disclosed herein is configured in a multi-level structure comprising multiple levels of manufacturing cells. In an embodiment, the multi-level structure comprises a gridded track structure at each of the levels and upright frame members. The gridded track structure comprises sets of intersecting rails on which the RSRVs are navigable in two dimensions. The upright frame members interconnect the intersecting rails of the levels. In an embodiment, one or more of the upright frame members are configured for traversal of the RSRVs thereon in an ascending direction and/or a descending direction to transition between the levels. In an embodiment, the gridded track structure at one of the levels of the multi-level structure is attached to a corresponding one of the storage levels in the ASRS structure at which the RSRVs are configured to transition between the ASRS structure and the multi-level structure.

In an embodiment, the manufacturing cells comprise fully automated manufacturing cells and one or more human-attended manufacturing cells configured with respect to the gridded track structure. The fully automated manufacturing cells are positioned at distributed locations throughout a main internal area of the gridded track structure. The human-attended manufacturing cells are positioned at an outer perimeter area of the gridded track structure.

In an embodiment, the manufacturing system disclosed herein further comprises a computerized control system (CCS) in operable communication with the fleet of RSRVs. The CCS comprises a network interface coupled to a communication network, at least one processor coupled to the network interface, and a non-transitory, computer-readable storage medium communicatively coupled to the processor(s). The non-transitory, computer-readable storage medium, for example, a memory unit, is configured to store computer program instructions, which when executed by the processor(s), cause the processor(s) to activate one or more of the RSRVs to perform one or more of: (a) navigating within the ASRS structure and/or through the manufacturing cells; (b) retrieving one or more of the workpieces contained in one or more storage units from the storage locations of the ASRS structure; (c) delivering one or more of the workpieces contained in one or more storage units to at least one kitting workstation for kitting into one or more kit storage units; (d) picking up one or more kit storage units from the kitting workstation(s); returning and storing one or more kit storage units to the storage locations of the ASRS structure; (f) retrieving at least one of one or more kit storage units and one or more of the workpieces contained in another one or more of the storage units, one or more tool pieces contained in another one or more storage units, and one or more workpiece supports from the same ASRS structure; (g) delivering at least one of one or more kit storage units and one or more of the workpieces contained in the other one or more of the storage units, one or more tool pieces contained in the other one or more storage units, and one or more workpiece supports to the manufacturing cells for manufacture of the goods; and (h) inducting the goods into the ASRS structure on a final workpiece support.

Disclosed herein is also a method for executing a workflow in a manufacturing system. In the method disclosed herein, workpieces and workpiece supports are stored in respective storage locations of the ASRS structure. The workpieces are stored in workpiece storage units at the storage locations. In an embodiment, each of the workpiece storage units is filled with a kit of different workpieces according to requirements of the manufacturing process. In an embodiment, each of the workpiece storage units is filled at a kitting workstation that is connected to the ASRS structure. At the kitting workstation, the fleet of RSRVs is configured to deliver inventory storage units containing inventory workpieces retrieved from respective storage locations in the ASRS structure; the different workpieces of the kit are picked from the inventory workpieces in the inventory storage units and compiled into the workpiece storage units; and each of the workpiece storage units is carried away from the kitting workstation by one of the RSRVs and deposited into a respective one of the storage locations in the ASRS structure for subsequent retrieval from the ASRS structure.

In an embodiment, tool piece storage units configured to hold tool pieces for use in the manufacturing process are stored in the ASRS structure. Using the fleet of RSRVs navigable within the ASRS structure, one or more of the workpiece storage units and a selected workpiece support are extracted from the ASRS structure according to requirements of a manufacturing process to be performed at a manufacturing cell positioned outside the ASRS structure, and separately delivered to the manufacturing cell. In an embodiment, RSRVs of the same type are configured to solely perform the extraction and the delivery of both of the workpiece storage unit(s) and the selected workpiece support from the ASRS structure to the manufacturing cell. At the manufacturing cell, the selected workpiece support is positioned in a working position accessible by one or more workers of the manufacturing cell. At the manufacturing cell, with the selected workpiece support maintained in the working position, (i) one or more of the workpieces are transferred from the workpiece storage unit(s) onto the selected workpiece support; and (ii) a process step of the manufacturing process is performed on the workpiece(s) held on the selected workpiece support. In an embodiment, prior to performing the process step of the manufacturing process, a subset of the tool piece storage units are extracted from the ASRS structure and delivered to the manufacturing cell using one of the RSRVs. In an embodiment, prior to performing the process step of the manufacturing process a select one of the tool pieces from the subset of the tool piece storage units is attached to a robotic worker of the manufacturing cell according to the requirements of the manufacturing process to be performed on the workpiece(s) by the robotic worker.

In an embodiment, the workpiece storage unit(s) comprises two workpiece storage units. In this embodiment, the two workpiece storage units are delivered to two respective holding areas of the manufacturing cell. Two workpieces are respectively transferred from the two workpiece storage units parked at the two respective holding areas onto the selected workpiece support.

In an embodiment, after transferring the workpiece(s) from the workpiece storage unit(s) onto the selected workpiece support, an unneeded or empty one of the workpiece storage units from which a selected workpiece is removed and from which no further workpieces are required for the manufacturing process at the manufacturing cell, is removed from the manufacturing cell. In this embodiment, using one of the RSRVs, an additional workpiece storage unit containing one or more additional workpieces needed at the manufacturing cell is delivered to the manufacturing cell. In an embodiment, the additional workpiece(s) is for use in a different manufacturing process to be performed at the same manufacturing cell. In an embodiment, the unneeded or empty one of the workpiece storage units is removed using a different RSRV from that which delivers the additional workpiece storage unit to the manufacturing cell. In an embodiment, the different RSRV is configured to remove the unneeded or empty one of the workpiece storage units after having dropped off a different one of the workpiece storage units at a different manufacturing cell to supply contents of the different one of the workpiece storage units to the different manufacturing cell. After the process step of the manufacturing process is performed on the workpiece(s) held on the selected workpiece support, the selected workpiece support and the workpiece(s) thereon that were processed are removed from the manufacturing cell; another workpiece support is delivered to the manufacturing cell for use in the different manufacturing process using one of the RSRVs; the workpiece support is supported in the working position; the additional workpiece(s) is transferred from the additional workpiece storage unit onto the workpiece support; and one or more process steps of the different manufacturing process are performed on the additional workpiece(s).

In the method disclosed herein, after completion of a finished good by processing of the workpiece(s) at one or more manufacturing cells, the finished good is inducted into the ASRS structure on one of the RSRVs. In an embodiment, the finished good is inducted into the ASRS structure on a final workpiece support on which one or more final processing steps were carried out to complete the finished good. In an embodiment, the final workpiece support is the same selected workpiece support onto which the workpiece(s) was transferred.

The manufacturing system and method disclosed herein integrate the ASRS structure with the plurality of manufacturing cells in a way to perform various manufacturing processes across the multiple manufacturing cells. In the manufacturing system and method disclosed herein, the gridded track structure attached to the lower 2D grid of the ASRS structure allows continuous servicing of all the manufacturing cells by the same fleet of RSRVs navigable to and from the ASRS structure and to and from each of the manufacturing cells.

In one or more embodiments, related systems comprise circuitry and/or programming for executing the methods disclosed herein. The circuitry and/or programming are of any combination of hardware, software, and/or firmware configured to execute the methods disclosed herein depending upon the design choices of a system designer. In an embodiment, various structural elements are employed depending on the design choices of the system designer.

BRIEF DESCRIPTION OF THE DRAWINGS

The foregoing summary, as well as the following detailed description, is better understood when read in conjunction with the appended drawings. For illustrating the embodiments herein, exemplary constructions of the embodiments are shown in the drawings. However, the embodiments herein are not limited to the specific structures, components, and methods disclosed herein. The description of a structure, or a component, or a method step referenced by a numeral in a drawing is applicable to the description of that structure, component, or method step shown by that same numeral in any subsequent drawing herein.

DETAILED DESCRIPTION

Various aspects of the present disclosure may be embodied as a system of components and/or structures, a method, and/or non-transitory, computer-readable storage media having one or more computer-readable program codes stored thereon. Accordingly, various embodiments of the present disclosure may take the form of a combination of hardware and software embodiments comprising, for example, mechanical structures along with electronic components, computing components, circuits, microcode, firmware, software, etc.

Figure 1:
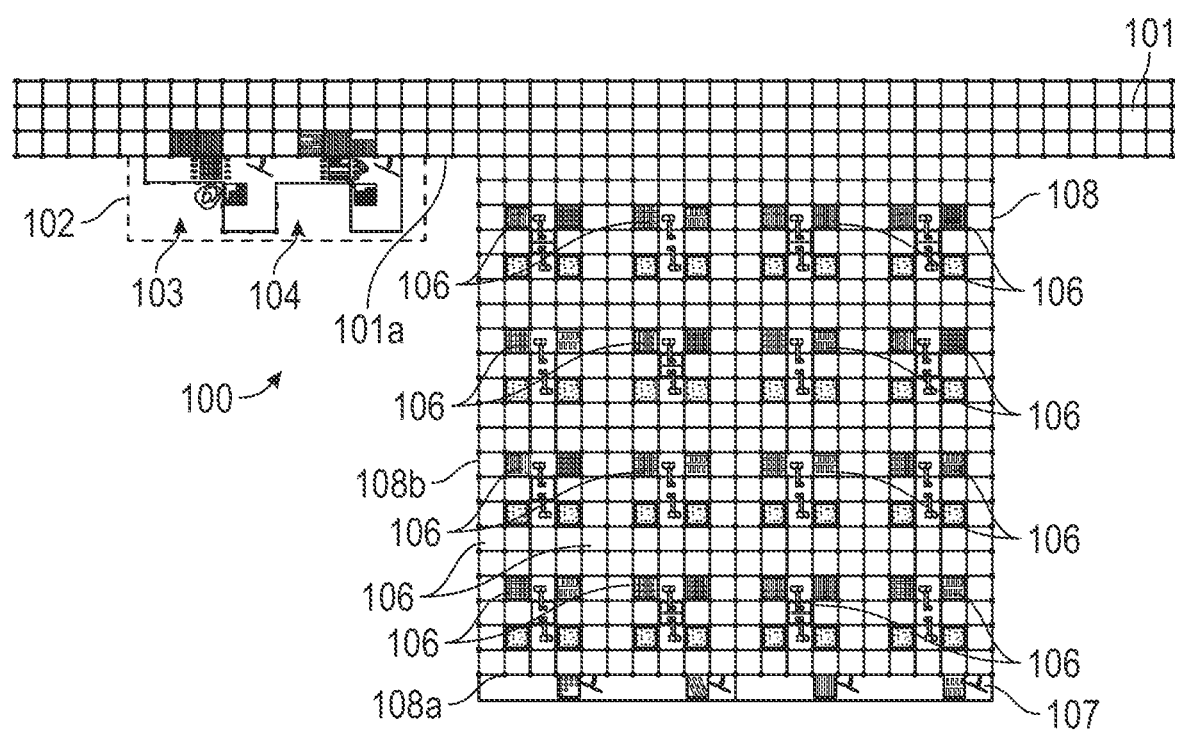
FIG. 1 illustrates a top plan view of a manufacturing system comprising an automated storage and retrieval system (ASRS) structure neighboured by a kitting area and a manufacturing centre, according to an embodiment herein.
Figure 2:
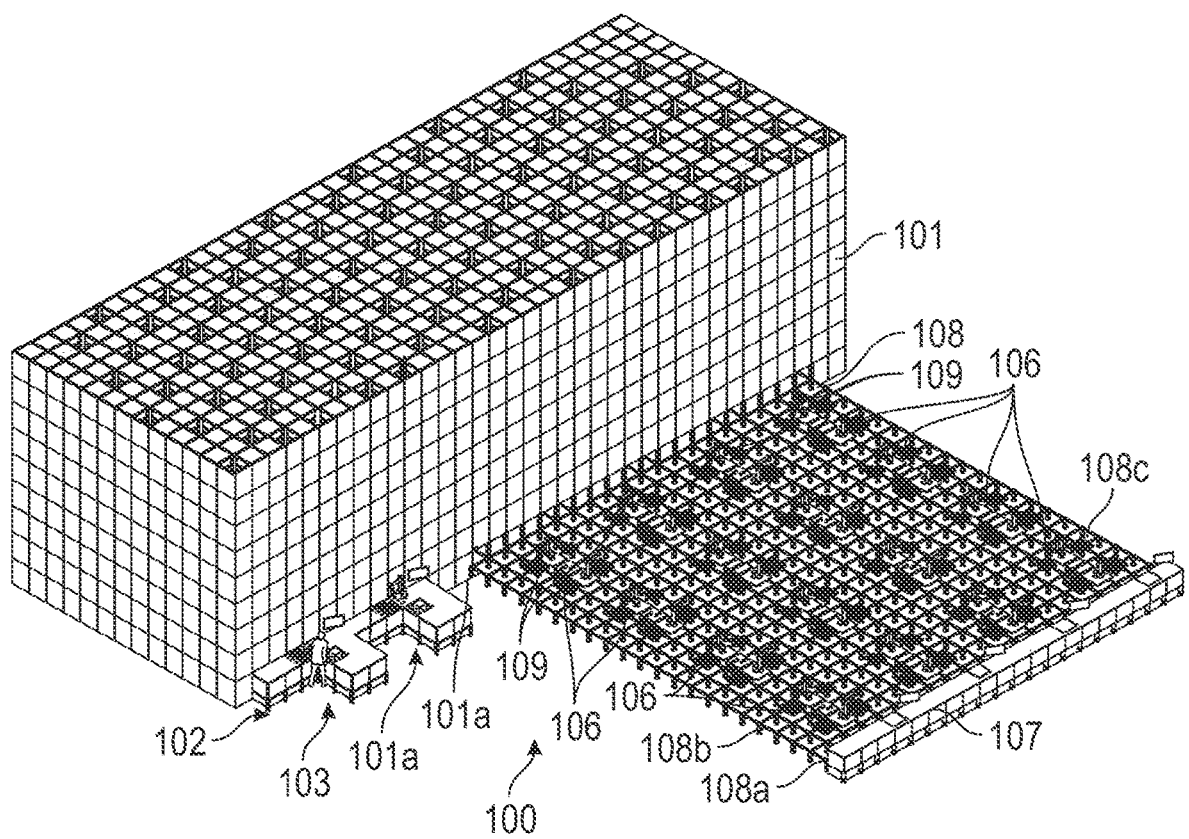
FIG. 2 illustrates a side perspective view of the manufacturing system shown in FIG. 1, according to an embodiment herein.

FIG. 1 illustrates a top plan view of a manufacturing system 100 comprising an automated storage and retrieval system (ASRS) structure 101 neighboured by a kitting area 102 and a manufacturing centre 105, according to an embodiment herein. The kitting area 102 is attached to the ASRS structure 101 in neighbouring relation thereto at an outer perimeter 101a of the ASRS structure 101. The kitting area 102 comprises one or more kitting workstations, for example, human-operated or human-aided or human-attended kitting workstations 103 and robotic kitting workstations 104 as disclosed in the detailed description of FIG. 7. The manufacturing centre 105 is also attached to the ASRS structure 101 in neighbouring relation thereto at the outer perimeter 101a of the ASRS structure 101. FIG. 2 illustrates a side perspective view of the manufacturing system 100 shown in FIG. 1, according to an embodiment herein. FIG. 2 illustrates a side of the ASRS structure 101 at which the kitting area 102 and the manufacturing centre 105 are positioned. For purposes of illustration, FIGS. 1-2 show the kitting area 102 and the manufacturing centre 105, both neighbouring the ASRS structure 101 at the same perimeter side 101a thereof: however the scope of the manufacturing system 100 disclosed herein is not limited to the arrangement of the kitting area 102 and the manufacturing centre 10S at the same perimeter side 101a of the ASRS structure 101, but may be extended to any arrangement of either or both the kitting area 102 and the manufacturing centre 105 on any one or more of the perimeter sides of the ASRS structure 101.

Figure 3:
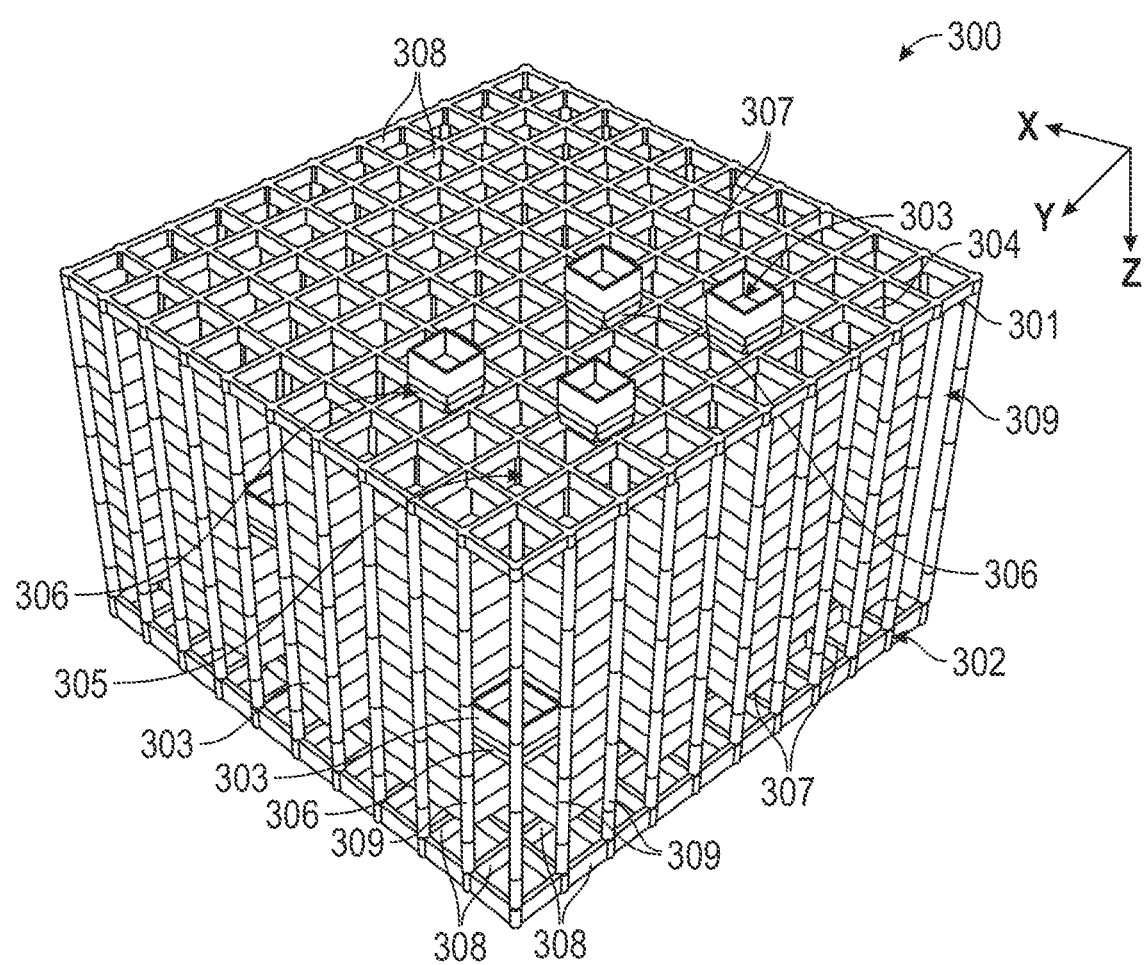
FIG. 3 illustrates a top isometric view of a three-dimensional gridded storage structure defining the ASRS structure of the manufacturing system, according to an embodiment herein.
Figure 4A:
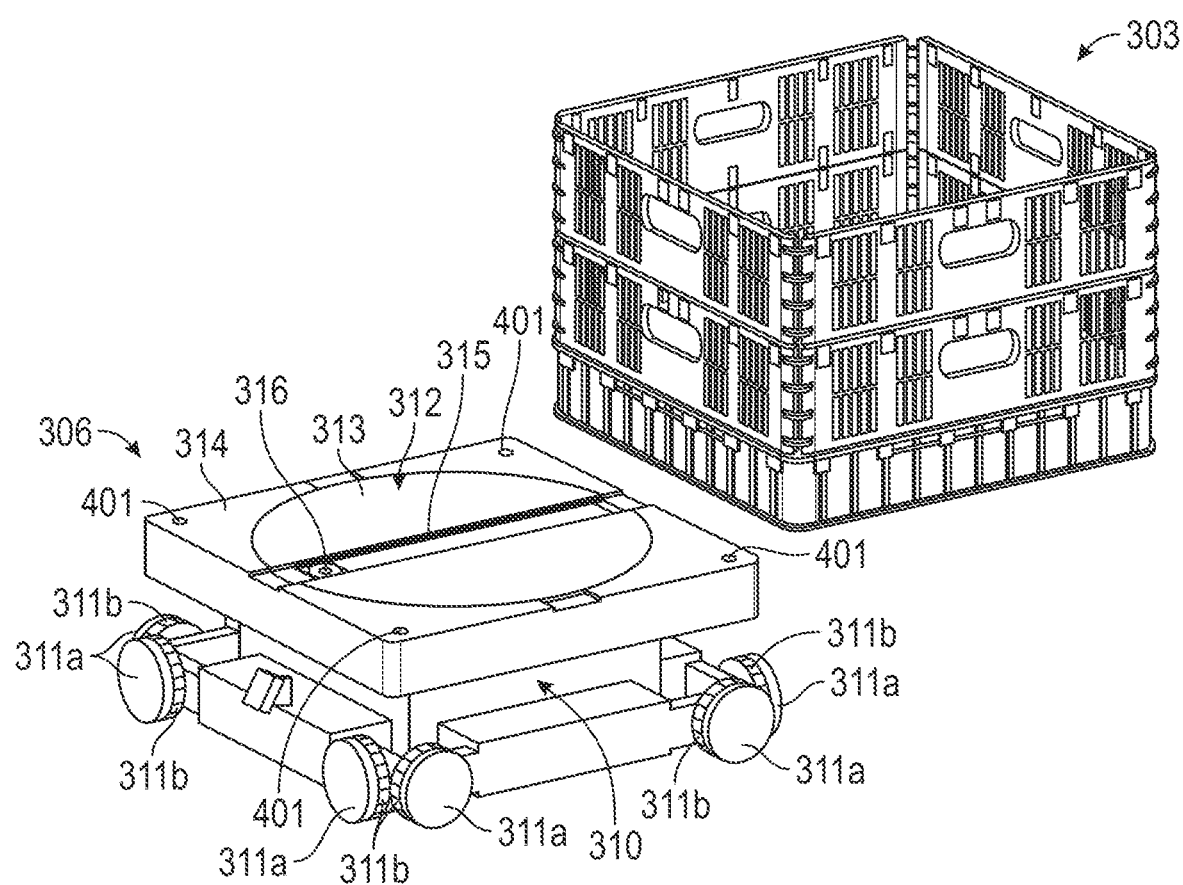
FIG. 4A illustrates a robotic storage/retrieval vehicle (RSRV) and a compatible storage unit employed in the ASRS structure of the manufacturing system, according to an embodiment herein.
Figure 4B:
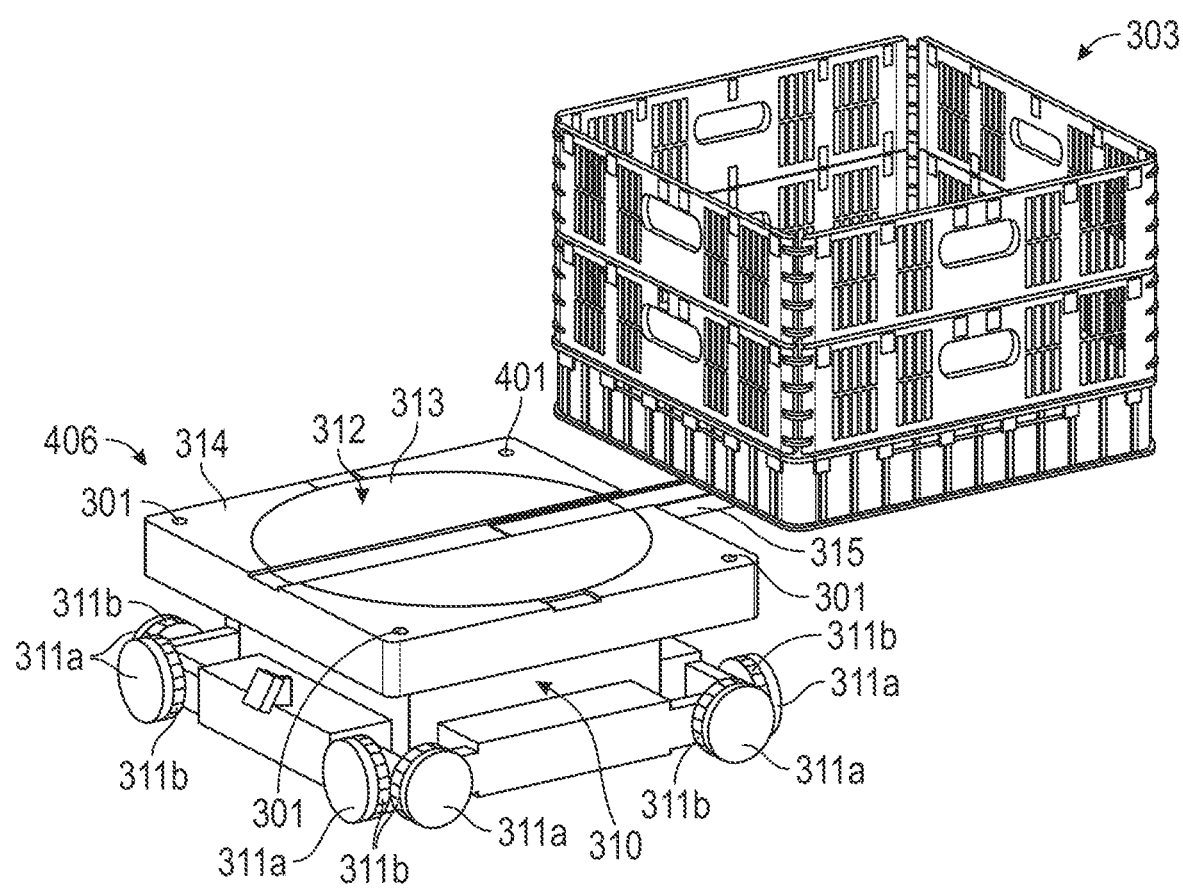
FIG. 4B illustrates the RSRV and the compatible storage unit shown in FIG. 4A, showing an extension of a turret arm of the RSRV for engaging with the storage unit to push or pull the storage unit off of or onto the RSRV, according to an embodiment herein.

The manufacturing system 100 disclosed herein comprises a storage arrangement comprising the ASRS structure 101 and a fleet of robotic storage/retrieval vehicles (RSRVs) 306 as illustrated in FIG. 3 and FIGS. 4A-4B. The ASRS structure 101 comprises a three-dimensional (3D) array of storage locations distributed throughout a two-dimensional (2D) footprint of the ASRS structure 101 at multiple storage levels within the ASRS structure 101. In an embodiment, the ASRS structure 101 is configured as a 3D gridded storage structure 300 as illustrated in FIG. 3. Each of the RSRVs 306 in the fleet is navigable within the ASRS structure 101 in three dimensions to access the storage locations in the 3D array. The RSRVs 306 are operable to deposit storage units, for example, bins, trays, boxes, pallets, etc., into the storage locations of the ASRS structure 101, and extract the storage units from the storage locations as disclosed below. In an embodiment, the ASRS structure 101 comprises at least one track-equipped level comprising a 2D gridded track layout 302 as illustrated in FIG. 3. The fleet of RSRVs 306 is navigable within the ASRS structure 101 in at least two dimensions on the 2D gridded track layout 302 as illustrated in FIG. 3.

The manufacturing system 100 disclosed herein further comprises multiple manufacturing cells 106 and 107 positioned outside the ASRS structure 101. The manufacturing cells 106 and 107 constitute the manufacturing centre 105 of the manufacturing system 100. The manufacturing cells 106 and 107 are categorized, standardized, and modularly constructed for different manufacturing processes. In an embodiment, the manufacturing system 100 disclosed herein further comprises a track structure 108 attached to the ASRS structure 101 and extending beyond the 2D footprint of the ASRS structure 101 to define an extension thereof. In an embodiment, the track structure 108 is an extension of the 2D gridded track layout 302 of the track-equipped level of the ASRS structure 101. The manufacturing cells 106 are configured with respect to the track structure 108. The track structure 108 is configured to define one or more travel paths on which the RSRVs 306 are navigable and along which the manufacturing cells 106 are distributed. The same fleet of RSRVs 306 navigable within the ASRS structure 101 in the three dimensions is operable to deliver componentry, for example, workpieces and/or tool pieces contained in storage units, workpiece supports, etc., to the manufacturing cells 106 and 107. In an embodiment, the componentry is transportable between each of the manufacturing cells 106 and 107 in any order. In another embodiment, each of the manufacturing cells 106 and 107 is configured to receive the componentry multiple times for performance of one or more of the process steps of the manufacturing process. In an embodiment, each of the manufacturing cells 106 and 107 is equipped with product neutral equipment and configured to implement product specific basic functions. In another embodiment, each of the manufacturing cells 106 can be individually expanded with process specific equipment. The manufacturing cells 106 are configured to execute a plurality of manufacturing processes, for example, welding, adhesive bonding, punching, brazing, clinching, etc. Components for subsequent process steps of a manufacturing process are routed to each manufacturing cell 106 on-the-fly during execution of a previous process for uninterrupted manufacturing. In an embodiment, at least a subset of the manufacturing cells 106 is positioned at the track structure 108 or within an area of the track structure 108. In an embodiment, the track structure 108 is a gridded track structure comprising sets of intersecting rails on which the RSRVs 306 are navigable in two dimensions.

The manufacturing centre 105 comprises multiple fully automated or robotic manufacturing cells 106 distributed in a spaced apart manner over the 2D area of the track structure 108 that is connected to the 2D gridded lower track layout 302 of the ASRS structure 101. The gridded track structure 108 of the manufacturing centre 105 forms a coplanar extension of the gridded lower track layout 302 of the ASRS structure 101 to allow the same fleet of RSRVs 306 that navigates the ASRS structure 101 to deposit and extract the storage units to and from the ASRS structure 101 to also deliver the extracted storage units to the manufacturing cells 106 and 107, and return the extracted storage units back into the ASRS structure 101 when no longer required at the manufacturing centre 105. In the embodiment illustrated in FIGS. 1-2, the manufacturing cells 106 are arranged, for example, in a rectangular array to align each manufacturing cell 106 with other manufacturing cells 106 in a respective row and a respective column of the rectangular array. In other embodiments, the manufacturing cells 106 are arranged in arrays of different configurations. Similarly, while the embodiment illustrated in FIGS. 1-2 shows sixteen manufacturing cells 106, the quantity of manufacturing cells 106 may vary, and need not be a square number, regardless of whether the manufacturing cells 106 are laid out in a rectangular array, another uniformly distributed pattern or array, or in any other fashion, uniform or otherwise.

As illustrated in FIGS. 1-2, the fully automated manufacturing cells 100 are spread out over a main internal area of the gridded track structure 108. That is, the fully automated manufacturing cells 10 are positioned at distributed locations throughout the main internal area of the gridded track structure 108. In an embodiment, each of the fully automated manufacturing cells 106 comprises at least one robotic picker 109 operable to pick componentry, for example, workpieces, tool pieces, etc., from holding areas configured in the respective manufacturing cells 106. In an embodiment as illustrated in FIGS. 1-2, the manufacturing centre 105 further comprises one or more human-operated or human-aided or human-attended manufacturing cells 107 positioned, for example, at an outer perimeter area 108a of the gridded track structure 108. In an embodiment, the human-attended manufacturing cells 107 are positioned specifically at a far side of the gridded track structure 108 furthest from the ASRS structure 101; however, in other embodiments, the human-attended manufacturing cells 107 are additionally or alternatively positioned at either of the two lateral sides 108b and 108c of the gridded track structure 108 that extend outwardly from the perimeter side 101a of the ASRS structure 101. Furthermore, for purposes of illustration, FIGS. 1-2 show the ASRS structure 101 being neighboured by a single manufacturing centre 105, where the entire gridded track structure 108 and entire population of manufacturing cells 106, 107 are positioned on a single side 101a of the ASRS structure 101. In another embodiment, the manufacturing system 100 disclosed herein is configured such that the gridded track structure 108 of the single manufacturing centre 105 occupies more than one side of the ASRS structure 101. In another embodiment, multiple manufacturing centres comprising respective gridded track structures neighbour different respective sides of the ASRS structure 101 such that navigation of the RSRVs 306 between the gridded track structures of the separate manufacturing centres is executed via the gridded lower track layout 302 of the ASRS structure 101.

Figure 18:
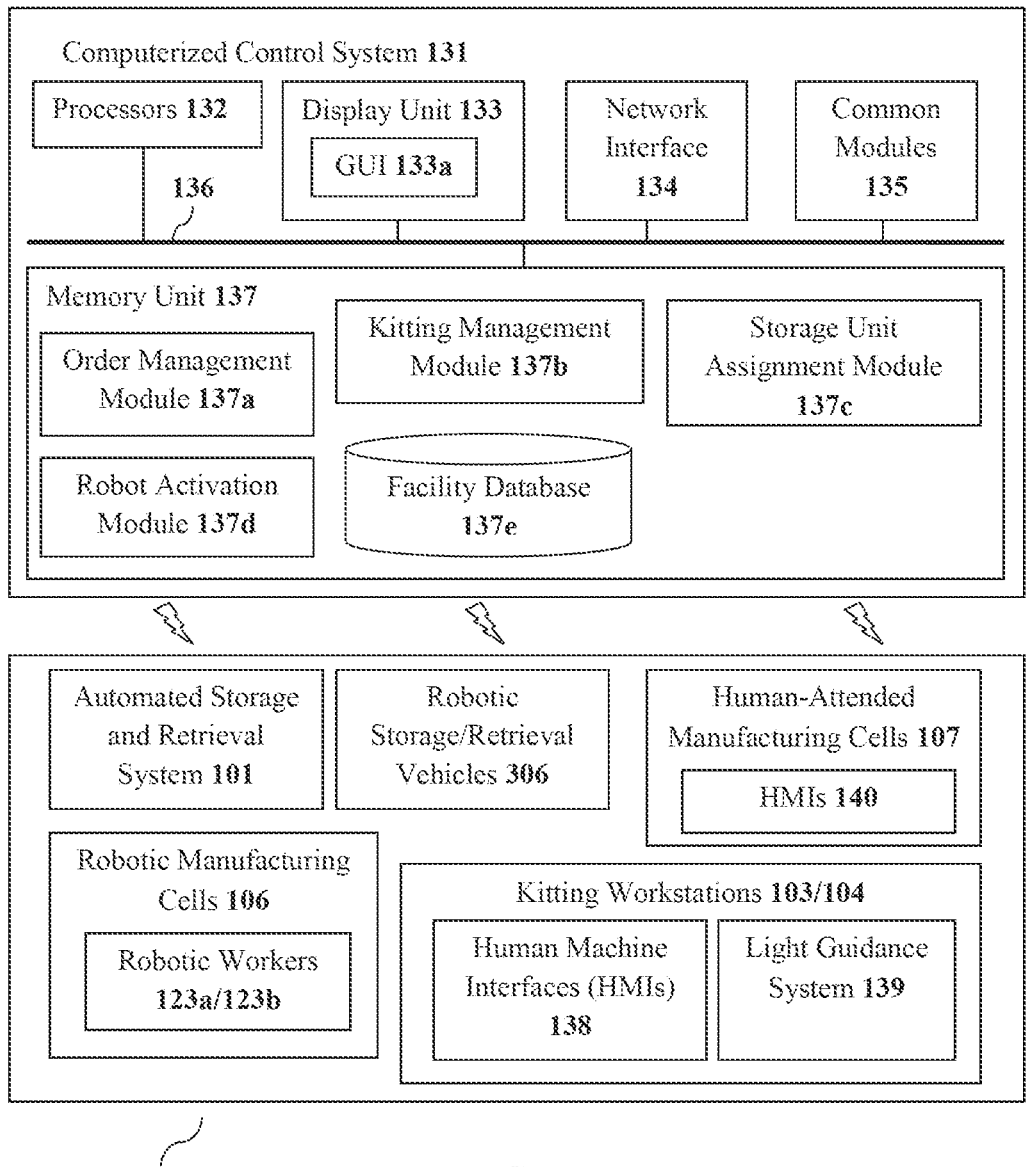
FIG. 18 illustrates an architectural block diagram of the manufacturing system, showing communication between a computerized control system and components of the manufacturing system, according to an embodiment herein.

In an embodiment, the manufacturing system 100 disclosed herein further comprises a computerized control system (CCS) 131 as illustrated in FIG. 18, in operable communication with the fleet of RSRVs 306. At various stages of the workflow executed at the manufacturing system 100, the CCS 131 activates one or more of the RSRVs 306 to perform one or more of: (a) navigating within the ASRS structure 101 and/or through the manufacturing cells 106, 107; (b) retrieving one or more of the workpieces contained in one or more storage units from the storage locations of the ASRS structure 101; (c) delivering one or more of the workpieces contained in one or more storage units to at least one kitting workstation 103, 104 for kitting into one or more kit storage units; (d) picking up one or more kit storage units from the kitting workstation(s) 103, 104; returning and storing one or more kit storage units to the storage locations of the ASRS structure 101; (f) retrieving at least one of one or more kit storage units and one or more of the workpieces contained in another one or more of the storage units, one or more tool pieces contained in another one or more storage units, and one or more workpiece supports from the same ASRS structure 101; (g) delivering at least one of the one or more kit storage units and one or more of the workpieces contained in the other one or more of the storage units, one or more tool pieces contained in the other one or more storage units, and one or more workpiece supports to the manufacturing cells 106, 107 for manufacture of the goods; and (h) inducting the finished goods into the ASRS structure 101 on a final workpiece support. When a product is changed, the manufacturing cells 106, 107 are automatically upgraded for a new task. In an embodiment, the CCS 131 automatically upgrades the manufacturing cells 106, 107 for the new task. While testing and maintenance is being performed by workers on particular manufacturing cells, tasks can be transferred to other manufacturing cells for uninterrupted manufacturing. The manufacturing cells 106, 107 are configured as needed on-the-fly without interrupting manufacturing processes at any manufacturing cell 106, 107.

Consider an example workflow of the manufacturing system 100 disclosed herein. Material such as workpieces are inducted into storage units and stored in the ASRS structure 101. Similarly, tool pieces are inducted into storage units and stored in the ASRS structure 101. Moreover, workpiece supports, for example, jigs are inducted and stored in the ASRS structure 101. The CCS 131 receives digital production plans with defined material or workpiece kits/tool piece kits and related process instructions. Digital instructions to software configure the manufacturing cells 106 to manufacture a good or a product. The production plans comprise details of all processes that are required to manufacture the good. The details comprise, for example, a list of all sequential processes involved in manufacturing a good where each process is assigned to one or more manufacturing cells 106, a list of materials required to complete each process, a list of tool pieces required to complete each process, a list of steps/specifications required of the robotic workers to complete each process, etc. Kit storage units comprising, for example, workpiece kitted bins and tool piece kitted bins are built at the kitting workstations 103, 104 and stored in the ASRS structure 101. The workpiece kitted bins containing workpieces are cycled through a picking-access port of the kitting workstation 103 or 104 to allow a human worker or a robotic worker to pick all workpieces required for each manufacturing process. The tool piece kitted bins containing tool pieces are cycled through the picking-access port of the kitting workstation 103 or 104 to allow a human worker or a robotic worker to pick all workpieces required for each manufacturing process. In an embodiment, the workpiece kitted bins and/or the tool piece kitted bins comprise cassettes, for example, foam, inserts, etc., to arrange the workpieces and/or the tool pieces depending on whether the robotic workers can handle workpieces or tool pieces. After assembly, the workpiece kitted bins and the tool piece kitted bins are stored back in the ASRS structure 101.

The CCS 131 receives production or work orders and allocates one or more manufacturing cells 106, 107 to a manufacturing process using order priority. The RSRVs 306 are routed to retrieve and transport one or more workpiece kitted bins and tool piece kitted bins to holding stations at the assigned manufacturing cell(s) 106. The RSRVs 306 are routed to retrieve and transport the workpiece supports or jigs to a jig runway of the assigned manufacturing cell(s) 100. A first robotic worker, for example, a robotic picker at the assigned manufacturing cell 106 retrieves a workpiece from the workpiece kitted bin and places the retrieved workpiece in the workpiece support or precisely positions the workpiece for assembly to another workpiece already positioned on the workpiece support. A second robotic worker, for example, a robotic process worker at the assigned manufacturing cell processes the workpiece. The actions of the robotic workers are repeated for all workpieces in the workpiece kitted bins to create assemblies and/or subassemblies. If another sequential process is required, the RSRV 30 is configured to transport the workpiece support containing the partially finished subassemblies to another preconfigured human or robotic manufacturing cell 106, 107; and/or if there is no manufacturing capacity, return the workpiece support containing the partially finished subassemblies to the ASRS structure 101 for future processing. If finished, the RSRV 306 is configured to return the workpiece support containing the finished assembly/subassembly to the ASRS structure 101.

In an embodiment, the RSRVs 306 traverse the manufacturing system 100 as follows: An RSRV 306 retrieves a needed workpiece kitted bin from the ASRS structure 101. The RSRV 306 transports the needed workpiece kitted bin to a designated empty storage location at one of the manufacturing cells 106. This RSRV 306 travels to a designated manufacturing cell 106 and picks up an unneeded workpiece kitted bin and transports the unneeded workpiece kitted bin to the ASRS structure 101 for storage. Another RSRV 306 transports a needed tool piece kitted bin to a designated empty storage location at the manufacturing cell 106. This other RSRV 306 travels to a designated manufacturing cell 106 and picks up an unneeded tool piece kitted bin and transports the unneeded tool piece kitted bin to the ASRS structure 101 for storage. In another embodiment, the same RSRV 306 that delivers the needed workpiece kitted bin to a designated manufacturing cell 106, takes away an unneeded workpiece kitted bin from that designated manufacturing cell 106. Similarly, the same RSRV 306 that delivers the needed tool piece kitted bin to the designated manufacturing cell 106, takes away an unneeded tool piece kitted bin from that designated manufacturing cell 106.

FIG. 3 illustrates a top isometric view of the three-dimensional (3D) gridded storage structure 300 defining the automated storage and retrieval system (ASRS) structure 101 of the manufacturing system 100 shown in FIGS. 1-2, according to an embodiment herein. In an embodiment, the 3D gridded storage structure 300 defining the ASRS structure 101 and the associated robotic storage/retrieval vehicles (RSRVs) 306 and storage units 303 of the manufacturing system 100 are of the type disclosed in Applicant's U.S. patent application Ser. Nos. 15/568,646, 16/374,123, 16/374,143, and 16/354,539, each of which is incorporated herein by reference in its entirety. A small-scale example of the 3D gridded storage structure 300 is illustrated in FIG. 3. As illustrated in FIG. 3, the gridded storage structure 300 comprises two-dimensional (2D) gridded track layouts 301 and 302 at a track-equipped uppermost or attic level and at a track-equipped lowermost or basement level respectively. That is, the gridded storage structure 300 comprises a gridded upper track layout 301 positioned in an elevated horizontal plane above a matching and aligned gridded lower track layout 302 positioned in a lower horizontal plane closer to a ground level. Between these aligned, gridded upper and lower track layouts 301 and 302 is a 3D array of storage locations that occupy multiple intermediate storage levels between the uppermost attic level and the lowermost basement level. Each of the storage locations in the 3D array is capable of holding a respective storage unit 303 therein. In an embodiment, the storage units 303 are of the type illustrated in FIG. 3. In other embodiments, the storage units 303 are configured as holders of different varieties or containers capable of supporting articles thereon or therein, including, bins, trays, totes, pallets, etc. The storage locations are arranged in vertical storage columns 304, in which storage locations of equal square footprint are aligned over one another. Each vertical storage column 304 is neighboured by a vertically upright shaft 305 through which the storage locations of the vertical storage columns 304 are accessible. A fleet of RSRVs 306 is configured to traverse horizontally each gridded track layout 301, 302 in two dimensions, and traverse vertically between the two gridded track layouts 301, 302 in the third dimension via the open upright shafts 305.

Each of the gridded track layouts 301, 302 comprises a set of X-direction rails 307 lying in the X-direction of the respective horizontal plane, and a set of Y-direction rails 308 perpendicularly crossing the X-direction rails 307 in the Y-direction of the same horizontal plane. The crossing X-direction rails 307 and Y-direction rails 308 define a horizontal reference grid of the 3D gridded storage structure 300, of which each horizontal grid row is delimited between an adjacent pair of the X-direction rails 307 and each horizontal grid column is delimited between an adjacent pair of the Y-direction rails 308. Each intersection point between one of the horizontal grid columns and one of the horizontal grid rows denotes a position of a respective vertical storage column 304 or a respective upright shaft 305. That is, each vertical storage column 304 and each upright shaft 305 are positioned at a respective Cartesian coordinate point of the horizontal reference grid at a respective area bound between two of the X-direction rails 307 and two of the Y-direction rails 308. Each such area bound between four rails 307 and 308 in either gridded track layout 301 or 302 is also referred to herein as a respective "spot" of the gridded track layout 301 or 302. The 3D addressing of each storage location in the 3D gridded storage structure 300 is completed by a given vertical storage column level at which a given storage location resides within the respective vertical storage column 304. That is, a 3D address of each storage location is defined by the horizontal grid row, the horizontal grid column, and the vertical storage column level of the storage location in the 3D gridded storage structure 300.

A respective upright frame member 309 spans vertically between the gridded upper track layout 301 and the gridded lower track layout 302 at each intersection point between the X-direction rails 307 and the Y-direction rails 308, thereby cooperating with the track rails 307 and 308 to define a framework of the 3D gridded storage structure 300 for containing and organizing the 3D array of storage units 303 within this framework. As a result, each upright shaft 305 of the 3D gridded storage structure 300 comprises four vertical frame members 30) spanning the full height of the upright shaft 305 at the four corners thereof. Each frame member 309 comprises respective sets of rack teeth arranged in series in the vertical Z-direction of the 3D gridded storage structure 300 on two sides of the vertical frame member 309. Each upright shaft 305, therefore, comprises eight sets of rack teeth in total, with two sets of rack teeth at each corner of the upright shaft 305, which cooperate with eight pinion wheels 311a, 311b on each of the RSRVs 306 illustrated in FIGS. 4A-4B, to enable traversal of the RSRVs 306 between the gridded upper and lower track layouts 301, 302 in an ascending direction and a descending direction through the upright shafts 305 of the 3D gridded storage structure 300.

FIG. 4A illustrates a robotic storage/retrieval vehicle (RSRV) 306 and a compatible storage unit 303 employed in the automated storage and retrieval system (ASRS) structure 101 of the manufacturing system 100 shown in FIGS. 1-2, according to an embodiment herein. Each RSRV 306 comprises a wheeled frame or chassis 310 comprising round conveyance wheels 311a and toothed pinion wheels 311b. The conveyance wheels 311a are configured for conveyance of the RSRV 306 over the gridded upper and lower track layouts 301, 302 in a track-riding mode. The toothed pinion wheels 311b are positioned inwardly of the conveyance wheels 311a for traversal of the RSRV 306 through the rack-equipped upright shafts 305 of the three-dimensional (3D) gridded storage structure 300 illustrated in FIG. 3, in a shaft-traversing mode. Each toothed pinion wheel 311b and a respective conveyance wheel 311a are part of a combined singular wheel unit, of which the entirety, or at least the conveyance wheel 311a, is horizontally extendable in an outboard direction from the RSRV 306 for use of the conveyance wheels 311a in the track-riding mode on either gridded track layout 301 or 302, and horizontally retractable in an inboard direction of the RSRV 306 for use of the toothed pinion wheels 311b in the shaft-traversing mode, where the toothed pinion wheels 311b engage with the rack teeth of the vertical frame members 309 of an upright shaft 305.

A set of four X-direction wheel units is arranged in pairs on two opposing sides of the RSRV 306 to drive the RSRV 306 on the X-direction rails 307 of either gridded track layout 301 or 302 of the 3D gridded storage structure 300. A set of four Y-direction wheel units is arranged in pairs on the other two opposing sides of the RSRV 306 to drive the RSRV 306 on the Y-direction rails 308 of either gridded track layout 301 or 302. One set of wheel units is raiseable/lowerable relative to the other set of wheel units to switch the RSRV 306 between an X-direction travel mode and a Y-direction travel mode. Raising one set of wheel units when in the outboard position seated on the gridded upper track layout 301 is also operable to lower the other set of wheel units into an engagement with the rack teeth of an upright shaft 305, after which the raised wheel units are then also shifted inboard to fit within the upright shaft 305, thereby completing transition of the RSRV 306 from the track-riding mode to the shaft-traversing mode to allow descent of the RSRV 306 through the upright shaft 305 by a driven operation of the toothed pinion wheels 311b. Similarly, lowering one set of wheel units when in the outboard position seated on the gridded lower track layout 302 is also operable to raise the other set of wheel units into an engagement with the rack teeth of an upright shaft 305, after which the lowered wheel units are then also shifted inboard, thereby completing transition of the RSRV 306 from the track-riding mode to the shaft-traversing mode to allow ascent of the RSRV 306 through the upright shaft 305 by the driven operation of the toothed pinion wheels 311b. In an embodiment, an external lifting device (not shown) in the gridded lower track layout 302 is additionally or alternatively used to aid or perform lifting of the RSRV 306 from the gridded lower track layout 302 into an overlying upright shaft 305.

Each RSRV 306 comprises an upper support platform 312 on which any storage unit 303 is receivable for carrying by the RSRV 306. The upper support platform 312 comprises a rotatable turret 313 surrounded by a stationary outer deck surface 314. The rotatable turret 313 comprises an extendable/retractable arm 315, herein referred to as a "turret arm", mounted in a diametric slot of the rotatable turret 313 and movably supported therein for linear movement into and out of a deployed position extending outwardly from the outer circumference of the rotatable turret 313.

FIG. 4B illustrates the robotic storage/retrieval vehicle (RSRV) 306 and the compatible storage unit 303 of FIG. 4A, showing an extension of the turret arm 315 of the RSRV 306 for engaging with the storage unit 303 to push or pull the storage unit 303 off of or onto the RSRV 306, according to an embodiment herein. The turret arm 315 carries a catch member 316 thereon, for example, on a shuttle movable back and forth along the turret arm 315 for engaging with mating catch features on an underside of the storage unit 303. Together with the rotatable function of the turret 313, the turret arm 315 with the catch member 316 allows pulling of the storage unit 303 onto the upper support platform 312 and pushing of the storage unit 303 off the upper support platform 312 at all four sides of the RSRV 306, thereby allowing each RSRV 306 to access a storage unit 303 on any side of any upright shaft 305 in the three-dimensional (3D) gridded storage structure 300 illustrated in FIG. 3, including fully-surrounded upright shafts 305 that are each surrounded by vertical storage columns 304 on all four sides of the upright shaft 305 to maximize storage density in the 3D gridded storage structure 300. That is, each RSRV 306 is operable in four different working positions inside any of the upright shafts 305 to access to any of the storage locations on any of the four different sides of the upright shaft 305 to deposit or retrieve a respective storage unit 303 to or from a selected storage location. In an embodiment, alternative mechanisms capable of four different working positions to enable four-sided loading and unloading of the storage units 303 are employed in place of the turret and arm combination.

In an embodiment, the framework of the 3D gridded storage structure 300 comprises a set of shelving brackets at each storage location to cooperatively form a shelf for the storage unit 303 currently stored at the storage location, whereby any given storage unit 303 can be removed from its storage location by one of the RSRVs 306 without disrupting the storage unit 303 above and below the given storage unit 303 in the same storage column 304. Similarly, the shelf defined by the set of shelving brackets allows a storage unit 303 to be returned to a prescribed storage location at any storage level in the 3D array of storage locations in the 3D gridded storage structure 300. Accordingly, through two-dimensional horizontal navigation of the gridded track layouts 301, 302, each RSRV 306 is able to access any of the upright shafts 305 and is able to travel vertically there through in an ascending direction or a descending direction in the third dimension to access any of the storage locations and deposit or retrieve a storage unit 303 therefrom. In an embodiment, the 3D gridded storage structure 300 is externally cladded around the outer perimeter thereof as illustrated in FIG. 2, where select portions of the gridded lower track layout 302 of the 3D gridded storage structure 300 are visible through uncladded entry/exit ports, for example, 127 and 128 illustrated in FIGS. 9A-9F, by which the RSRVs 306 transition between the gridded track structure 108 of the manufacturing centre 105 illustrated in FIGS. 1-2 and the gridded lower track layout 302 of the 3D gridded storage structure 300.

Figure 4C:
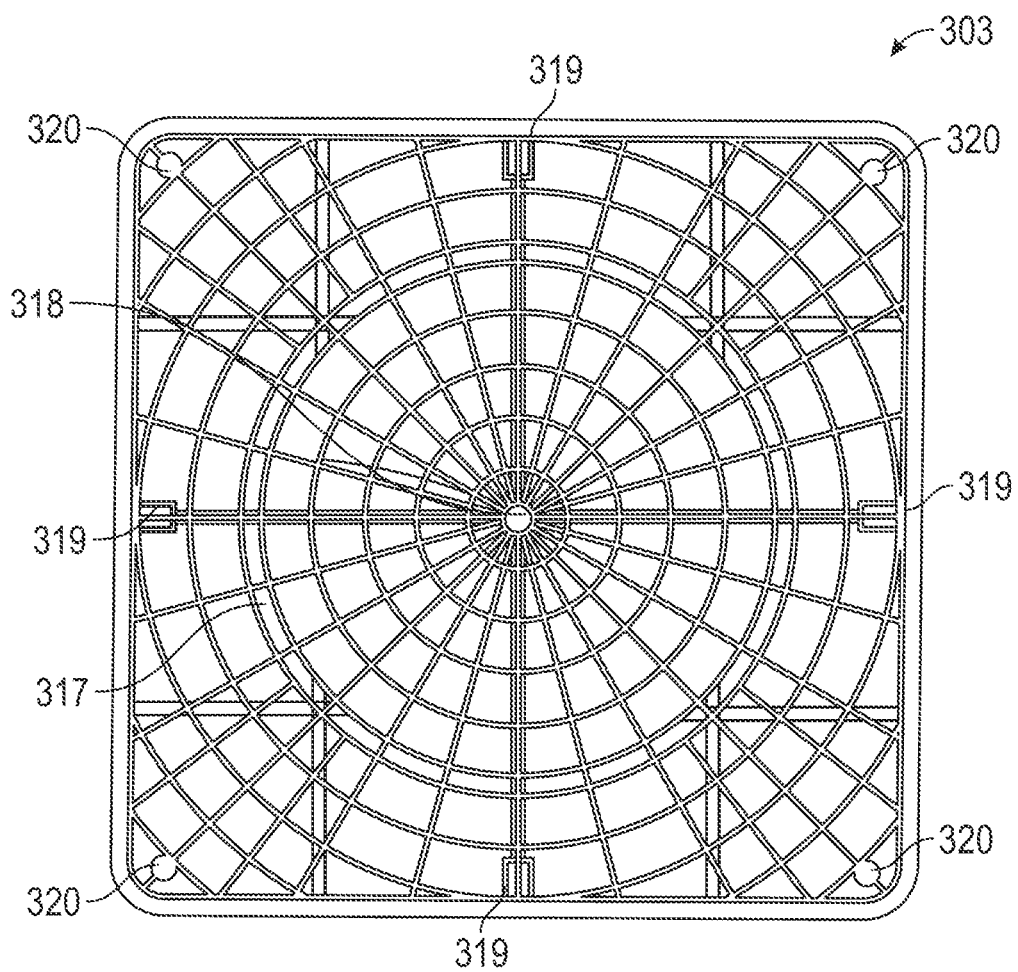
FIG. 4C illustrates a bottom plan view of the storage unit shown in FIG. 4A, according to an embodiment herein.
Figure 4D:
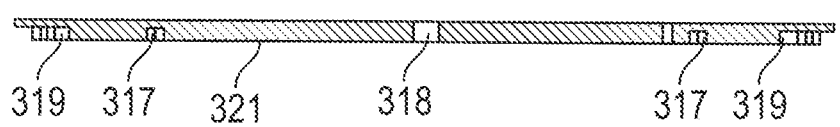
FIG. 4D illustrates a partial, cross-sectional view of the storage unit shown in FIG. 4A, showing interface features on an underside of the storage unit configured for compatibility with the RSRV shown in FIGS. 4A-4B, according to an embodiment herein.

FIG. 4C illustrates a bottom plan view of the storage unit 303 shown in FIG. 4A, according to an embodiment herein. As illustrated in FIG. 4C, a primary catch channel 317 is positioned in an underside of the bin-type storage unit 303. The primary catch channel 317 is a circular open-bottom channel that follows a 360-degree circular path around a centre point 318 of a floor panel 321 of the storage unit 303 illustrated in FIG. 4D, at an intermediate radial distance between the centre point 318 and the outer perimeter of the floor panel 321. FIG. 4D illustrates a partial, cross-sectional view of the storage unit 303 shown in FIG. 4A, showing interface features on the underside of the storage unit 303 configured for compatibility with the robotic storage/retrieval vehicles (RSRV) 306 shown in FIGS. 4A-4B, according to an embodiment herein. As illustrated in FIG. 4D, the primary catch channel 317 is recessed upwardly from a lowermost plane of the storage unit 303 to create a continuous circular slot in which the catch member 316 of the turret arm 315 of the RSRV 306 illustrated in FIGS. 4A-4B, can be received to allow loading and unloading of the storage unit 303 to and from the RSRV 306. Just inside the outer perimeter of the floor panel 321 at each of the four sides thereof, the underside of the storage unit 303 comprises a respective secondary catch recess 319 that is recessed upwardly from the lowermost plane of the storage unit 303 for selective engagement of the secondary catch recess 319 by the catch member 316 of the turret arm 315 of the RSRV 306, for example, when the catch member 316 of the turret arm 315 fails to catch the primary catch channel 317 during an attempted engagement of the storage unit 303 by the extended turret arm 315 of the RSRV 306. Each secondary catch recess 319 is a relatively small rectangular slot or cavity, located mid-way along the respective perimeter side of the floor panel 321 of the storage unit 303. The four secondary catch recesses 319 are, therefore, disposed at ninety-degree intervals from one another around the centre point 318 of the floor panel 321 of the storage unit 303 just inside the outer perimeter of the storage unit 303.

As illustrated in FIGS. 4A-4B, the rotatable turret 313 and the surrounding outer deck surface 314 of the upper support platform 312 of the RSRV 306 collectively define a square landing area atop which the storage unit 303 is seated when carried on the upper support platform 312 of the RSRV 306. This landing area is equal or nearly equal in size and shape to the underside of each storage unit 303. Accordingly, the storage unit 303 in a fully and properly seated position on the upper support platform 312 of the RSRV 306 occupies a full or near entirety of the landing area without overhanging the outer perimeter of the upper support platform 312 of the RSRV 30. Accordingly, in its properly seated position on the landing area, the entire footprint of the storage unit 303 is disposed within the outer perimeter of the upper support platform 312 or the landing area of the RSRV 306.

For the purpose of ensuring that the storage unit 303 is fully received and properly aligned on the landing area of the RSRV 306, in an embodiment, the upper support platform 312 comprises a set of load status sensors 401 positioned in close proximity to the outer perimeter of the upper support platform 312 at spaced apart positions along the outer perimeter as illustrated in FIGS. 4A-4B. In the illustrated example, the load status sensors 401 are optical sensors recessed in the outer deck surface 314 of the landing area and provided in a quantity of four. Each of the load status sensors 401 is positioned proximal to a respective one of the four outer corners of the landing area. As part of a loading routine, pulling a storage unit 303 onto the RSRV 306 from a storage location in the three-dimensional (3D) gridded storage structure 300 illustrated in FIG. 3, using retraction of the turret arm 315, a computer processor, for example, a local processor on-board the RSRV 306, communicably connected to the load status sensors 401, checks the status of the four load status sensors 401 for detected presence of the underside of the storage unit 303 above the load status sensors 401. A positive detection signal from the four load status sensors 401, therefore, confirms the presence of the storage unit 303 at the four corners of the landing area, thereby confirming that the storage unit 303 is fully received on the landing area and is in properly squared alignment on the landing area. This confirmation confirms that the primary catch channel 317 in the storage unit 303 is properly engaged by the catch member 316 of the RSRV 306. Failure to obtain a positive detection signal from all the four load status sensors 401 indicates a failed engagement of the primary catch channel 317, resulting in failure to properly load the storage unit 303 onto the RSRV 306, in response to which the turret arm 315 of the RSRV 306 is re-extended to push the failed or improperly loaded storage unit 303 back into its respective storage location, after which extraction of the storage unit 303 is reattempted. When the storage unit 303 is properly loaded onto the RSRV 306, the primary catch channel 317 allows the rotatable turret 313 to rotate underneath and relative to the storage unit 303 that sits stationary on the upper support platform 312 of the RSRV 306. In an embodiment, this relative rotation allows later offloading of the storage unit 303 to a different side of the RSRV 306 from where the storage unit 303 was loaded there onto, according to the targeted destination to which the storage unit 303 is to be offloaded from the RSRV 306.

In an embodiment, reflective optical sensors are employed in the RSRV 306 for load status detection, where light energy transmitted by an optical beam emitter of the reflective optical sensor is reflected off the underside of the storage unit 303 back to an optical receiver of the reflective optical sensor when the storage unit 303 is present over the reflective optical sensor, thereby successfully determining presence of the storage unit 303. In an embodiment, time of flight calculation, that is, a difference in time between emission of an optical pulse and detection of the reflected optical pulse, is used to differentiate between reflection off the underside of the storage unit 303 seated on the landing area of the RSRV 306 versus reflection off another surface positioned further away from the reflective optical sensor. In other embodiments, sensors of different types other than optical sensors are employed for load status detection. For example, limit switches mechanically actuated by contact with the underside of the storage unit 303, or magnetic sensors actuated by presence of cooperating magnetic elements emitting detectable magnetic fields at the underside of the storage unit 303 are employed for load status detection. Use of optical sensors preclude moving parts or need for magnetic integration or other specialized configuration of the storage units 303.

In addition to the primary catch channel 317 and the secondary catch recesses 319, the underside of the storage unit 303 illustrated in FIG. 4C comprises four protruding elements or bosses 320 disposed just inside the outer perimeter of the floor panel 321 at the four corners of the floor panel 321. The bottom ends of the bosses 320 form enlarged solid surface areas at the lowermost plane of the storage unit 303, which are otherwise largely unoccupied open spaces due to a perforated skeletal or web-like structure of the floor panel 321. These enlarged solid surface areas of the bottom ends of the bosses 320 are positioned for alignment with and detection by the set of load status sensors 401 at the corners of the upper support platform 312 of the RSRV 306 when the storage unit 303 is properly loaded in an aligned position thereon. In embodiments where the floor panel 321 is of a solid or less perforated structure, the underside of the floor panel 321 is, except for the circular primary catch channel 317 and four secondary catch recesses 319, a continuous solid surface spanning uninterruptedly from the primary catch channel 317 to outer corners of the floor panel 321, thereby omitting the need for the bosses 320 of the skeletal or web-like structure of the floor panel 321 as illustrated in FIG. 4C.

The storage arrangement of the manufacturing system 100 illustrated in FIGS. 1-2 further comprises a supply of workpieces stored within the storage locations of the 3D gridded storage structure 300 illustrated in FIG. 3, for use in manufacturing goods from the workpieces. The storage units 303 are used in the 3D gridded storage structure 300 for storing the workpieces, for example, raw materials, prefabricated components, pre-assembled subassemblies, etc., that are required by various manufacturing processes performed at the manufacturing cells 106, 107 of the manufacturing system 100 illustrated in FIGS. 1-2. In an embodiment, the storage units 303 are also used in the 3D gridded storage structure 300 for storing tool pieces that are required by robotic or human workers at the manufacturing cells 106, 107 to perform the various manufacturing processes. Storage units containing workpieces are herein referred to as "workpiece storage units", while storage units containing tool pieces are herein referred to as "tool piece storage units". In an embodiment, the workpiece storage units and the tool piece storage units are identical to each other. In another embodiment, the workpiece storage units and the tool piece storage units are not identical to each other, but share some or all of the same interface features, for example, the primary catch channel 317, the secondary catch recesses 319, and/or sensor-detectable boss surfaces 320 illustrated in FIGS. 4C-4D, by which the storage units 303 are functionality compatible with the RSRVs 306 for loading and unloading of the storage unit 303 to and from the RSRVs 306. In another embodiment, the 3D gridded storage structure 300 also stores a supply of workpiece supports, one of which is illustrated in FIGS. 5A-5C.

Figure 5A:
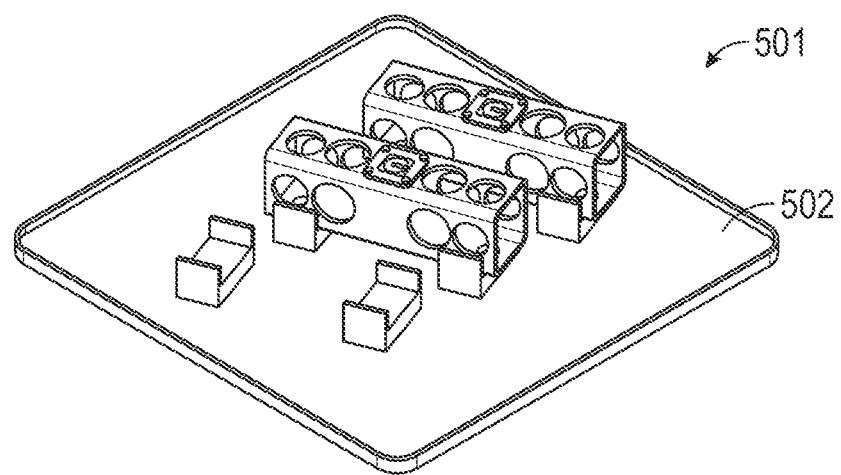
FIG. 5A illustrates a top perspective view of a workpiece support storable in the ASRS structure, according to an embodiment herein.

FIG. 5A illustrates a top perspective view of a workpiece support 501 storable in the automated storage and retrieval system (ASRS) structure 101 comprising the three-dimensional (3D) gridded storage structure 300 shown in FIGS. 1-3, according to an embodiment herein. The workpiece supports 501 are configured to provide repeatability, accuracy, and interchangeability in the manufacturing of goods or products. Each workpiece support 501 is a jig or a fixture configured to hold thereon one or more workpieces that are subject to a manufacturing process at one or more of the manufacturing cells 106 of the manufacturing centre 105 illustrated in FIGS. 1-2. Each workpiece support 501 is configured to receive and hold one or more workpieces in a particular predetermined or fixed position for allowing performance of one or more process steps of the manufacturing process on the workpiece(s). Each workpiece support 501 is configured to guide tool pieces during the manufacturing process. FIG. 5B illustrates a top plan view of the workpiece support 501 shown in FIG. 5A, according to an embodiment herein. FIG. 5C illustrates a side elevation view of the workpiece support 501 shown in FIG. 5A, according to an embodiment herein. Similar to the storage units 303, the workpiece supports 501 are stored on the shelf rails of the ASRS structure 101 and therefore have the bottom interface as the storage units 303.

Figure 5B:
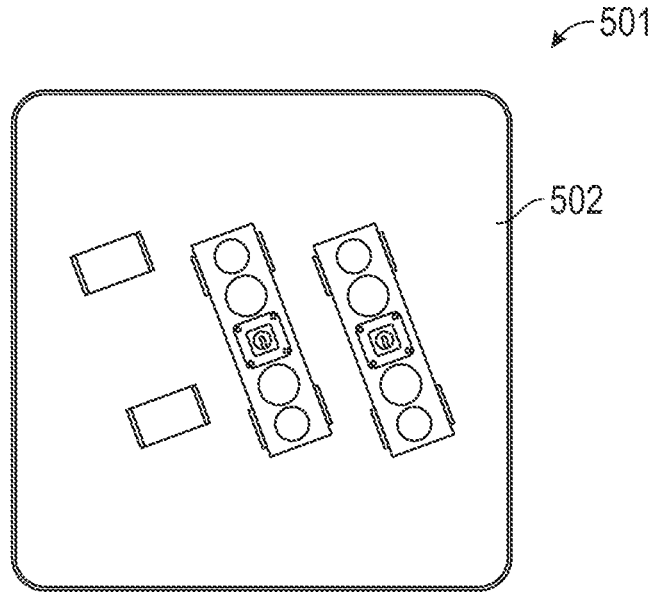
FIG. 5B illustrates a top plan view of the workpiece support shown in FIG. 5A, according to an embodiment herein.
Figure 5C:
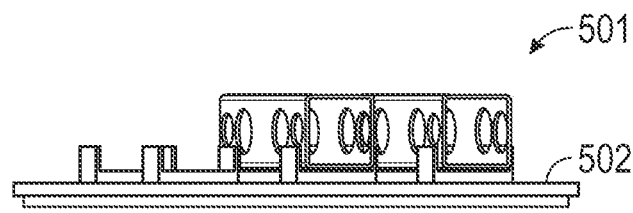
FIG. 5C illustrates a side elevation view of the workpiece support shown in FIG. 5A, according to an embodiment herein.

In an embodiment as illustrated in FIGS. 5A-5C, each workpiece support 501 comprises a standardized base panel 502 of a structure identical to all the workpiece supports and of a matching footprint and a matching or comparable underside configuration to the floor panels 321 of the storage units 303 illustrated in FIGS. 4C-4D. Each workpiece support 501 shares a matching footprint with the storage unit 303 to allow storage of each workpiece support 501 and the storage units 303 in any storage location of the ASRS structure 101. Accordingly, an underside of the base panel 502 of each workpiece support 501 comprises a primary catch channel spanning around a centre point of the base panel 502 similar to the primary catch channel 317 on the underside of the storage unit 303 illustrated in FIGS. 4C-4D. In another embodiment, the underside of the base panel 502 of each workpiece support 501 further comprises secondary catch recesses positioned closer to the outer perimeter of the base panel 502 similar to the secondary catch recesses 319 on the underside of the storage unit 303 illustrated in FIGS. 4C-4D. In another embodiment, the underside of the base panel 502 of each workpiece support 501 further comprises sensor-detectable surfaces near the corners of the base panel 502 similar to either the bottom ends of the bosses 320 of a skeletal structure at the underside of the floor panel 321 illustrated in FIG. 4C-4D or areas of a smooth continuous underside surface thereof for reading of these surfaces by load status sensors 401 of the robotic storage/retrieval vehicle (RSRV) 306 illustrated in FIGS. 4A-4B. With a footprint of equal or substantially similar area and shape to that of the storage units 303, the base panel 502 of the workpiece support 501 is configured to fit within each storage location of the ASRS structure 101 on the shelving thereof, and similarly fit atop the upper support platform 312 of each RSRV 306 illustrated in FIGS. 4A-4B, within the prescribed landing area thereof. The interface features on the underside of the workpiece support 501 are similar to that of the storage units 303 and allow compatibility of the workpiece support 501 with the RSRV 306. As each workpiece support 501 shares the same RSRV interface features as the storage units 303, each workpiece support 501 is also configured to be loaded and unloaded to and from each RSRV 306 in the same manner as the storage units 303. It will be appreciated that this shared use of matching RSRV interface features by the base panel 502 of the workpiece support 501 and each storage unit 303 allows use of the same fleet of RSRVs 306 to deposit and retrieve the workpiece supports 501 and the storage units 303 to and from the same 3D gridded storage structure 300, regardless of whether the RSRV interface features are those particularly disclosed herein for use with the turret-based RSRV 306, or are of some other configuration compatible with a variant of the RSRV 306.

Figure 6A:
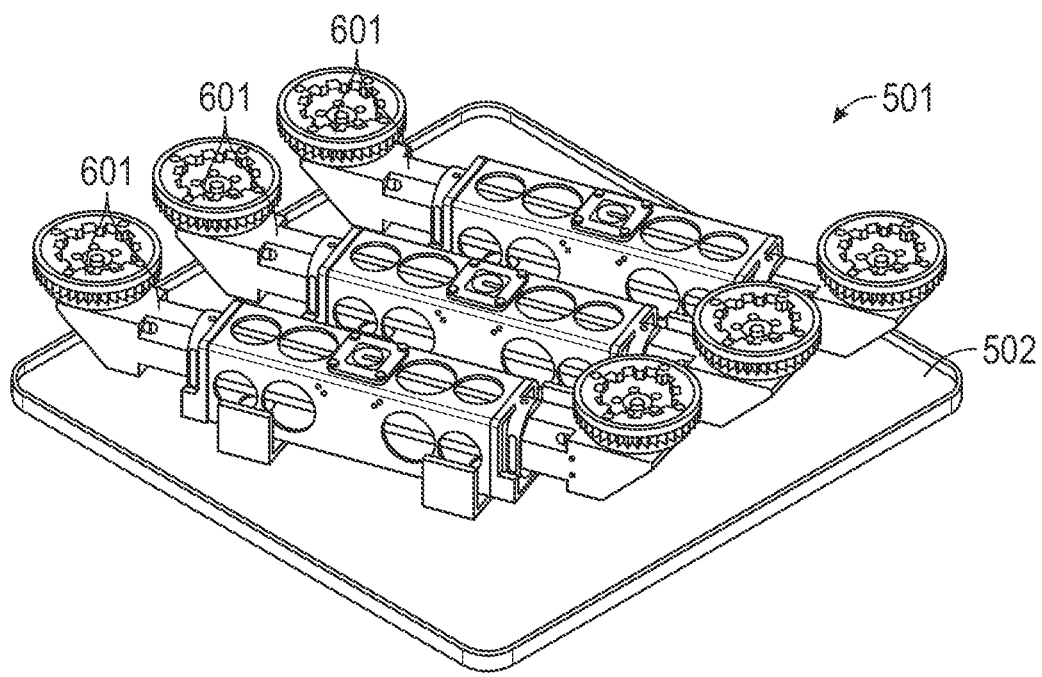
FIG. 6A illustrates a top perspective view of the workpiece support shown in FIG. 5A, showing workpieces held within the workpiece support.
Figure 6B:
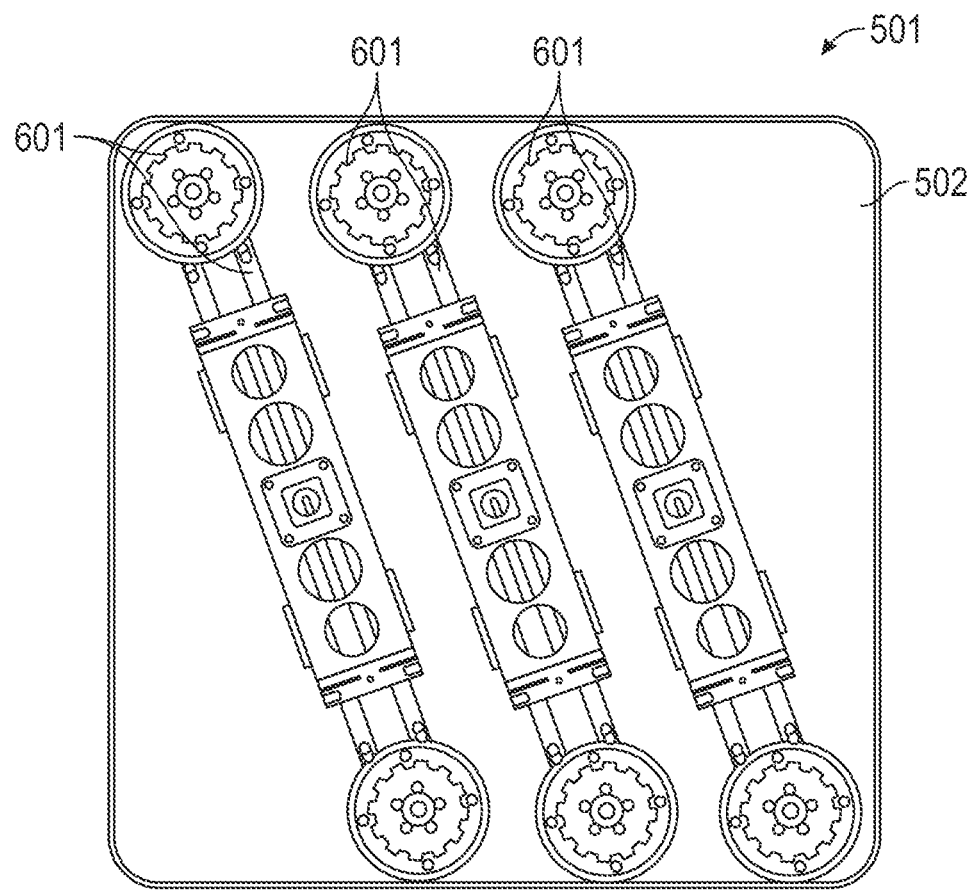
FIG. 6B illustrates atop plan view of the workpiece support with the workpieces held therein, according to an embodiment herein.

FIG. 6A illustrates a top perspective view of the workpiece support 50I shown in FIG. 5A, showing workpieces 601 held within the workpiece support 501. The workpieces 601 comprise, for example, pre-fabricated components, pre-assembled subassemblies, etc., that are required by various manufacturing processes performed at the manufacturing cells 106, 107 of the manufacturing system 100 illustrated in FIGS. 1-2. FIG. 6B illustrates a top plan view of the workpiece support 501 with the workpieces 601 held therein, according to an embodiment herein.

Figure 7:
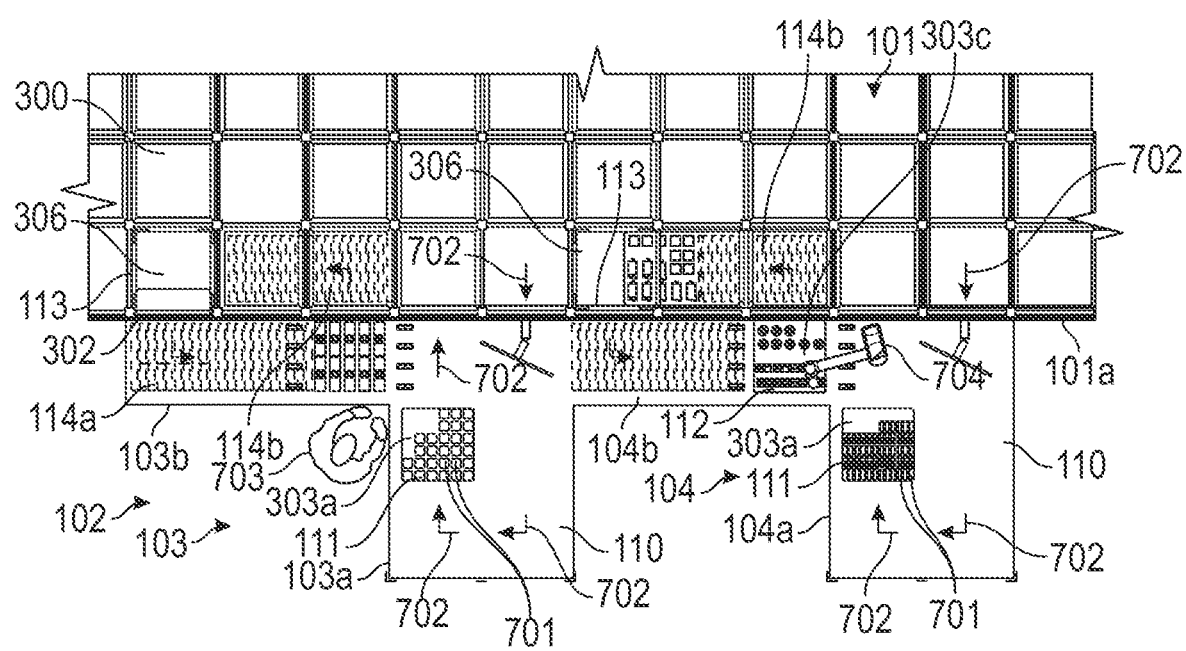
FIG. 7 illustrates a top plan view of the kitting area of the manufacturing system shown in FIGS. 1-2, according to an embodiment herein.

FIG. 7 illustrates a top plan view of the kitting area 102 of the manufacturing system 100 shown in FIGS. 1-2, according to an embodiment herein. New workpieces arriving at a manufacturing facility in full case quantities may be decanted and inducted into the three-dimensional (3D) gridded storage structure 300 illustrated in FIG. 3, that defines the automated storage and retrieval system (ASRS) structure 101, as general inventory, where multiple workpieces 701 of an identical type are transferred into a shared workpiece storage unit, herein referred to as an "inventory storage unit", from which a smaller quantity of workpieces are later pulled to compile either a workpiece storage unit 303b containing workpieces of a single type or a kit of different workpieces according to the requirements of a manufacturing process to be performed at one of the manufacturing cells 106, 107 of the manufacturing centre 105 illustrated in FIGS. 1-2. The kitted collection of different workpieces compiled from different inventory storage units 303a is placed into another storage unit, herein referred to as a "kit storage unit" to distinguish this storage unit 303c from the inventory storage units 303a containing general inventory workpieces 701 and the workpiece storage units 303b containing workpieces of a single type. The kitting process of transferring general inventory workpieces 701 from multiple inventory storage units 303a to a workpiece storage unit 303b or a kit storage unit 303c is performed at the kitting area 102 that is equipped with one or more kitting workstations 103, 104. The number of kitting workstations 103, 104 may vary in various embodiments. In an embodiment, these kitting workstations 103, 104 are identical or similar to the picking workstations of the type disclosed in Applicant's PCT Patent Application Number PCT/IB2020/054380, which is incorporated herein by reference in its entirety.

In an embodiment as illustrated in FIG. 7, each of the kitting workstations 103 and 104 is configured with an L-shaped configuration comprising a first leg 103a, 104a projecting outwardly from the perimeter side 101a of the ASRS structure 101 and a second leg 103b, 104b extending parallel to the perimeter side 101a of the ASRS structure 10t. An interior of each kitting workstation 103, 104 is enclosed and accordingly, each kitting workstation 103, 104 comprises upright outer walls that enclose the respective kitting workstation 103, 104 at the sides thereof as illustrated in FIG. 2, other than an inner side that opens into the 3D gridded storage structure 300 at the gridded lower track layout 302 thereof. Each kitting workstation 103, 104 further comprises a top cover panel 110 whose underside defines an interior ceiling of each kitting workstation 103, 104 and whose opposing topside defines an external countertop work surface.

Inside the first leg 103a, 104a is a lower track of the respective kitting workstation 103, 104. The lower track of each kitting workstation 103, 104 is an extension of the gridded lower track layout 302 of the 3D gridded storage structure 300. In an embodiment, the lower track of each kitting workstation 103, 104 is a two-way track that is two spots wide and runs perpendicular to the perimeter side of the 3D gridded storage structure 300. Similar to the gridded lower track layout 302 of the 3D gridded storage structure 300, the lower track of each kitting workstation 103, 104 comprises perpendicularly intersecting rails delimiting square spots of the lower track. A first series of spots running along on an outer side of the first leg 103a, 104a, that is, the side opposite the second leg 103b. 104b defines an outbound half of the two-way lower track of the first leg 103a, 104a, on which a robotic storage/retrieval vehicle (RSRV) 306 exits the 3D gridded storage structure 300 at the gridded lower track layout 302 thereof and travels away from the 3D gridded storage structure 300 inside the first leg 103a, 104a of the respective kitting workstation 103, 104. A second series of spots running along the opposing inner side of the first leg 103a, 104a defines an inbound half of the two-way lower track of the first leg 103a, 104a, on which the RSRV 306 can travel back into the 3D gridded storage structure 300 on the gridded lower track layout 302 thereof. This circulatory travel of RSRVs 306 out of the 3D gridded storage structure 300, through the first leg 103a, 104a of the respective kitting workstation 103, 104 and back into the 3D gridded storage structure 300 is illustrated by arrows 702 in FIG. 7.

Above an access spot on the inbound half of the lower track, a picking-access port 111 opens through the top cover panel 110 from the countertop work surface thereof into the interior space of the first leg 103a, 104a of the respective kitting workstation 103, 104. Accordingly, when an RSRV 306 travelling through the first leg 103a, 104a of the respective kitting workstation 103, 104 stops at the access spot on the inbound half of its travel there through, a human worker 703 or a robotic worker 704 of the respective kitting workstation 103, 104 standing or mounted near the corner of the L-shaped workstation 103, 104 can interact with an inventory storage unit 303a carried atop the RSRV 306 to pick one or more inventory workpieces 701 therefrom. This inventory storage unit 303a is then advanced onward from the access spot of the lower track of the respective kitting workstation 103, 104 back into the 3D gridded storage structure 300 on the gridded lower track layout 302 thereof.

The second leg 103b, 104b of the respective kitting workstation 103, 104 similarly comprises a placement-access port 112 penetrating through the top cover panel 110 of the respective kitting workstation 103, 104 from the countertop work surface thereof at a position overlying another access spot at which an initially empty workpiece storage unit or an initially empty kit storage unit is received. This placement-access port 112, therefore, allows access to the empty workpiece storage unit or the empty kit storage unit for placement therein of the inventory workpieces 701 picked from one or more inventory storage units 303a circulated past the picking-access port 111. Long term static parking of an RSRV 306 at the placement-access port 112 may be considered a wasted resource, preventing assignment of that particular RSRV 306 to other tasks in the meantime, and therefore, in an embodiment, the second leg 103b, 104b of the respective kitting workstation 103, 104 does not include a vehicle track for vehicle-carried travel of storage units through this second leg 103b, 104b of the respective kitting workstation 103, 104, instead of the vehicle track, the second leg 103b, 104b comprises an internal conveyor 114a running along the second leg 103b, 104b from a distal end thereof furthest from the first leg 103a, 104a, to the access spot underlying the placement-access port 112. An RSRV 306 unloads an empty workpiece storage unit or an empty kit storage unit onto the internal conveyor 114a from a drop-off/pickup spot 113 at the perimeter of the gridded lower track layout 302 of the 3D gridded storage structure 300, and the internal conveyor 114a of the kitting workstation 103, 104 advances the empty workpiece storage unit or the empty kit storage unit to the placement access port 112, where the inventory workpieces 701 picked from the inventory storage unit 303a are placed into the workpiece storage unit 303b or the kit storage unit 303c. Once the workpiece storage unit 303b or the kit storage unit 303c is fully compiled the filled workpiece storage unit 303b or the filled kit storage unit 303c is displaced out of the kitting workstation 103, 104 onto a return conveyor 114b that runs in a direction opposite to the direction of the internal conveyor 114a of the kitting workstation 103, 104 to transfer the filled workpiece storage unit 303b or the filled kit storage unit 303c back to the drop-off/pickup spot 113 for pickup thereat by another RSRV 306. This RSRV 306 then carries the filled workpiece storage unit 303b or the filled kit storage unit 303c into the 3D gridded storage structure 300 and deposits the filled kit storage unit 303c in an available storage location for later retrieval therefrom when required at a manufacturing cell 106 or 107 illustrated in FIGS. 1-2.

Each kitting workstation 103, 104, therefore, comprises two travel paths on which the inventory storage units 303a and the workpiece storage units 303b or the kit storage units 303c are respectively transferable through the kitting workstation 103, 104 past respective access ports 111, 112 at which the storage units 303a, 303b, 303c are accessible for picking and placement of workpieces 701 from and to the respective storage units 303a, 303b. 303c transitioning through the kitting workstation 103, 104. One travel path through the kitting workstation 103, 104 involves vehicle-carried travel of the respective storage unit 303a, 303b, 303c over an extension track of the 3D gridded storage structure 300, while the other travel path is a short conveyor-based path at which drop-off and pickup of the respective storage unit 303a, 303b, 303c is also performed by the fleet of RSRVs 306.

Figure 8A:
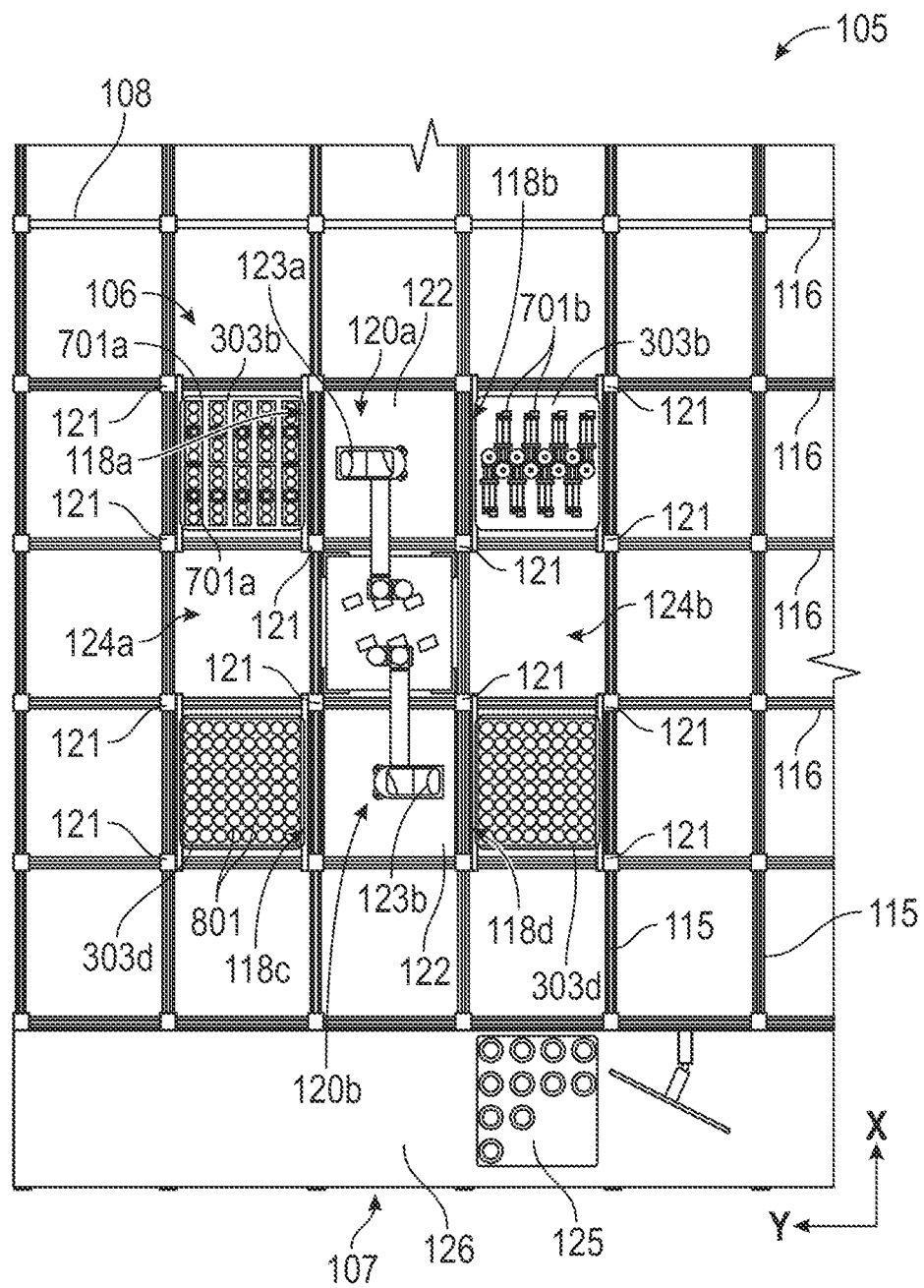
FIGS. 8A-8D illustrate partial top plan views of the manufacturing centre of the manufacturing system shown in FIGS. 1-2, showing a fully automated manufacturing cell and a neighbouring human-attended manufacturing cell, where different storage units are employed in a manufacturing workflow, according to different embodiments herein.
Figure 8B:
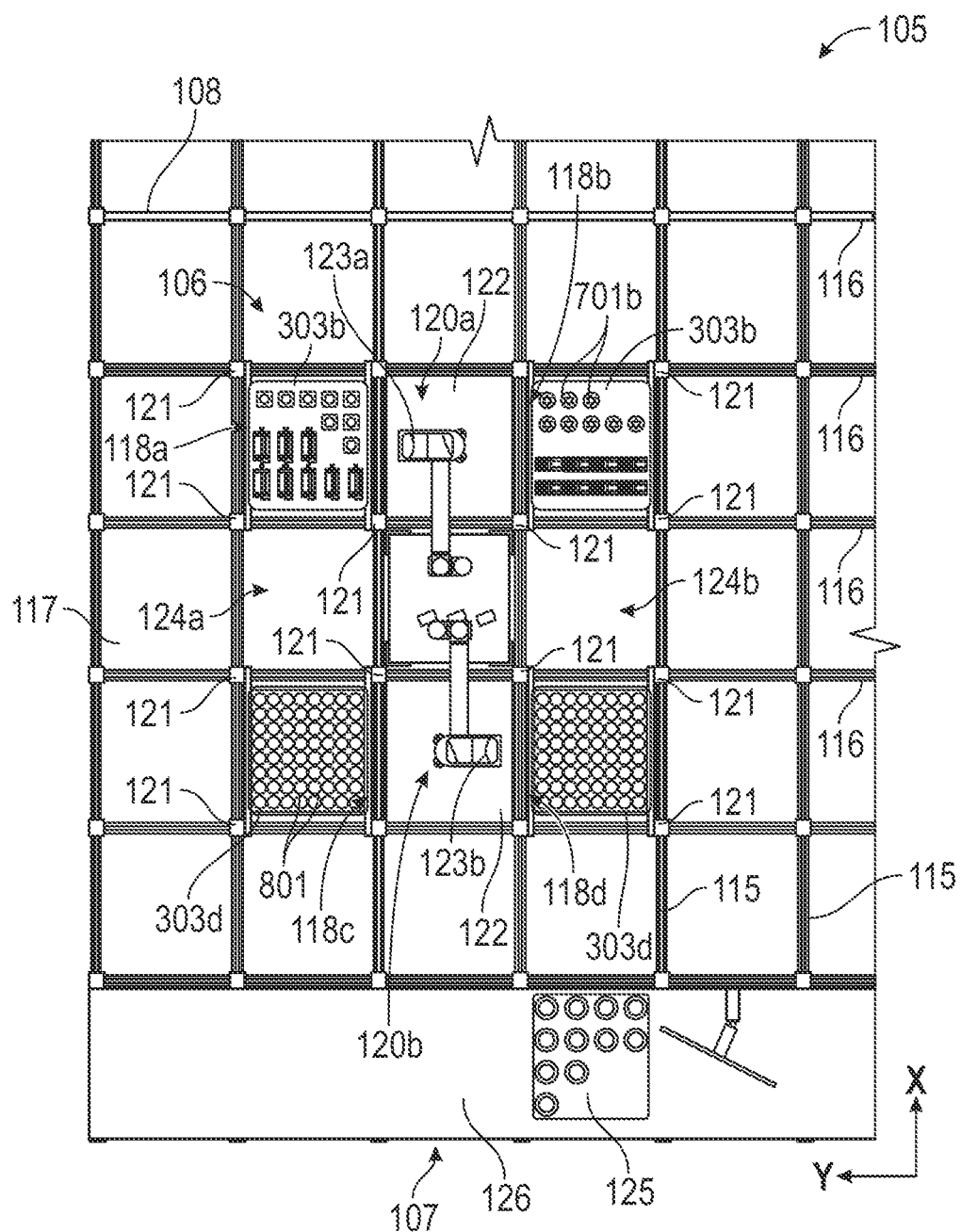
Figure 8C:
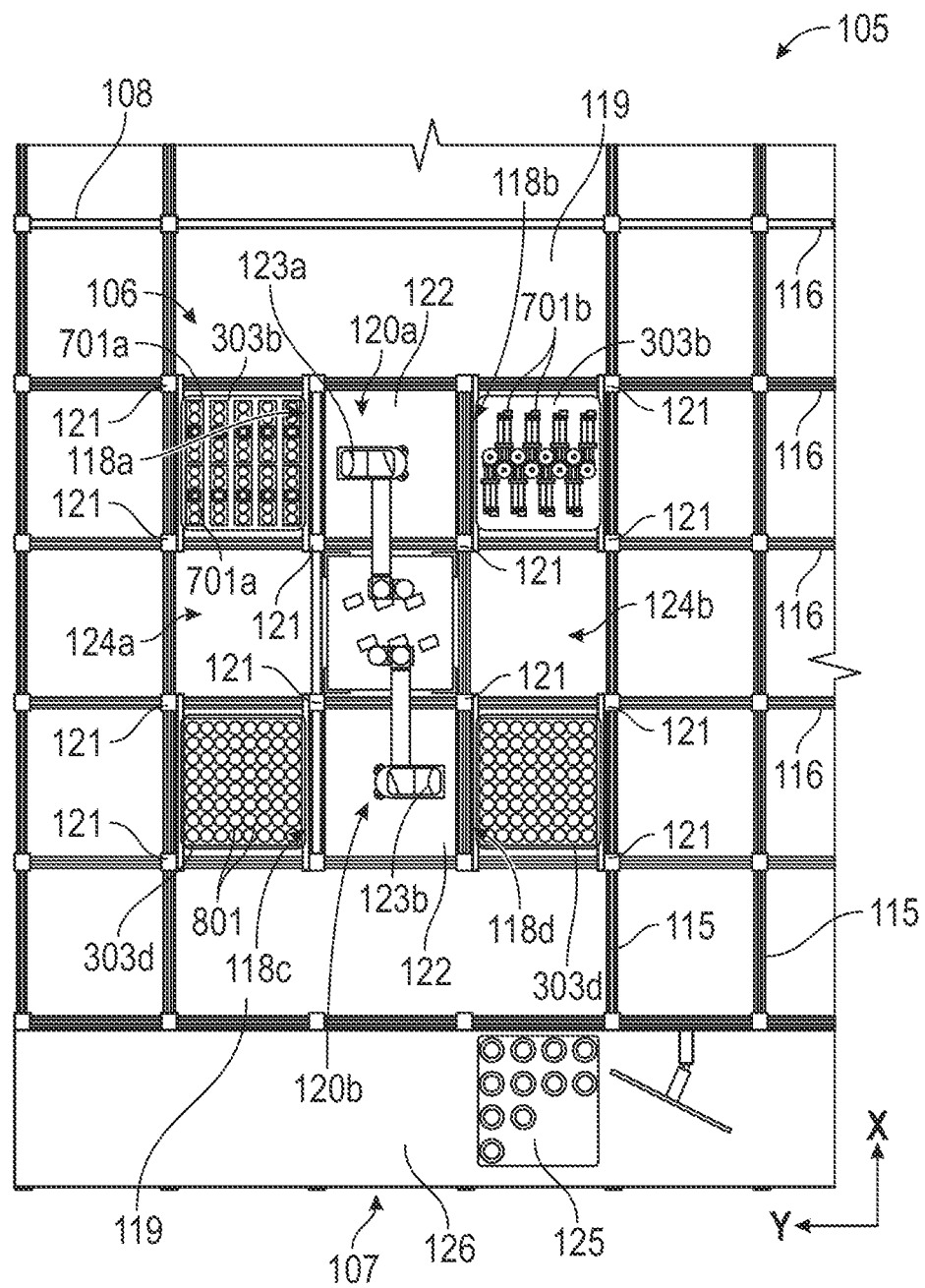
Figure 8D:
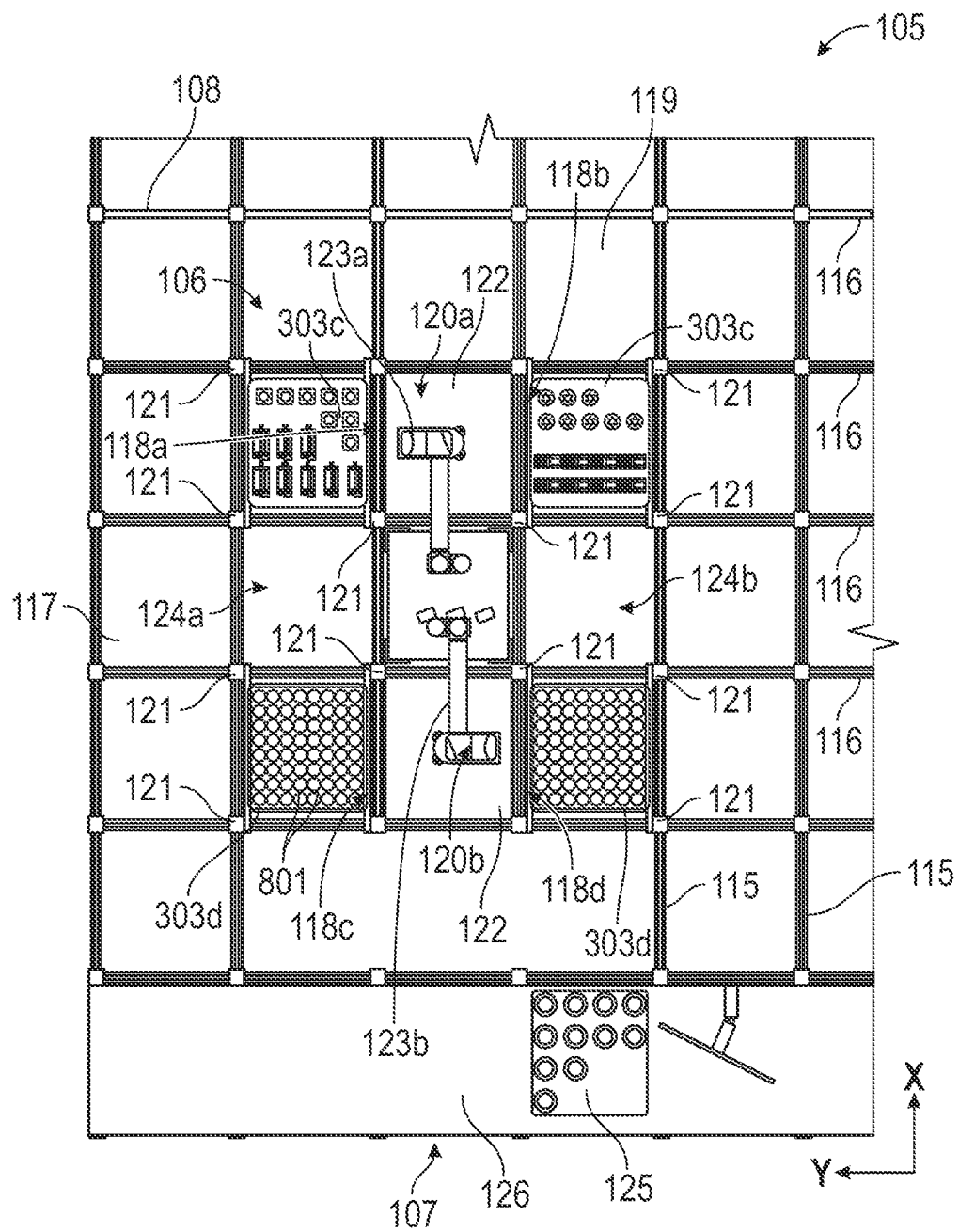

FIGS. 8A-8D illustrate partial top plan views of the manufacturing centre 105 of the manufacturing system 100 shown in FIGS. 1-2, showing a fully automated manufacturing cell 106 and a neighbouring human-attended manufacturing cell 107, where different storage units 303b, 303c, and 303d are employed in a manufacturing workflow, according to different embodiments herein. FIG. 8A and FIG. 5C illustrate workpiece storage units 303b and tool piece storage units 303d employed in the manufacturing workflow. FIG. 8B and FIG. 8D illustrate kit storage units 303c and tool piece storage units 303d employed in the manufacturing workflow.

As illustrated in FIGS. 8A-8D, the gridded track structure 108 of the manufacturing centre 105 comprises sets of intersecting rails on which the RSRVs 306 illustrated in FIG. 3 and FIGS. 4A-4B are navigable in two dimensions. Of the two sets of intersecting rails, one set of intersecting rails are extensions of corresponding rails of the gridded lower track layout 302 of the three-dimensional (3D) gridded storage structure 300 that defines the ASRS structure 101 illustrated in FIGS. 1-3. In the embodiment as illustrated in FIGS. 8A-8D, the extension rails 115 run in the X-direction of a two-dimensional (2D) reference plane shared by the gridded lower track layout 302 of the 3D gridded storage structure 300 and the gridded track structure 108 of the manufacturing centre 105, and therefore connect in-line with the X-direction rails 307 of the gridded lower track layout 302 of the 3D gridded storage structure 300. The extension rails 115 are perpendicularly intersected by cross-rails 116 of the gridded track structure 108, which in the illustrated example, run in the Y-direction of the shared 2D reference plane. The cross-rails 116, therefore, lie parallel to the Y-direction rails 308 of the gridded lower track layout 302 of the 3D gridded storage structure 300 at spaced intervals outward from the perimeter of the 3D gridded storage structure 300. The gridded track structure 108 comprises square spots 117, each of which is delimited between an adjacent pair of parallel extension rails 115 and an adjacent pair of cross-rails 116.

In an embodiment as illustrated in FIGS. 8A-8B, the spots 117 in the gridded track structure 108 are exclusively square. In another embodiment as illustrated in FIGS. 8C-8D, the spots 117 in the gridded track structure 108 are not exclusively square, as not every X-direction rail 307 in the gridded lower track layout 302 of the 3D gridded storage structure 300 has a respective extension rail 115 attached thereto. In this embodiment, while the cross-rails 116 are positioned at regular, consistent intervals, the extension rails 115 are omitted at positions that would otherwise pass through the automated manufacturing cells 106. As a result, in this embodiment, using the term column to refer to a strip-shaped area spanning the gridded track structure 108 in the X-direction thereof and having an inner width measured between two adjacent extension rails 115, the gridded track structure 108 comprises wider columns occupied by the automated manufacturing cells 106 and composed of wider rectangular spots 119, and narrower columns arranged in pairs that neighbour each wider column on opposite sides thereof. Using the term row to refer to a strip-shaped area spanning the gridded track structure 108 in the Y-direction thereof and having an inner width measured across two adjacent cross-rails 116, the gridded track structure 108 comprises uniform rows of equal width as illustrated in FIGS. 8A-8D.

In the embodiment illustrated in FIGS. 8A-8B, the gridded track structure 108 comprises a full set of extension rails 115 at regular, consistent intervals across the entire gridded track structure 108, in which all spots in the gridded track structure 108 are in a square configuration, and all columns and rows are of a uniform, equal width. Each square spot 117 denotes a reference unit of the gridded track structure 108 by which sizing of the manufacturing cells 106 and modular components thereof is measured. As exemplarily illustrated in FIGS. 8A-8D, each of the automated manufacturing cells 106 occupies a square cell space of area equal to nine square spots 117 of the gridded track structure 108. As a result, in an embodiment, the square cell space is divided into a collection of nine square subspaces. Each of the nine square spaces is equivalent in area to a square spot 117 of the gridded track structure 108.

As exemplarily illustrated in FIGS. 8A-8D, each of the automated manufacturing cells 106 comprises four modular holding stations 118a, 118b, 118c, and 118d, a first robotic worker module 120a, and a second robotic worker module 120b. The four modular holding stations 118a, 118b, 118c, and 118d occupy the four corner subspaces of the manufacturing cell 106. The first robotic worker module 120a occupies a first mid-perimeter subspace positioned between two of the corner subspaces at a first side of the square perimeter of the manufacturing cell 106. The second robotic worker module 120b occupies a second mid-perimeter subspace positioned between the other two corner subspaces at an opposing second side of the square perimeter of the manufacturing cell 106. In an embodiment, each of the holding station modules 118a-118d and the robotic worker modules 120a, 120b is a square-footprint module having a footprint area that is generally equal to a singular square subspace of the manufacturing cell 106. Accordingly, a width of each of the holding station modules 118a-118d and the robotic worker modules 120a, 120b in both the X-direction and the Y-direction does not exceed the width of a square spot 117 in the same direction, as measured between the two parallel rails at opposing sides of the square spot 117. In the embodiment illustrated in FIGS. 8A-8D, each of the holding station modules 118a-118d and the robotic worker modules 120a, 120b is a single-unit 1×1 module occupying only a single reference unit or a square spot 117 of the gridded track structure 108. In other embodiments, multi-unit or multi-spot modules are additionally or alternatively be employed, where each multi-unit or multi-spot module occupies a respective number of whole units or spots in the gridded track structure 108. For example, a dual-unit 2×1 module measuring two units wide in one dimension and measuring one unit wide in the other dimension occupies two units of the gridded track structure 108. In any case, the width of each of the holding station modules 118a-118d and the robotic worker modules 120a, 120b in either direction is generally equal to a whole number multiple of the width of any square spot 117, also referred to herein as a "unit width". For purposes of illustration, FIGS. 8A-8D show 3×3 square spots with two robotic workers 123a and 123b constituting a single manufacturing cell 106; however, the scope of the manufacturing centre 105 disclosed herein is not limited to each manufacturing cell 106 comprising 3×3 square spots with two robotic workers 123a and 123b, but may be extended to include scalable manufacturing cells with additional square spots and robotic workers in the X direction or the Y direction. For example, the manufacturing centre 105 is configured with scalable manufacturing cells 106, each comprising 3×5 square spots with four robotic workers and six storage units.

Figure 9A:
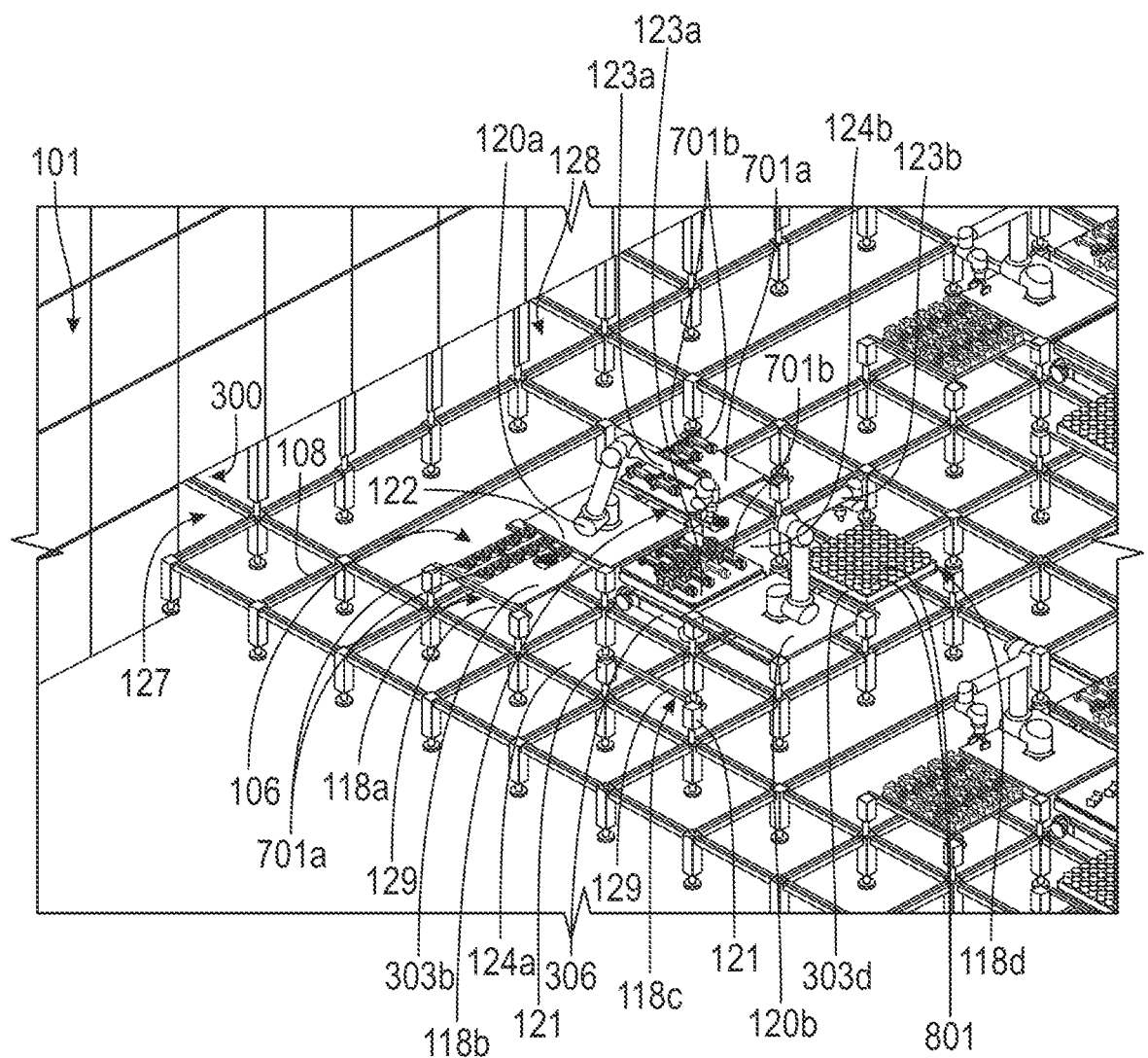
FIG. 9A illustrates a perspective view of one of the fully automated manufacturing cells of the manufacturing centre shown in FIGS. 1-2, showing a robotic picker loading a first workpiece of a first type from a first workpiece storage unit onto an RSRV-carried workpiece support, according to an embodiment herein.

In an embodiment, each modular holding station 118a, 118b, 118c, 118d is a shelving assembly sized to accommodate placement of one of the storage units 303b, 303c, and 303d thereon. As illustrated in FIG. 9A, the shelving assembly comprises a pair of parallel shelf rails 129 supported by a set of four structural supports or uprights 121. Each upright 121 is installed at the intersection of two perpendicular rails 115, 116 of the gridded track structure 108 at a respective corner of the square subspace of the manufacturing cell 106. Each shelf rail 129 runs along a respective side of the square subspace, with the distance between the two shelf rails 129 being less than the width of each square-bottomed storage unit 303b, 303c, or 303d. The open space between the two shelf rails 129 allows insertion of the turret arm 315 of an RSRV 306 illustrated in FIGS. 4A-4B, between the two shelf rails 129 to push a storage unit 303b, 303c, or 303d off the RSRV 306 onto the shelf rails 129 during drop-off of the storage unit 303b, 303c, or 303d at the manufacturing cell 106. Similarly, the space between the shelf rails 129 allows retraction of the turret arm 315 of the RSRV 306 once lowered out of engagement with the underside of the storage unit 303b, 303c, or 303d by lowering of the upper support platform 312 of the RSRV 306 illustrated in FIGS. 4A-4B, once the storage unit 303b, 303c, or 303d is seated on the shelf rails 129, thereby parking the storage unit 303b, 303c, or 303d at the manufacturing cell 106 and leaving the RSRV 306 free to perform other retrieval and delivery tasks for other manufacturing cells 106. During a later pickup of the storage unit 303b, 303c, or 303d, the reverse process comprising extending the turret arm 315 of the RSRV 306 between the shelf rails 129, raising the upper support platform 312 of the RSRV 306 to raise the extended turret arm 315 into engagement with the underside of the storage unit 303b, 303c, or 303d, and then retracting the turret arm 315 to pull the storage unit 303b. 303c, or 303d onto the upper support platform 312 of the RSRV 306, is performed. The drop-off and pick-up of the storage units 303b, 303c, and 303d at the holding stations 118a-118d is, therefore, the same as the deposit and extraction of the storage units 303b, 303c, and 303d to and from the shelving-equipped storage locations in the 3D gridded storage structure 300, as the shelving brackets in the vertical storage columns 304 of the 3D gridded storage structure 300 are spaced equivalently to the shelf rails 129 of the holding stations 118a-118d.

In an embodiment as exemplarily illustrated in FIG. 8A and FIG. 8C, the two modular holding stations 118a, 118b on opposite sides of the first robotic worker module 120a are designated as first and second workpiece holding areas to which workpiece storage units 303b are delivered by the RSRVs 306 to supply the manufacturing cell 106 with workpieces 701a, 701b of two types required for a manufacturing process at the manufacturing cell 106. In another embodiment as exemplarily illustrated in FIG. 8B and FIG. HD, the two modular holding stations 118a, 118b on opposite sides of the first robotic worker module 120a are designated as first and second workpiece holding areas to which kit storage units 303c are delivered by the RSRVs 306 to supply the manufacturing cell 106 with particular combinations of workpieces required for a manufacturing process at the manufacturing cell 106. The other two modular holding stations 118c, 118d on opposite sides of the second robotic worker module 120b are designated as first and second tool holding areas to which tool piece storage units 303d are delivered by the RSRVs 306 to supply the manufacturing cell 106 with the particular set of tool pieces 801 required for the manufacturing process at the manufacturing cell 106. The first workpiece holding area and first tool holding area are designated as a first paired set of holding areas for supplying workpieces 701a, 701b and tool pieces 801 to a first manufacturing process to be performed at the manufacturing cell 106, while the second workpiece holding area and second tool holding area are designated as a second paired set of holding areas for supplying workpieces 701a, 701b and tool pieces 801 to a different second manufacturing process to be performed at the manufacturing cell 106.

Each of the robotic worker modules 120a, 120b comprises a mounting base 122 of a square or rectangular shape defining the single-spot or multi-spot footprint of the respective robotic worker module 120a, 120b that does not exceed beyond the boundaries of the assigned subspace(s) of the manufacturing cell 106 at which the respective robotic worker module 120a, 120b is installed. In an embodiment, the mounting base 122 is suspended between a set of four uprights 121 at the four corners of the assigned subspace or subspaces. In an embodiment as illustrated in FIGS. 8A-8D, where each robotic worker module 120a, 120b is neighboured by two holding stations 118a, 118b or 118c, 118d at the immediately adjacent subspaces of the manufacturing cell 106, each robotic worker module 120a, 120b shares two uprights 121 with each of the two neighbouring holding stations 118a, 118b or 118c, 118d. A robotic worker 123a, 123b, for example, in the form of a multi-axis articulated robot arm, is positioned atop the mounting base 122. In an embodiment, the robotic worker 123a of the first robotic worker module 120a is used as a robotic picker for picking workpieces 701a, 701b from the holding stations 118a, 118b at the two workpiece holding areas that neighbour the robotic worker module 120a. The robotic worker 123b of the second robotic worker module 120b is used as a robotic process worker for performing manufacturing process steps on the workpieces 701a, 701b picked by the robotic picker 123a. The robotic process worker 123b is of a type whose tool support comprises an automatic tool-exchange interface capable of selective coupling of different tool pieces 801 thereto to allow performance of different manufacturing process steps using the different tool pieces 801. The robotic process worker 123b can, therefore, select and attach the necessary tool piece 801 for a particular process step to be performed on one or more workpieces 701a, 701b from either one of the two sets of tool pieces 801 held in the tool piece storage units 303d parked atop the modular holding stations 118c, 118d at the two tool holding areas that neighbour the robotic worker module 120b.

As illustrated in FIGS. 8A-8D, the holding stations 118a-118d and the robotic worker modules 120a and 120b occupy six of the nine subspaces of the manufacturing cell 106 at opposite sides thereof. A remaining three of the subspaces remain unoccupied between the two sets of occupied subspaces. Of these three unoccupied subspaces, a central subspace between the two robotic worker modules 120a and 120b defines a working area of the manufacturing cell 106, at which an RSRV 306 carrying a workpiece support 501 can be parked to position the workpiece support 501 in a working position between the two robotic workers 123a, 123b for access by the robotic workers 123a, 123b. This working position of the workpiece support 501 allows one or more workpieces 701a, 701b from either workpiece holding area to be placed on the workpiece support 501 by the robotic picker 123a in a prescribed position and orientation according to one or more manufacturing process steps that are to be then performed on the supported workpiece(s) by the robotic process worker 123b using the appropriate tool piece(s) 801 automatically selected and attached by the robotic process worker 123b from among the sets of tool pieces held at the tool holding stations 118c, 118d. The other two unoccupied subspaces of the manufacturing cell 106 are mid-perimeter subspaces 124a, 124b that are each left open between one of the workpiece holding areas and one of the tool holding areas at a respective side of the manufacturing cell 106. The three unoccupied subspaces form a through-path by which the RSRV 306 carrying the workpiece support 501 travels through the manufacturing cell 106 from one side thereof to the other, pausing partway there through at the central subspace to accommodate placement and processing of the workpieces 701a, 701b on the workpiece support 501. FIG. 8A and FIG. 8C illustrate the manufacturing cell 106 when two workpiece storage units 303b containing workpieces 701a and 701b of two types are used in the manufacturing process, according to an embodiment herein. In this embodiment, multiple workpiece storage units 303b are stored, retrieved, and delivered to the manufacturing cell 106. Furthermore, there is one tool piece storage unit 303d for each workpiece storage unit 303b in the manufacturing cell 106. The workpiece storage units 303b are retrieved from the 3D gridded storage structure 300 and delivered and used in a sequence of assembly steps at the manufacturing cell 106. FIG. 8B and FIG. 8D illustrate the manufacturing cell 106 when two kit storage units 303c containing particular combinations of workpieces of different types are used in the manufacturing process, according to an embodiment herein. In an example, the kit storage unit 303c on the right side illustrated in FIG. 8B and FIG. 8D is the storage unit currently being assembled, while the kit storage unit 303c on the left side is the storage unit used in a subsequent manufacturing process.

FIG. 9A illustrates a perspective view of one of the fully automated manufacturing cells 106 of the manufacturing centre 105 shown in FIGS. 1-2, showing a robotic picker 123a loading a first workpiece 701a of a first type from a first workpiece storage unit 303b onto an RSRV-carried workpiece support 501, according to an embodiment herein. As illustrated in FIG. 9A, an RSRV 306 carrying a workpiece support 501 can exit the ASRS structure 101 comprising the three-dimensional (3D) gridded storage structure 300 at an uncladded exit port 127 through which the RSRV 306 rides from the gridded lower track layout 302 of the 3D gridded storage structure 300 onto the gridded track structure 108 of the manufacturing centre 105, and can then ride along the gridded track structure 108 to a manufacturing cell 106 for which the workpiece support 501 is destined. The RSRV 306 enters the through-path of the manufacturing cell 10 at the mid-perimeter subspace 124a at one side of the manufacturing cell 106, parks at the central subspace of the manufacturing cell 106 until the workpieces 701*a*, 701*b* have been placed and processed on the workpiece support 501, and then departs the manufacturing cell 106 via the mid-perimeter subspace 124*b* at the opposing side of the manufacturing cell 106. The RSRV 306 transports the workpiece support 501 and the processed workpiece(s) thereon back into the 3D gridded storage structure 300 for storage in a storage location thereof through an uncladded re-entry port 128 at which the RSRV 306 rides from the gridded track structure 108 of the manufacturing centre 105 onto the gridded lower track layout 302 of the 3D gridded storage structure 300.

Figure 10:
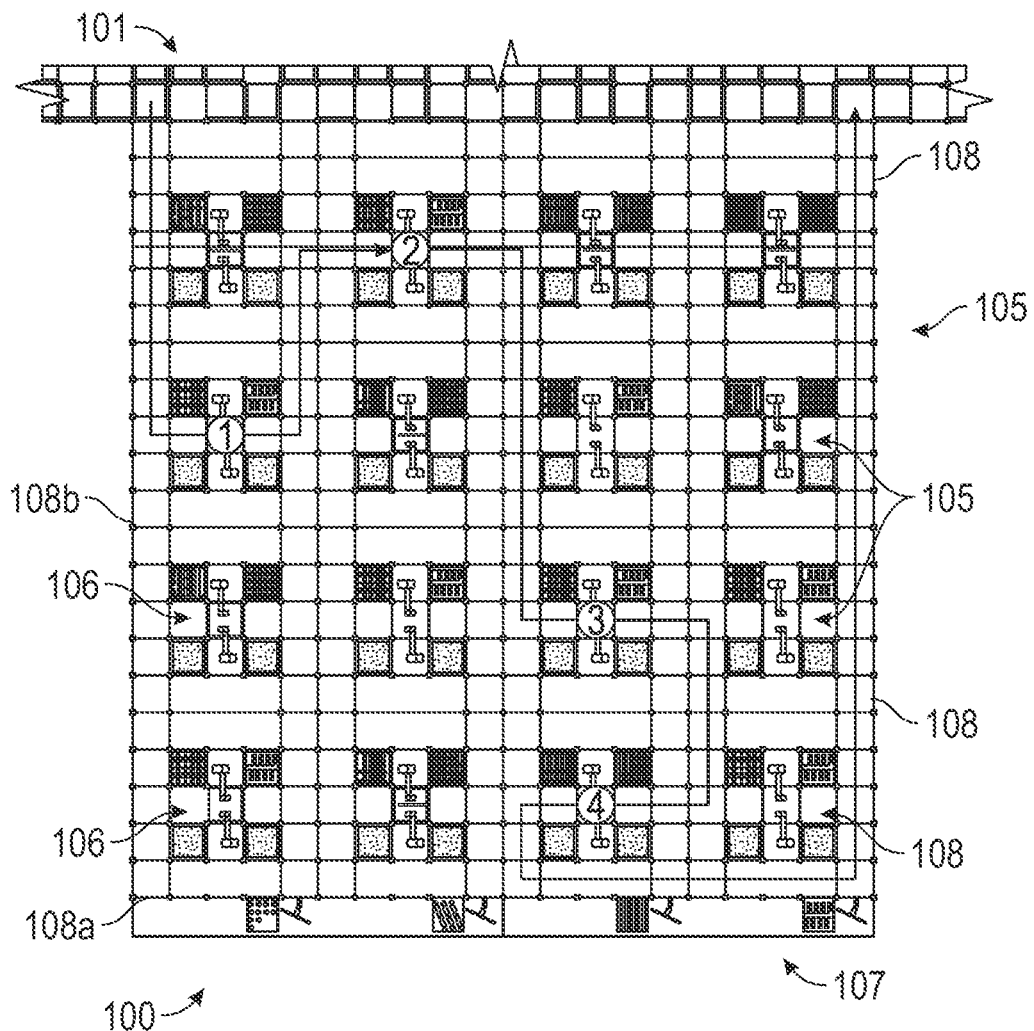
FIG. 10 illustrates a top plan view of the manufacturing centre shown in FIGS. 1-2, showing an example of a multi-stop path traversed by one of the RSRVs to move a workpiece support through multiple manufacturing stages at various manufacturing cells in the manufacturing centre, according to an embodiment herein.

In an embodiment as illustrated in FIG. 10, upon exit from the current manufacturing cell 106, the RSRV 306 can travel onward to another manufacturing cell 106 at which additional workpieces may be added to the workpiece support 501 and the previously processed workpiece(s) thereon. In an embodiment, this routing of the RSRV 306 through multiple manufacturing cells 106 is repeated, until a finished good, for example, a finished product or a finished subassembly is manufactured by the series of manufacturing processes performed at the multiple manufacturing cells 106, at which time the finished product or the finished subassembly is returned into the 3D gridded storage structure 300 and deposited at a respective storage location therein.

The particular size of the manufacturing cell 106 disclosed herein and the number, type and layout of modular components and unoccupied spaces therein illustrated in FIGS. 9A-9F are provided as an example and may vary. The modularity of the components of the manufacturing cell 106 relative to the square-unit gridded track structure 108 allows a large degree of flexibility to customize and reorganize any of the manufacturing cells 106 according to new or changing needs of a manufacturing facility. In an embodiment, two workpiece holding areas are provided in each manufacturing cell 106 to minimize unproductive time at the manufacturing cell 106, as disclosed in the exemplary manufacturing scenario below.

As illustrated in FIG. 9A, the first workpiece holding station 118*a* holds multiple workpieces 701*a* of a first type, for example, type A, and the second workpiece holding station 118*b* holds multiple workpieces 701*b* of a different second type, for example, type B. As illustrated in FIG. 9A, the robotic picker 123*a* has already placed workpieces 701*a* of type A and workpieces 701*b* of type B from the respective workpiece storage units 303*b* onto the RSRV-carried workpiece support 501 parked at the central subspace of the manufacturing cell 106, and is shown placing another workpiece 701*a* of type A from the first set onto the workpiece support 501. In the example illustrated in FIG. 9A, the workpiece support 501 is configured to hold multiple workpieces 701*a* of type A in a prescribed orientation suitable for joining of workpieces 701*b* of type B to respective workpieces 701*a* of type A. Once the required number of workpieces 701*a* of type A has been placed on the workpiece support 501, an empty RSRV 306 can travel from the 3D gridded storage structure 300 to the manufacturing cell 106 through the exit port 127, pick up the now-unneeded workpiece storage unit 303*b* from the first holding station 118*a* as illustrated in FIG. 9B, and return the workpiece storage unit 303*b* to the 3D gridded storage structure 303*d* through re-entry port 128.

Figure 9B:
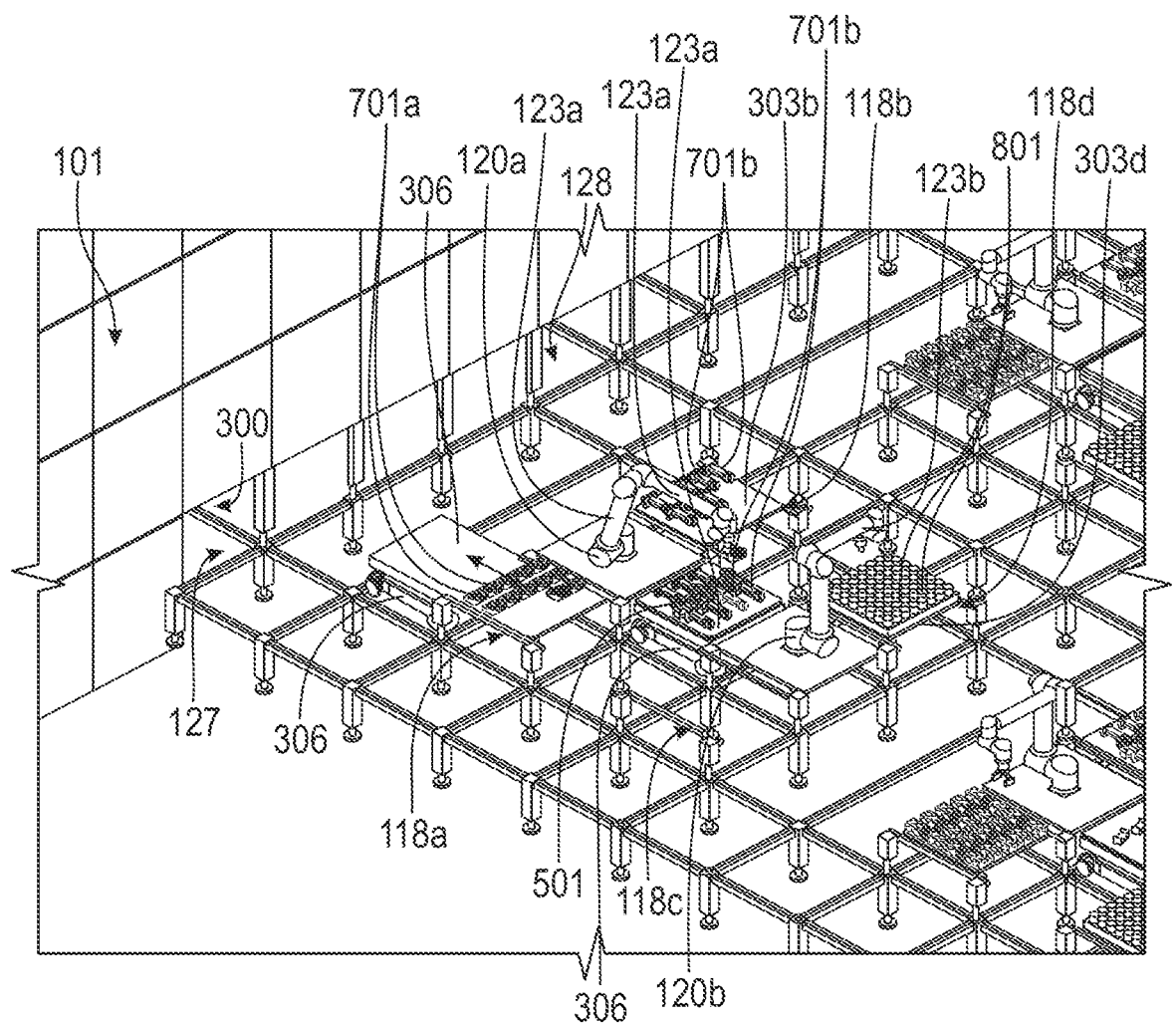
FIG. 9B illustrates a perspective view of the manufacturing cell, showing the robotic picker loading a second workpiece of a second type from a second workpiece storage unit onto the RSRV-carried workpiece support for attachment to the first workpiece of the first type on the RSRV-carried workpiece support by a robotic process worker, and an RSRV removing the first workpiece storage unit containing leftover workpieces of the first type to prepare the manufacturing cell for a different subsequent manufacturing process, according to an embodiment herein.

FIG. 9B illustrates a perspective view of the manufacturing cell 16, showing the robotic picker 123*a* loading a second workpiece 701*b* of type B from a second workpiece storage unit 303*b* onto the RSRV-carried workpiece support 501 for attachment to the first workpiece 701*a* of type A on the RSRV-carried workpiece support 501 by the robotic process worker 123*b*, and an RSRV 306 removing the first workpiece storage unit 303*b* containing leftover workpieces 701*a* of type A to prepare the manufacturing cell 106 for a different subsequent manufacturing process, according to an embodiment herein. During this pickup of the now-unneeded workpiece storage unit 303*b* from the first workpiece holding station 118*a*, the robotic picker 123*a* picks a workpiece 701*b* of type B from the second workpiece holding station 118*b*, transfers the workpiece 701*b* of type B over to the workpiece support 501 parked at the central subspace of the manufacturing cell 106, and places or holds the workpiece 701*b* of type B in a prescribed position and orientation to one of the already-placed workpieces 701*a* of type A for attachment thereto. In the meantime, the robotic process worker 123*b* selects and self-attaches a prescribed tool piece 801 from a tool piece storage unit 303*d* parked on the tool holding station 118*d* at one of the tool holding areas.

Figure 9C:
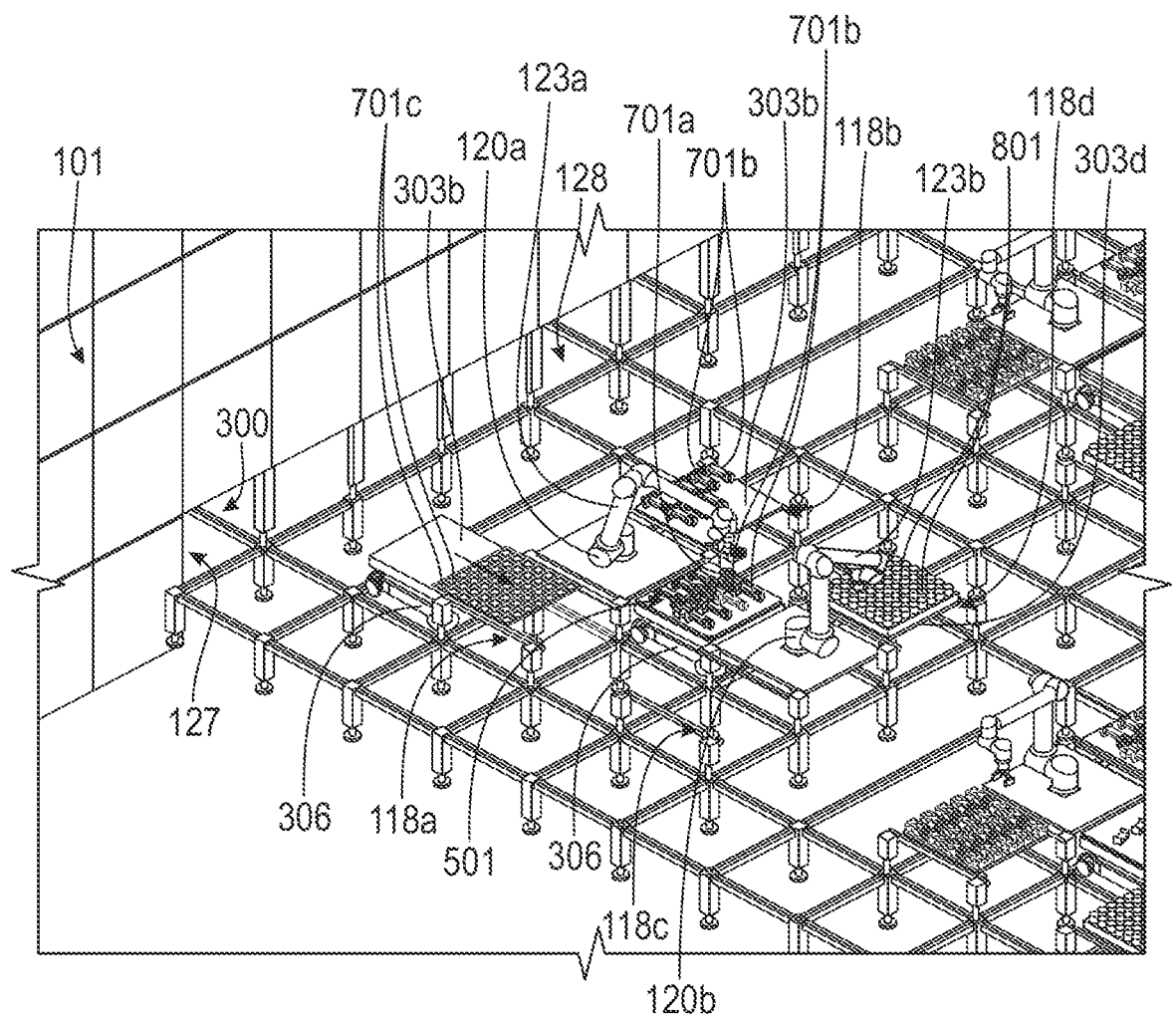
FIG. 9C illustrates a perspective view of the manufacturing cell, showing an RSRV delivering a third workpiece storage unit containing workpieces of a third type to the manufacturing cell to replace the removed workpiece storage unit, while the robotic process worker is picking an automatically selected tool piece from a tool piece storage unit for joining the second workpiece to the first workpiece on the RSRV-carried workpiece support, according to an embodiment herein.

FIG. 9C illustrates a perspective view of the manufacturing cell 106, showing an RSRV 306 delivering a third workpiece storage unit 303*b* containing workpieces 701*c* of a third type, for example, type C, to the manufacturing cell 106 to replace the removed workpiece storage unit 303*b*, while the robotic process worker 123*b* is picking an automatically selected tool piece 801 from the tool piece storage unit 303*d* for joining the second workpiece 701*b* of type B to the first workpiece 701*a* of type A on the RSRV-carried workpiece support 501, according to an embodiment herein. The robotic process worker 123*b* uses the attached tool piece 801 to join the workpiece 701*b* of type B being held by the robotic picker 123*a* to one of the workpieces 701*a* of type A previously placed on the workpiece support 501, while another RSRV 306 delivers the third workpiece storage unit 303*b* containing the workpieces 701*c* of type C to the first workpiece holding station 118*a* that was previously occupied by the now-removed workpiece storage unit 303*b*. In an embodiment, kit storage units that are assembled by kitting operations at the kitting area 102 of the manufacturing system 100 illustrated in FIGS. 1-2 and FIG. 7, are configured to contain particular combinations of workpieces of various types needed for a particular manufacturing process to preclude retrieval and delivery of multiple workpiece storage units 303*b* to a manufacturing cell 106 for a single manufacturing process.

Figure 9D:
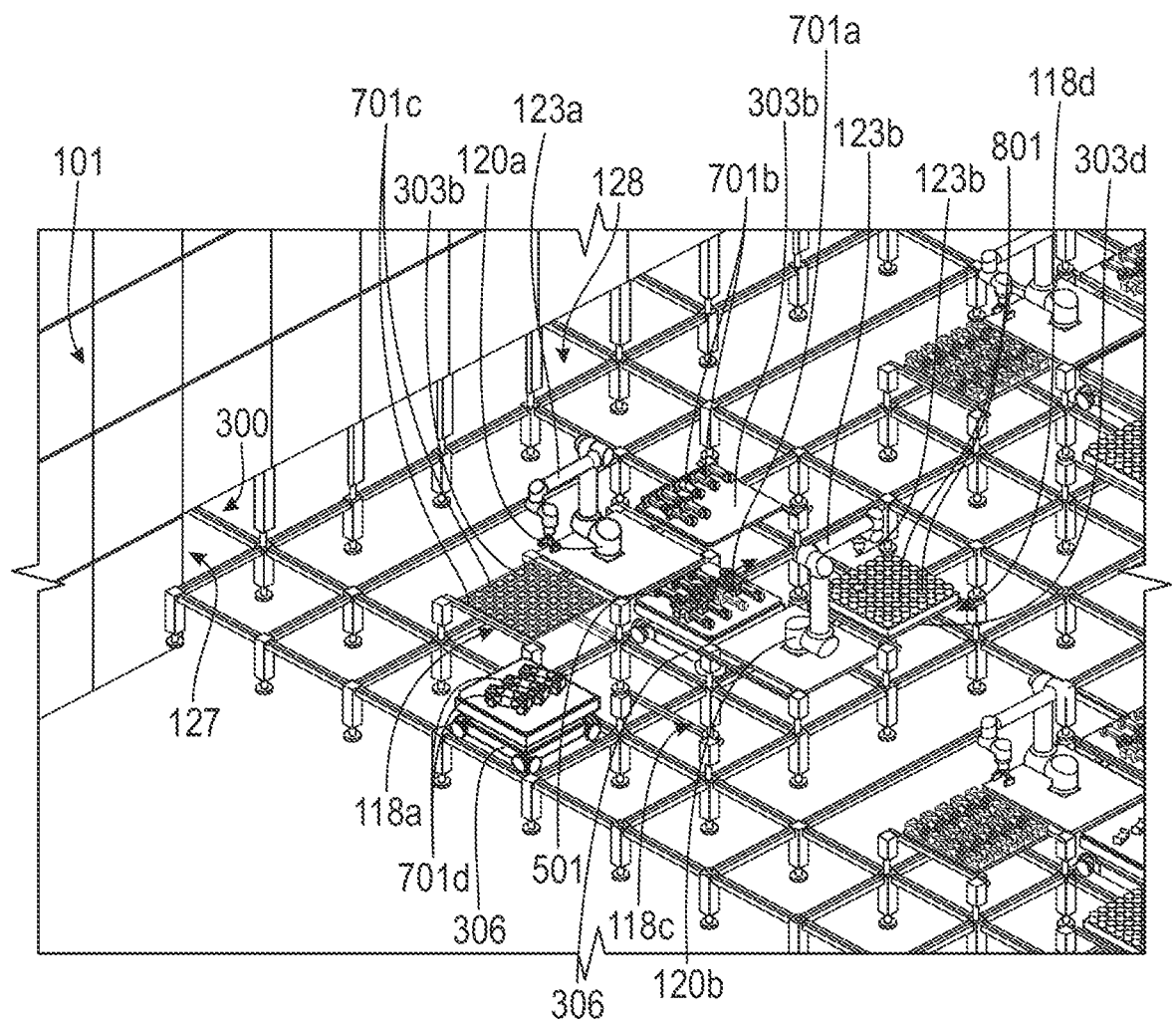
FIG. 9D illustrates a perspective view of the manufacturing cell, showing completed subassemblies of the joined first and second workpieces departing the manufacturing cell on the RSRV-carried workpiece support, and a new workpiece support carrying workpieces of a fourth type delivered on another RSRV for assembly thereof with the workpieces of the third type during the subsequent manufacturing process, according to an embodiment herein.

FIG. 9D illustrates a perspective view of the manufacturing cell 106, showing completed subassemblies of the joined first and second workpieces 701*a* and 701*b* departing the manufacturing cell 106 on the RSRV-carried workpiece support 501, and a new workpiece support 501 carrying workpieces 701*d* of a fourth type, for example, type D, delivered on another RSRV 306 for assembly thereof with the workpieces 701*c* of type C during the subsequent manufacturing process, according to an embodiment herein. FIG. 9D illustrates the workpiece support 501 as now holding subassemblies, each comprising workpieces 701*b* of type B having been joined to respective workpieces 701*a* of type A by the above disclosed cooperation of the two robotic workers 123*a*, 123*b*. The workpiece support 501 and the subassemblies thereon are driven out of the manufacturing cell 106 by the RSRV 306 on which the workpiece support 501 is carried, while another RSRV 306 carrying multiple workpieces 701*d* of type D from the 3D gridded storage structure 300 arrives at the manufacturing cell 106 from which the subassemblies are departing. In an embodiment, the departing workpiece support 501 and the subassemblies thereon are carried by the RSRV 306 into the 3D gridded storage structure 300 for storage. In another embodiment, the departing workpiece support 501 and the subassemblies thereon are carried onward by the RSRV 306 to another manufacturing cell 106 for further processing. The workpieces 701c of type C from the third workpiece storage unit 303b parked on the first workpiece holding station 118a are then placed or held in suitable relation to the workpieces 701d of type D by the robotic picker 123a, while the robotic process worker 123b changes tool pieces, if necessary, at the tool piece holding station 118d, and then performs a joining process to join the workpieces 701d of type D to the workpieces 701c of type C.

Figure 9E:
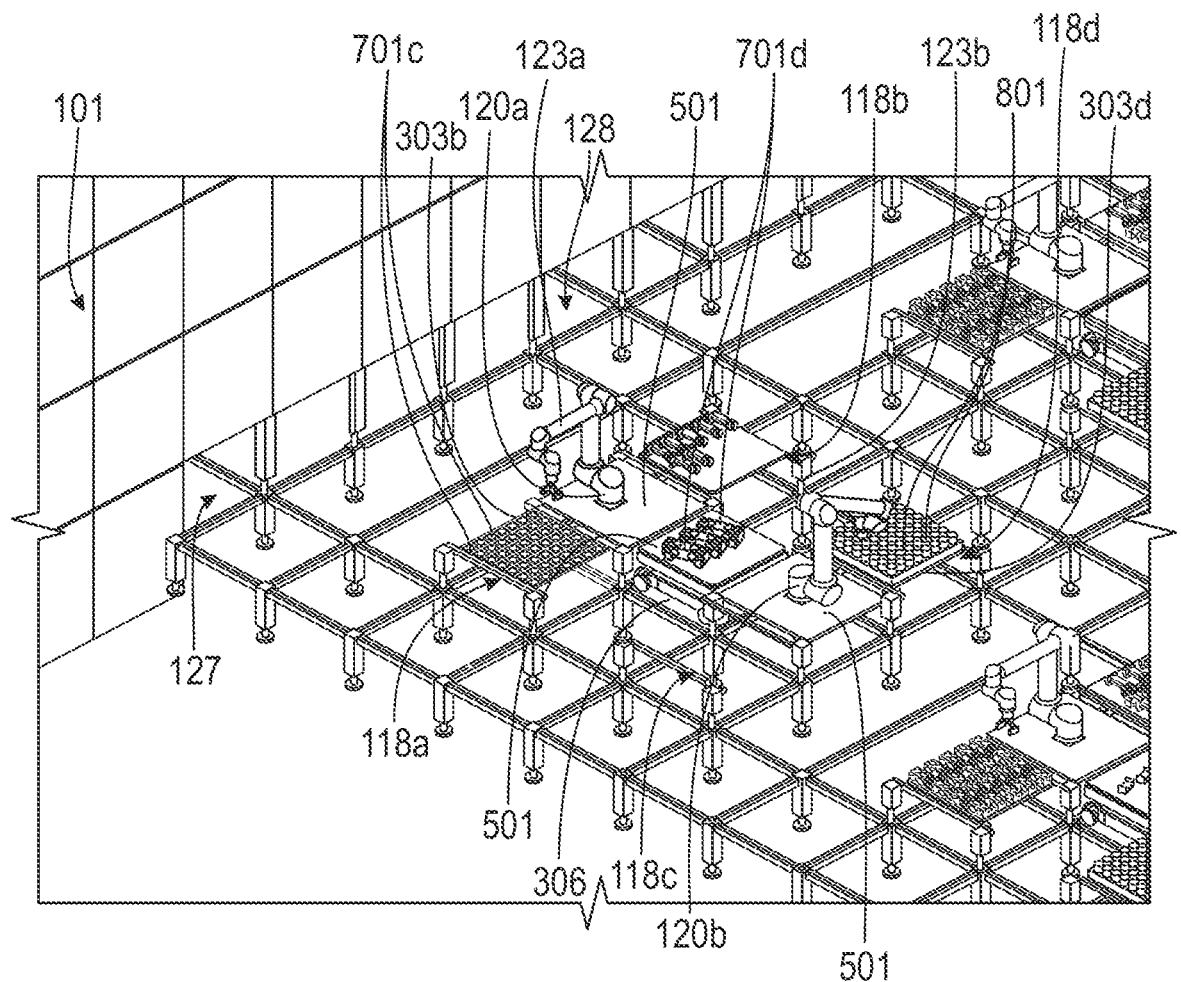
FIG. 9E illustrates a perspective view of the manufacturing cell, showing the robotic picker loading a third workpiece of a third type from the third workpiece storage unit onto the new RSRV-carried workpiece support, while the robotic process worker is picking an automatically selected tool piece from the tool piece storage unit for joining the third workpiece to the fourth workpiece on the new RSRV-carried workpiece support, according to an embodiment herein.

FIG. 9E illustrates a perspective view of the manufacturing cell 106, showing the robotic picker 123a loading a third workpiece 701c of type C from the third workpiece storage unit 303b onto the new RSRV-carried workpiece support 501, while the robotic process worker 123b is picking an automatically selected tool piece 801 from the tool piece storage unit 303d for joining the third workpiece 701c of type C to the fourth workpiece 701d of type D on the new RSRV-carried workpiece support 501, according to an embodiment herein.

Figure 9F:
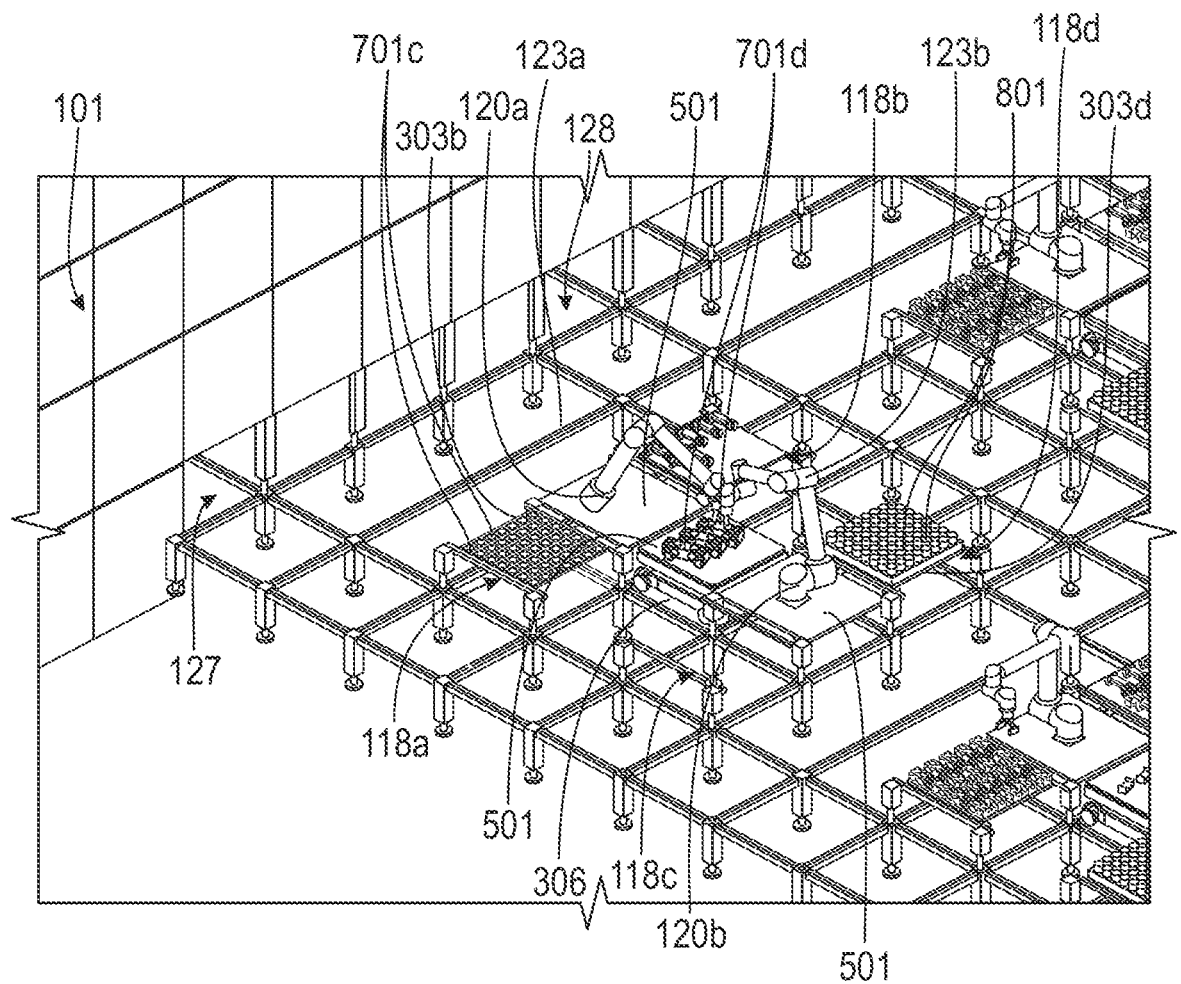
FIG. 9F illustrates a perspective view of the manufacturing cell, showing the cooperation between the robotic picker and the robotic process worker for joining the third workpiece to the fourth workpiece on the new RSRV-carried workpiece support, according to an embodiment herein.

FIG. 9F illustrates a perspective view of the manufacturing cell 106, showing the cooperation between the robotic picker 123a and the robotic process worker 123b for joining the third workpiece 701c of type C to the fourth workpiece 701d of type D on the new RSRV-carried workpiece support 501, according to an embodiment herein. The robotic picker 123a holds the third workpiece 701c and the fourth workpiece 701d in a prescribed orientation on the workpiece support 501, while the robotic process worker 123b joins the third workpiece 701c to the fourth workpiece 701d using the selected tool piece 801.

The forgoing example demonstrates how the workpiece storage unit 303b at one of two workpiece holding areas can be swapped out while the manufacturing cell 106 is working on placement and processing of workpieces from the other workpiece holding area, whether this is performed to prepare the manufacturing cell 106 for a different manufacturing process, as contemplated in the forgoing example, or whether to swap out an empty workpiece storage unit 303b with a full storage unit 303b or 303c having the same type or kit of workpieces to replenish the manufacturing cell 106 for a repeat of the same manufacturing process. Similarly, the foregoing example demonstrates how an RSRV 306 carrying a second workpiece support 501 can be queued up at the manufacturing cell 106 before the completion of the manufacturing process on the workpiece contents of the first workpiece support 501. In this manner, as soon as the first workpiece support 501 departs the manufacturing cell 106 on its RSRV 306, the second workpiece support 501 advances into the working position between the robotic workers 123a, 123b at the centre of the manufacturing cell 106. The foregoing example also demonstrates how the workpiece support 501 being delivered to the manufacturing cell 106 can be either an empty workpiece support or an occupied workpiece support on which a processed workpiece or an assembled subassembly was previously processed or assembled, whether such previously processing or assembly was performed earlier at the same manufacturing cell 106 or at a different manufacturing cell. In the event that the arriving workpiece support 501 is an occupied workpiece support, the workpiece support 501 may be arriving directly from another manufacturing cell, or from a storage location in the 3D gridded storage structure 300 in which the workpiece support 501 was temporarily stored or buffered between manufacturing processes.

FIG. 10 illustrates a top plan view of the manufacturing centre 105 shown in FIGS. 1-2, showing an example of a multi-stop path traversed by one of the RSRVs 306 to move a workpiece support 501 illustrated in FIGS. 9A-9F, through multiple manufacturing stages at various manufacturing cells 106 in the manufacturing centre 105, according to an embodiment herein. In an embodiment, the manufacturing cells 106 are daisy chained together to perform several manufacturing processes sequentially using any manufacturing cell order on the gridded track structure 108. In another embodiment, individual manufacturing processes are assigned to each manufacturing cell 106 and completed as availability allows. For example, the steps 1, 2, 3, and 4 illustrated in FIG. 10 can be performed in any combination depending on the priority and availability of the manufacturing cells 106. As illustrated in FIG. 10, the RSRV 306 carrying a workpiece support 501 with workpieces thereon traverses a path with multiple stops, for example, four stops, at four different manufacturing cells 106 prior to returning the completed subassembly to the ASRS structure 101. The workpieces positioned on the workpiece support 501 undergo one or more process steps of a manufacturing process at each of the manufacturing cells 106 for the manufacture of a finished good, for example, a finished product or a finished subassembly. The same RSRV 306 then delivers the finished good to the ASRS structure 101 for storage therein.

In an embodiment, the computerized control system (CCS) 131 randomly assigns the holding stations of each manufacturing cell 106 for holding the storage units. For example, the CCS 131 assigns one holding station for a current process workpiece kitted bin, another holding station for a current process tool piece kitted bin, another holding station for a subsequent process workpiece kitted bin, and another holding station for a subsequent process tool piece kitted bin. The CCS 131 further assigns other spots in the manufacturing cell 106 as follows: spot(s) configured as a runway for an RSRV-carried workpiece support 501 and spots for housing the robotic workers, for example, the robotic picker for grasping a workpiece to be processed on the workpiece support 501 and the robotic process worker for using a tool piece to process the workpiece on the workpiece support 501. If a manufacturing process is too complex for robotic processing or if the process deals with workpieces larger than a storage unit, a human-attended manufacturing cell 107 is used. At the human-attended manufacturing cell 107, both workpiece kitted bins and tool piece kitted bins are delivered to a human worker. The CCS 131 renders instructions on human-machine interfaces (HMIs) positioned at the human-attended manufacturing cell 107. The instructions rendered depending on the type of storage unit is presented at the ports of the human-attended manufacturing cell 107.

Figure 11:
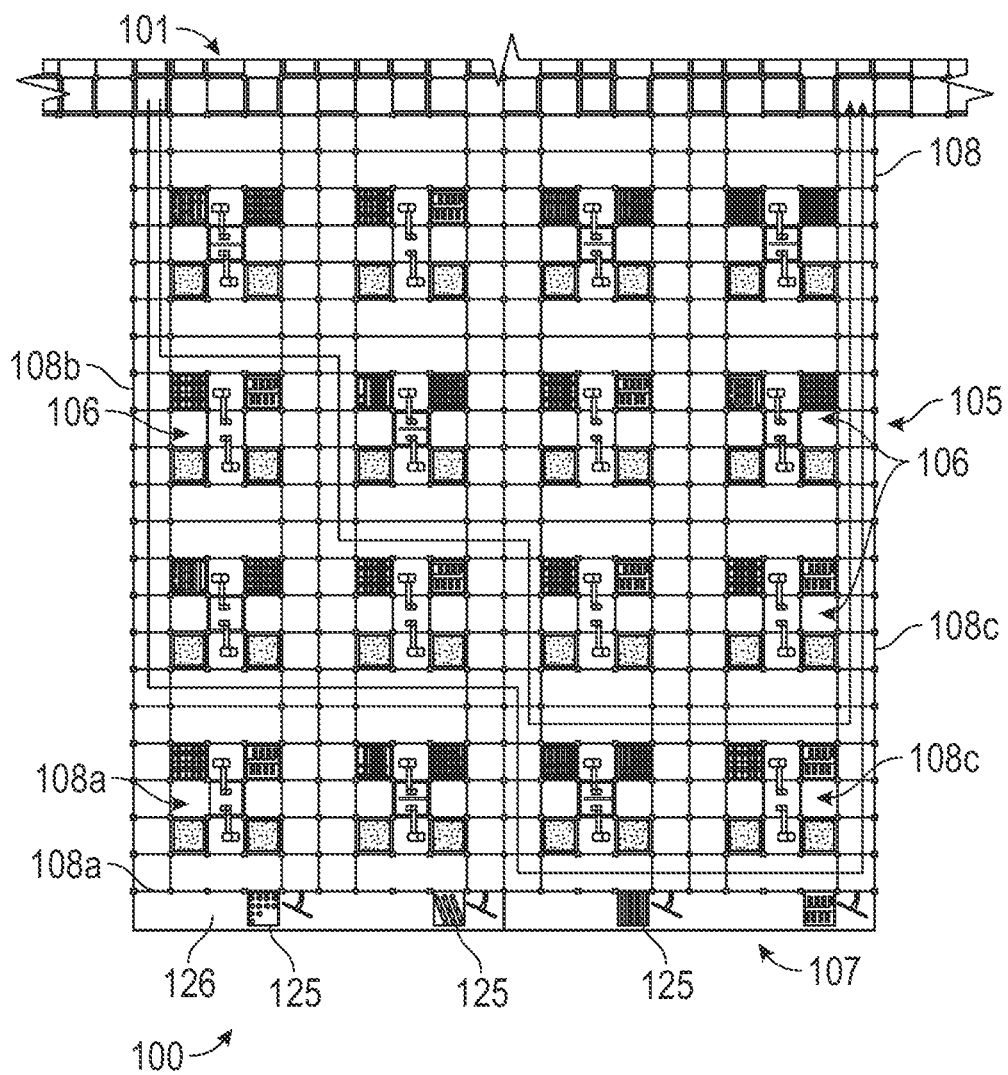
FIG. 11 illustrates a top plan view of the manufacturing centre shown in FIGS. 1-2, illustrating examples of multi-stop paths traversed by a pair of the RSRVs to transport workpieces and tool pieces between the ASRS structure and the manufacturing cells of the manufacturing centre, according to an embodiment herein.

FIG. 11 illustrates a top plan view of the manufacturing centre 105 shown in FIGS. 1-2, illustrating examples of multi-stop paths traversed by a pair of the RSRVs 306 to transport workpieces and tool pieces between the ASRS structure 101 and the manufacturing cells 106 of the manufacturing centre 105, according to an embodiment herein. Swapping one tool piece storage unit 303d for another at one of the two tool holding stations 118c, 118d illustrated in FIGS. 9A-9F, while one or more tool pieces from the other tool holding station is being utilized in the manufacturing cell 106 is useful for switching the manufacturing cell 106 from one manufacturing process to another without loss of production time. The use of two workpiece holding areas and two tool holding areas is illustrated in FIG. 11, where an RSRV 306 sent out from the 3D gridded storage structure 300 to deliver a workpiece storage unit 303b or a kit storage unit 303c to a workpiece holding area of one manufacturing cell 106 can be used to pick up an empty or unneeded workpiece storage unit 303b or an empty or unneeded kit storage unit 303c from another manufacturing cell 106, and then return this empty or unneeded workpiece storage unit 303b or the empty or unneeded kit storage unit 303c to the 3D gridded storage structure 300 for storage therein. Similarly, an RSRV 306 sent out from the 3D gridded storage structure 300 to deliver a tool piece storage unit 303d to a tool holding area of one manufacturing cell 106 can be used to pick up an unneeded tool piece storage unit 303d from another manufacturing cell 106, and then return this empty or unneeded tool piece storage unit 303d to the 3D gridded storage structure 300 for storage therein. In the meantime, with two workpiece holding areas and two tool holding areas at each manufacturing cell 106, unproductive time at the manufacturing cell 106 can be avoided by continuing manufacturing at the still-occupied holding area while the other holding area is being emptied and replenished. In an embodiment, the same RSRV 306 is configured to pick up an empty or unneeded tool piece storage unit 303d after drop-off of a needed workpiece storage unit 303b or vice versa. That is, the same RSRV 306 used to drop off a needed workpiece storage unit 303b or a kit storage unit 303c to the manufacturing cell 106 can be configured to pick up an empty or unneeded tool piece storage unit 303d from the manufacturing cell 106. Similarly, the same RSRV 306 used to drop of a needed tool piece storage unit 303d to the manufacturing cell 106 can be configured to pick up an empty or unneeded workpiece storage unit 303b or kit storage unit 303c from the manufacturing cell 106. While assignment of dual tasks, that is, drop off of a needed storage unit and pickup of an empty or unneeded storage unit to an RSRV's 306 single trip out from the 3D gridded storage structure 300 increases efficiency of the manufacturing process, singular-task routing of the RSRV 306 may also be employed.

The fully-automated manufacturing cells 106 are distributed throughout the main internal area of the gridded track structure 108, with at least one row or column of the gridded track structure 108 left open between any two adjacent manufacturing cells 106 to allow the RSRVs 306 to travel there between. In the embodiment exemplarily illustrated in FIGS. 10-11, there are two rows or two columns left open between each pair of adjacent manufacturing cells 106 to preclude the interaction of an RSRV 306 with one manufacturing cell 106 from obstructing another RSRV's 306 interaction with a neighbouring manufacturing cell 106.

In an embodiment, each human-attended manufacturing cell 107 is of the same construction as the workstations disclosed in Applicant's U.S. patent application Ser. Nos. 16/374,123 and 16/374,143, where each human-attended manufacturing cell 107 comprises a lower track on which the RSRVs 306 can ride to deliver storage units to an access spot on the lower track at which the storage units are accessible to a human worker of the human-attended manufacturing cell 107 through an access opening 125 in a countertop 126 that overlies the lower track. In an embodiment as illustrated in FIGS. 1-2 and FIGS. 10-12B, multiple human-attended manufacturing cells 107 are arranged in series with one another such that their lower tracks collectively occupy a singular row or column of the gridded track structure 108 of the manufacturing centre 105 adjacent to a respective side of the outer perimeter 108a of the gridded track structure 108. In the illustrated example, four human-attended manufacturing cells 107 occupy the outermost row of the gridded track structure 108 at the far side of the manufacturing centre 105. In an embodiment, the human-attended manufacturing cells 107 are additionally or alternatively positioned at a respective column of the gridded track structure 108 at one or both of the lateral sides 108b and 108c of the gridded track structure 108. The lower tracks of the human-attended manufacturing cells 107 that occupy a row or a column of the same gridded track structure 108 on which the fully automated manufacturing cells 106 are positioned, are therefore part of the same extension of the gridded lower track layout 302 of the 3D gridded storage structure 300 by which the fully automated manufacturing cells 106 are served by the RSRVs 306. The RSRVs 306 are, therefore, operable to deliver the workpiece storage units 303b or the kit storage units 303c whose contents are compiled from the inventory storage units 303a at the kitting area 102 illustrated in FIGS. 1-2 and FIG. 7, to the human-attended manufacturing cells 107. In an embodiment, the RSRVs 306 also deliver tool piece storage units 303d containing tool pieces required at the human-attended manufacturing cells 107 to perform process steps of a manufacturing process currently assigned to those human-attended manufacturing cells 107, whether those tool pieces are required and used by the human worker of the human-attended manufacturing cell 107, or a robotic worker, or another piece of automated manufacturing equipment, for example, a computer numerical control (CNC) machine, or any combination thereof, at that human-attended manufacturing cell 107.

Similar to the human-attended manufacturing cells 107 comprising CNC machines or other automated manufacturing equipment, in an embodiment, one or more of the fully automated manufacturing cells 106 include such equipment. For example, instead of a robotic picker placing workpieces from one or more workpiece holding areas of an automated manufacturing cell 106 onto an RSRV-carried workpiece support 501, the robotic picker places the workpieces in a CNC machine, for example, a mill, a drill, a lathe, a laser cutter, a plasma cutter, a waterjet cutter, etc., or other piece of automated manufacturing equipment for processing therein, and optionally then transfer the processed workpieces from the CNC machine or other automated manufacturing equipment back onto an RSRV 306, for example, either into a workpiece storage unit carried thereon for return into the ASRS structure 101, or onto a workpiece support 501 carried on the RSRV 306 for travel thereof into the ASRS structure 101, or for onward travel to another automated manufacturing cell 106. The RSRVs 306 are used to serve one or more manufacturing cells 106 and 107 from the gridded track structure 108 or other track-defining extension of the ASRS structure 101 regardless of the particular equipment and layout used in the manufacturing cells 106 and 107. Similarly, though the illustrated embodiment uses fully automated manufacturing cells 106 in the main internal area of the gridded structure 108 and positions the human-attended manufacturing cells 107 at the outer perimeter area 108a of the gridded track structure 108, in an embodiment, the human-attended manufacturing cells 107 are alternatively disposed within the internal area of the gridded track structure 108, provided that safe human access to and from such human-attended manufacturing cells 107 is established in a manner to avoid potential collision between human workers and the RSRVs 306 traversing the gridded track structure 108.

Figure 12A:
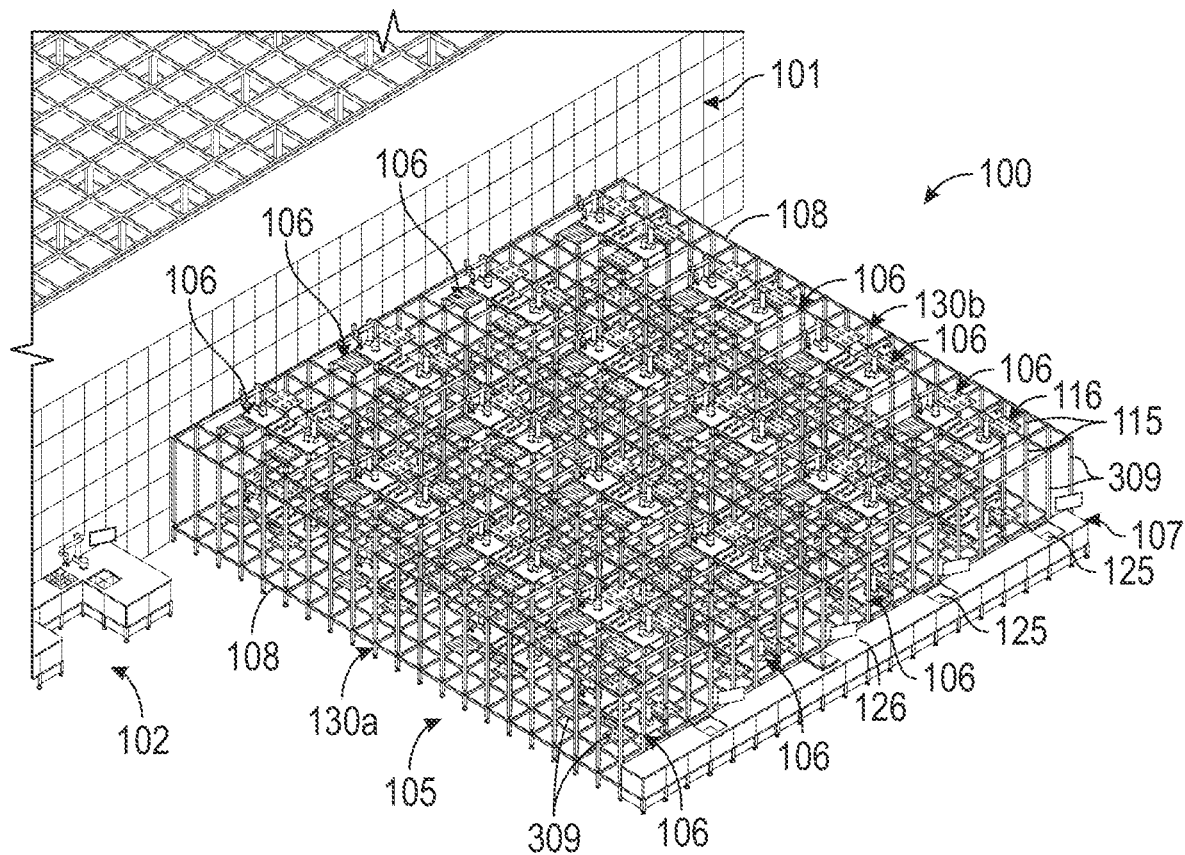
FIG. 12A illustrates a side perspective view of the manufacturing system, showing the manufacturing centre comprising multiple manufacturing cells configured in a multi-level structure, according to an embodiment herein.
Figure 12B:
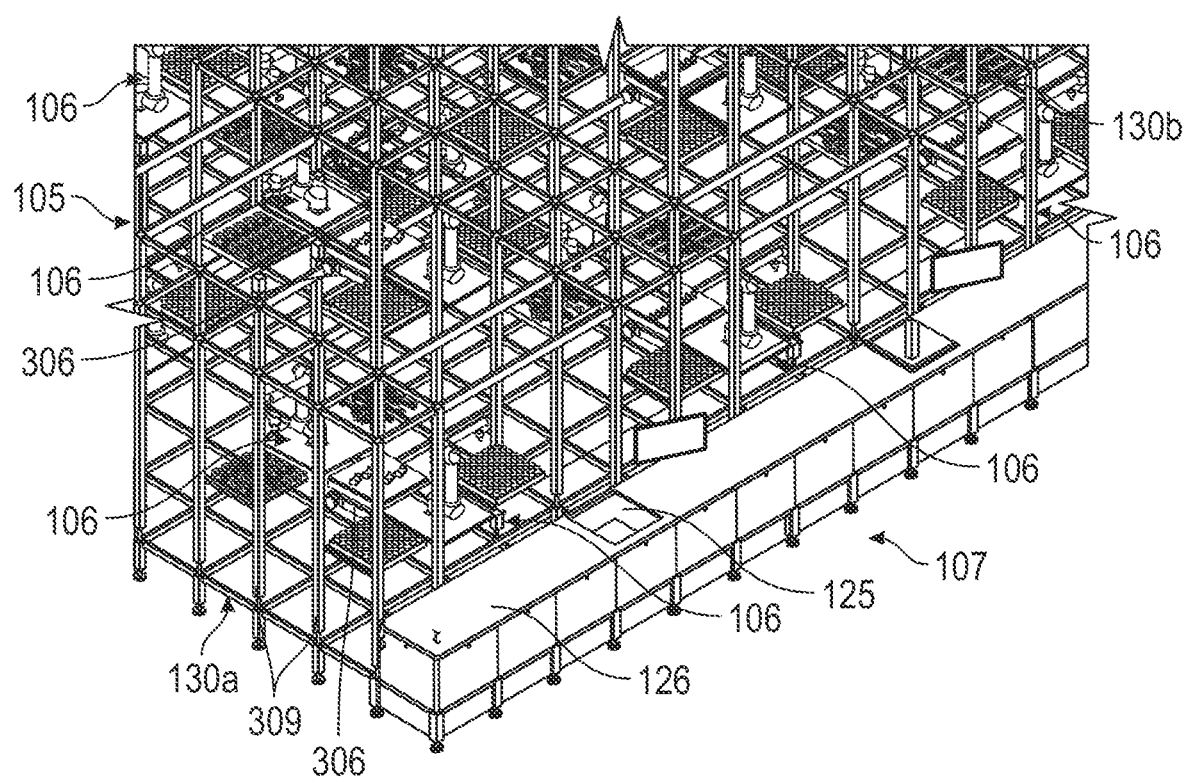
FIG. 12B illustrates an enlarged, partial perspective view of the manufacturing centre shown in FIG. 12A, according to an embodiment herein.

FIG. 12A illustrates a side perspective view of the manufacturing system 100, showing the manufacturing centre 105 comprising multiple manufacturing cells 106 configured in a multi-level structure, according to an embodiment herein. In the multi-level structure, the manufacturing centre 105 comprises multiple levels of manufacturing cells 106. That is, the manufacturing centre 105 comprises multiple track-navigated manufacturing levels, for example, two track-navigated manufacturing levels 130a and 130b as illustrated in FIGS. 12A-12B. FIG. 12B illustrates an enlarged, partial perspective view of the manufacturing centre 105 shown in FIG. 12A, according to an embodiment herein. Each of the track-navigated manufacturing levels 130a and 130b comprises a two-dimensional (2D) gridded track structure 108 of the type disclosed in the detailed description of FIGS. 8A-8C. The 2D gridded track structure 108 comprises sets of intersecting rails 115, 116 on which the RSRVs 306 are navigable in two dimensions as illustrated in FIGS. 8A-8C. The 2D gridded track structure 108 of each of the track-navigated manufacturing levels 130a and 130b comprises a respective set of manufacturing cells 106 installed on the gridded track structure 108 at each manufacturing level 130a and 130b. As illustrated in FIGS. 12A-12B, the lowermost gridded track structure 108 of the track-navigated manufacturing level 130a in the two-level example is a ground level track structure identical to that disclosed in the detailed description of FIGS. 8A-8C for the single-level embodiment, and is therefore connected to the gridded lower track layout 302 of the three-dimensional (3D) gridded storage structure 300 illustrated in FIG. 3 that defines the ASRS structure 101. Each subsequently higher level disposed above the ground level track structure, for example, the second track-navigated manufacturing level 130b, lacks a direct connection to a corresponding gridded track layout 302 of the 3D gridded storage structure 300.

In an embodiment, the multi-level structure further comprises upright frame members 309. The upright frame members 309 interconnect the intersecting rails 115, 116 of the levels 130a, 130b. In an embodiment, one or more of the upright frame members 309 are configured for traversal of the RSRVs 306 thereon in an ascending direction and/or a descending direction to transition between the levels 130a, 130b. In an embodiment, the 2D gridded track structure 108 at one of the levels of the multi-level structure is attached to a corresponding one of the storage levels in the ASRS structure 101 at which the RSRVs 306 are configured to transition between the ASRS structure 101 and the multi-level structure. To allow RSRV access to each subsequently higher level track structure from the ground level track structure, rack-toothed upright frame members 309 of the same type used in the 3D gridded storage structure 300 illustrated in FIG. 3 are used to interconnect the track rails 115, 116 at the different levels to allow ascending and descending travel of the RSRVs 306 between the different levels in the same manner in which the RSRVs 306 travel upwardly and downwardly through the upright shafts 305 of the 3D gridded storage structure 300. In an embodiment, the rack-toothed frame members 309 are used for the ascending and descending travel of the RSRVs 306 at the four corners of any unoccupied square spots in the gridded track structures 108 that are not occupied by cell components, for example, holding stations, robotic workers, etc., of any manufacturing cell. In an embodiment, the rack-toothed frame members are used throughout the entire multi-level structure so that a vertical space between any unoccupied square spot on one level and a matching unoccupied square spot on the next level can serve as an upright travel shaft through which an RSRV 306 can ascend and descend between those levels. This maintains flexibility to ensure that even if the manufacturing cell layout or equipment at one or more levels is reconfigured in a manner that obstructs a previously available travel shaft, other travel shafts remain available for inter-level travel of the RSRVs 306. In another embodiment, in addition to or alternative to the rack-toothed frame members 309, the multi-level structure incorporates lifting mechanisms of the type disclosed in Applicant's co-pending PCT Application Number PCT/CA2019/050815 filed on Jun. 10, 2019, the entirety of which is incorporated herein by reference. In an embodiment, at each of the gridded track layouts from which the RSRVs 306 must ascend upward to that of a higher level in the multi-level structure, a lifting mechanism is positioned in a launching spot of the gridded track layout below a respective shaft through which the RSRV 306 ascends to the higher level above.

In an embodiment as exemplarily illustrated in FIGS. 12A-12B, the multi-level structure of the manufacturing centre 105 is a two-level structure of a lesser height than the ASRS structure 101, whereby the uppermost level 130b of the multi-level structure is at a lesser elevation than the gridded upper track layout 301 of the 3D gridded storage structure 300 illustrated in FIG. 3 that defines the ASRS structure 101. In other embodiments, the multi-level structure of the manufacturing centre 105 is equal to or of a greater height than the ASRS structure 101, in which case an uppermost or intermediate level of the multi-level structure may have its gridded track structure 108 attached to the gridded upper track layout 301 of the 3D gridded storage structure 300, in which case the RSRVs 306 may transition between the ASRS structure 101 and the manufacturing centre 105 at multiple levels of the ASRS structure 101 and the manufacturing centre 105. In another embodiment, the 3D gridded storage structure 300, at intermediate levels between the gridded upper and lower track layouts 301 and 302 thereof, is optionally equipped with exit and return ports opening onto the gridded track structure 108 at one or more respective levels of the multi-level structure of the manufacturing centre 105. Such intermediate levels of the 3D gridded storage structure 300 are equipped with a fully gridded track layout similar to those at the top and bottom of the 3D gridded storage structure 300. In another embodiment, to avoid reduction in storage density, the 3D gridded storage structure 300, at intermediate levels between the gridded upper and lower track layouts 301 and 302 thereof, is optionally equipped with exit ports in outer shafts of the 3D gridded storage structure 300 so that an RSRV 306 climbing or descending through the outer shaft can transition into the multi-level structure of the manufacturing centre 105. To accomplish this, in an embodiment, the outer shaft comprises a pair of transfer rails that are suspended between the frame members 309 of that outer shaft and that align with a respective pair of rails of the gridded track structure 108 at the respective level in the multi-level structure of the manufacturing centre 105. In this embodiment, transition between the 3D gridded storage structure 300 and the manufacturing centre 105 need not necessarily be to a level of the 3D gridded storage structure 300 at which a gridded track layout is defined.

Furthermore, in other embodiments, the use of the RSRVs 306 from the ASRS structure 101 to directly serve one or more manufacturing cells 106 to avoid need for intermediary conveyors or other equipment between the ASRS structure 101 and the manufacturing cells 106 does not necessarily need to be achieved through a 2D gridded track structure 108 attached to the ASRS structure 101. In an embodiment, a network of tracks extending outward from the gridded track layout of the ASRS structure 101 and returning thereto is used to allow travel of the RSRVs 306 out from the ASRS structure 101 to one or more manufacturing cells 106 distributed along that network of tracks. In an embodiment, the network of tracks comprises one or more 2D gridded track structures 108 having an array of manufacturing cells 100 distributed therein as illustrated in FIGS. 1-2, but with each such 2D gridded track structure 108 being discretely positioned at a spaced distance from the ASRS structure 101 and being connected to the ASRS structure 101 by other tracks of the network. In an embodiment, the other tracks of the network comprise at least one delivery track dedicated to outbound travel of the RSRVs 306 from the ASRS structure 101 to the gridded track structure 108 and at least one return track dedicated to inbound travel of the RSRVs 306 back to the ASRS structure 101 from the gridded track structure 108.

While in the illustrated embodiments, the RSRVs 306 depart the 3D gridded storage structure 300 that defines the ASRS structure 101 via an extension of the gridded lower track layout 302 thereof, other embodiments alternatively employ an extension of the upper gridded track layout 301 of the 3D gridded storage structure 300 for departure of the RSRVs 306 therefrom to the external manufacturing cell(s) 106. In an embodiment, the network of tracks comprise one or more overhead tracks connected to the gridded upper track layout 301 of the 3D gridded storage structure 300 or to an intermediate level of the 3D gridded storage structure 300 between the gridded upper and lower track layouts 301 and 302, and extending outward therefrom to one or more manufacturing cells 106 positioned remotely of the 3D gridded storage structure 300 in other areas of a manufacturing facility. If positioned at a ground level or at any elevation lower than the gridded upper track layout 301 on the overhead track(s), in an embodiment, the manufacturing cells 106 are served through drop-down shafts connected to the overhead track(s) and constructed from the same rack-toothed frame members 309 of the 3D gridded storage structure 300 and installed at appropriate intervals along the overhead track(s) to allow the RSRVs 306 to descend down from the overhead track(s) and drop off the RSRV-carried storage units at the manufacturing cells 106. In an embodiment, each drop-down shaft serves an individual manufacturing cell, or a plurality of manufacturing cells distributed within a 2D gridded track structure or distributed along a one-dimensional track at the lower elevation. The manufacturing capacity of the manufacturing centre 105 is increased by expanding the 2D gridded track structure or adding more levels to the structure of the manufacturing centre 105.

Figure 13:
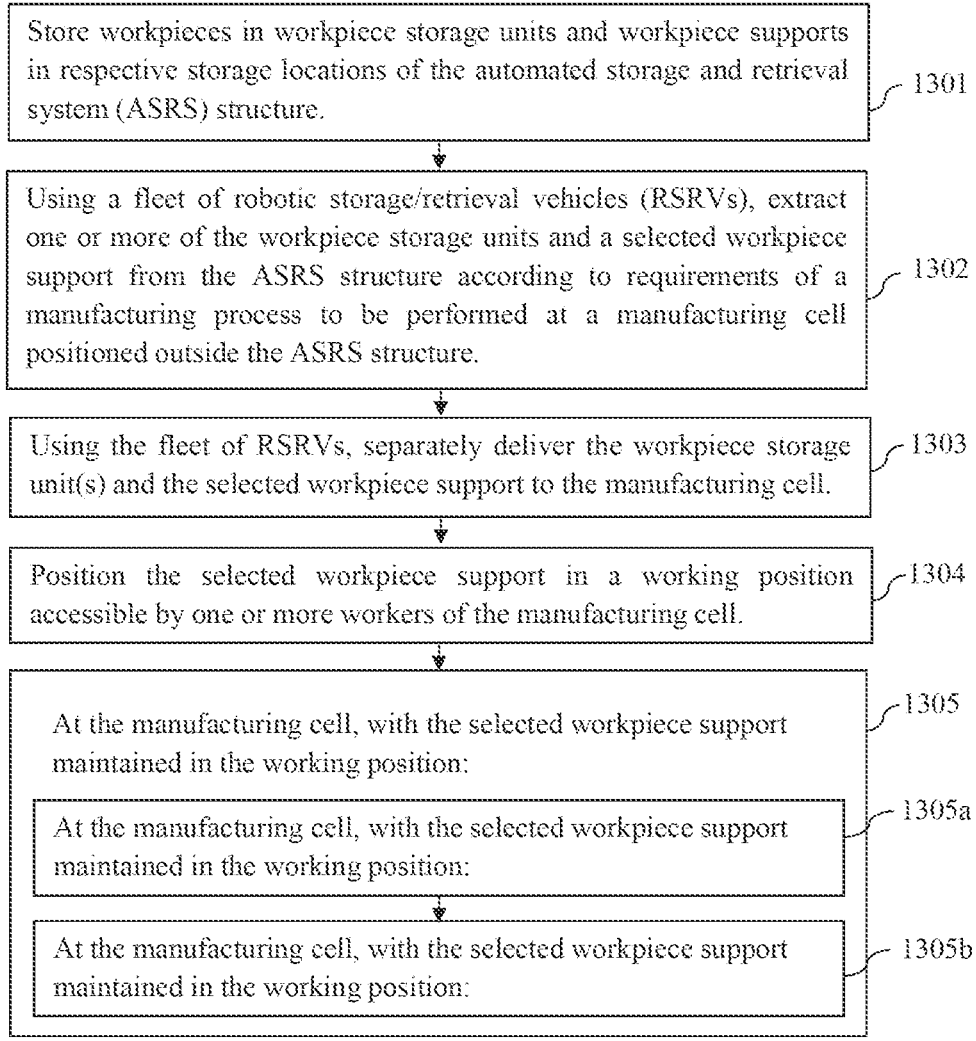
FIG. 13 illustrates a flowchart of a method for executing a workflow in the manufacturing system, according to an embodiment herein.

FIG. 13 illustrates a flowchart of a method for executing a workflow in the manufacturing system, according to an embodiment herein. The manufacturing system disclosed herein comprises a storage arrangement with an automated storage and retrieval system (ASRS) structure and a fleet of robotic storage/retrieval vehicles (RSRVs), and multiple manufacturing cells positioned outside the ASRS structure as disclosed in the detailed descriptions of FIGS. 1-12B. In an embodiment, the storage arrangement comprises a supply of workpieces. The supply of workpieces is stored within the storage locations of the ASRS structure for use in manufacturing goods from the workpieces. The same fleet of RSRVs navigable within the ASRS structure in three dimensions is operable to deliver the workpieces to the manufacturing cells. In an embodiment, the workpieces are transportable between each of the manufacturing cells in any order. The manufacturing system disclosed herein allows the transport of workpieces between each of the manufacturing cells in any order and sequence instead of linearly with conveyors. In another embodiment, the workpieces are received at a first one of the manufacturing cells for performance of one or more of multiple process steps of a manufacturing process and subsequently stored in the storage locations of the ASRS structure and retrieved from the storage locations of the ASRS structure for the transfer of the workpieces to a second one of the manufacturing cells. In another embodiment, each of the manufacturing cells is configured to receive the workpieces multiple times for performance of one or more of the process steps of the manufacturing process.

In an embodiment, the storage arrangement of the manufacturing system disclosed herein further comprises a supply of tool pieces for use in manufacturing the goods. The tool pieces are stored in the same ASRS structure as the workpieces. The tool pieces are retrievable from the same ASRS structure and deliverable to the manufacturing cells by the same fleet of RSRVs.

In an embodiment, the storage arrangement of the manufacturing system disclosed herein further comprises a supply of storage units of compatible size and shape for storage in the storage locations of the ASRS structure. The storage units are configured to be carried by the RSRVs for transfer of the storage units to and from the storage locations and to and from the manufacturing cells. The manufacturing system disclosed herein allows buffering of storage units in the ASRS structure between each process performed at different manufacturing cells. In an embodiment, the storage units comprise workpiece storage units or tool piece storage units or any combination thereof. Each of the workpiece storage units is configured to hold one or more of the workpieces. Each of the tool piece storage units is configured to hold one or more of the tool pieces. In an embodiment, the manufacturing cells are configured in a continuous arrangement outside the ASRS structure. In this embodiment, the storage units are configured to be transferred to and from the storage locations of the ASRS structure and between the manufacturing cells, free of identification of the storage units, due to the continuous arrangement of the manufacturing cells. The continuity between the ASRS structure and each of the different manufacturing cells outside the ASRS structure allows direct physical transfer of the storage units free of identification or scanning of the storage units.

In an embodiment, the workpiece storage units comprise inventory storage units and kit storage units. Each of the inventory storage units is configured to contain a collection of inventory workpieces. Each of the kit storage units is configured to contain a kit of mixed workpieces picked from one or more of the inventory storage units according to a manufacturing process to be performed on the mixed workpieces once delivered to one of the manufacturing cells. In another embodiment, the manufacturing system disclosed herein further comprises at least one kitting workstation configured to accept delivery of the inventory storage units from the ASRS structure by the RSRVs for allowing picking of the inventory workpieces from the inventory storage units at the kitting workstation(s) as disclosed in the detailed description of FIG. 7. In an embodiment, the kitting workstation(s) is configured to receive a drop-off of the workpiece storage units and/or a travel of the workpiece storage units through the kitting workstation(s) by the same fleet of RSRVs.

In an embodiment, the storage arrangement of the manufacturing system disclosed herein further comprises a supply of workpiece supports as disclosed in the detailed description of FIGS. 5A-5C and FIGS. 6A-6B. Each of the workpiece supports is configured to hold one or more of the workpieces in predetermined positions during the manufacture of the goods. The workpiece supports are stored in the same ASRS structure as the workpieces. The workpiece supports are retrievable from the same ASRS structure and deliverable to the manufacturing cells by the same fleet of RSRVs. In an embodiment, each of the workpiece supports is of a common footprint of a standardized shape and size as each of a supply of storage units of compatible size and shape configured to fit within the storage locations of the ASRS structure. Each of the workpiece supports comprises a base of a standardized shape and size configured to fit within the storage locations of the ASRS structure. In an embodiment, each of the workpiece supports and each of the storage units are configured to have a matching layout of interface features by which the RSRVs interact with the workpiece supports and the storage units to allow loading and unloading of the workpiece supports and the storage units to and from the RSRVs.

In an embodiment, in addition to the supply of workpieces stored within the storage locations of the ASRS structure, the storage arrangement comprises either a supply of tool pieces or a supply of workpiece supports stored in the ASRS structure. Each of the tool pieces is useful for performance of one or more process steps of a manufacturing process on one or more of the workpieces during the manufacture of the goods. Each of the workpiece supports is configured to hold one or more of the workpieces in predetermined positions during the manufacture of the goods. In this embodiment, the fleet of RSRVs is operable to extract from the storage locations both the workpieces and at least one of the tool pieces and the workpiece supports. The same fleet of RSRVs navigable within the ASRS structure in the three dimensions is operable to deliver supplies or componentry, for example, the workpieces and the tool pieces and/or the workpiece supports among the manufacturing cells. In an embodiment, the componentry is transportable between each of the manufacturing cells in any order. In another embodiment, each of the manufacturing cells is configured to receive the componentry multiple times for performance of one or more of the process steps of the manufacturing process.

In an embodiment, each of the manufacturing cells comprises at least one workpiece holding area configured to hold the workpieces awaiting processing at the corresponding manufacturing cell. The workpiece holding area(s) is configured to accept placement of one of the workpiece storage units thereon. In an embodiment, the workpiece holding area comprises two workpiece holding areas. Each of the two workpiece holding areas is configured to hold a respective set of workpieces required at a corresponding manufacturing cell.

In an embodiment, at least a subset of the manufacturing cells is positioned at the track structure or within an area of the track structure. In an embodiment, the track structure is a gridded track structure comprising sets of intersecting rails on which the RSRVs are navigable in two dimensions as disclosed in the detailed description of FIGS. 8A-8C and FIGS. 9A-9F. In an embodiment, a width of the workpiece holding area in each of the two dimensions is generally equal to a whole number multiple of a distance measured between two adjacent parallel rails of the gridded track structure. In another embodiment, a width of the workpiece holding area in each of the two dimensions does not exceed a distance measured between two adjacent parallel rails of the gridded track structure.

In an embodiment, the gridded track structure comprises square spots. Each of the square spots is delimited by a first pair of parallel rails lying in a first direction and a second pair of parallel rails lying in a second direction perpendicular to the first direction. Each of the manufacturing cells occupies a cell space of an area equal to a predetermined number of the square spots. In an embodiment, at least one cell space is a square space whose area is divisible into nine square subspaces. Each of the nine square subspaces is equal in area to one of the square spots of the gridded track structure. Four corner subspaces of the nine square subspaces are configured as holding areas for holding supplies needed by the corresponding manufacturing cell. In an embodiment, a first pair of mid-perimeter subspaces positioned between the four corner subspaces at a first pair of opposing perimeter sides of the cell space is occupied by robotic workers. In an embodiment, a central subspace positioned between the robotic workers is configured as a working area to which the workpieces are transferred and at which the workpieces are processed by the robotic workers. In an embodiment, the working area is neighboured by a second pair of mid-perimeter subspaces positioned between the four corner subspaces at a second pair of opposing perimeter sides of the cell space. In an embodiment, at least one of the second pair of mid-perimeter subspaces is an unoccupied open area by which the RSRVs are configured to enter and exit the working area. In another embodiment, both of the second pair of mid-perimeter subspaces are unoccupied open areas, whereby the RSRVs are configured to travel fully through the corresponding manufacturing cell.

In an embodiment, each of the manufacturing cells comprises at least one robotic picker operable to pick the workpieces from the workpiece holding area. In another embodiment, each of the manufacturing cells further comprises a working area to which the picked workpieces are transferred from the workpiece holding area by the robotic picker(s).

In an embodiment, each of the manufacturing cells in the subset comprises at least one tool holding area configured to hold tool pieces required at a corresponding manufacturing cell. In an embodiment, a width of the tool holding area in each of the two dimensions is generally equal to a distance measured between two adjacent parallel rails of the gridded track structure. In another embodiment, a width of the tool holding area in each of the two dimensions does not exceed a distance measured between two adjacent parallel rails of the gridded track structure. In an embodiment, each of the manufacturing cells in the subset comprises at least one robotic worker mounted atop a mounting base that is installed on or within the gridded track structure. In an embodiment, a width of the mounting base in each of the two dimensions is generally equal to a whole number multiple of a distance measured between two adjacent parallel rails of the gridded track structure. In another embodiment, a width of the mounting base in each of the two dimensions does not exceed a distance measured between two adjacent parallel rails of the gridded track structure.

In the method disclosed herein as illustrated in FIG. 13, workpieces and workpiece supports are stored 1301 in respective storage locations of the ASRS structure. The workpieces are stored in workpiece storage units at the storage locations. In an embodiment, each of the workpiece storage units is filled with a kit of different workpieces according to requirements of the manufacturing process. In an embodiment, each of the workpiece storage units is filled at a kitting workstation that is connected to the ASRS structure. At the kitting workstation, the fleet of RSRVs is configured to deliver inventory storage units containing inventory workpieces retrieved from respective storage locations in the ASRS structure; the different workpieces of the kit are picked from the inventory workpieces in the inventory storage units and compiled into the workpiece storage units; and each of the workpiece storage units is carried away from the kitting workstation by one of the RSRVs and deposited into a respective one of the storage locations in the ASRS structure for subsequent retrieval from the ASRS structure.

In an embodiment, tool piece storage units configured to hold tool pieces for use in the manufacturing process are stored in the ASRS structure. In the method disclosed herein, using the fleet of RSRVs navigable within the ASRS structure, one or more of the workpiece storage units and a selected workpiece support are extracted 1302 from the ASRS structure according to requirements of a manufacturing process to be performed at a manufacturing cell positioned outside the ASRS structure, and separately delivered 1303 to the manufacturing cell. In an embodiment, RSRVs of the same type are configured to solely perform the extraction and the delivery of both of the workpiece storage unit(s) and the selected workpiece support from the ASRS structure to the manufacturing cell. At the manufacturing cell, the selected workpiece support is positioned 1304 in a working position accessible by one or more workers of the manufacturing cell. At the manufacturing cell, with the selected workpiece support maintained in the working position 1305, (i) one or more of the workpieces are transferred 1305a from the workpiece storage unit(s) onto the selected workpiece support; and (ii) a process step of the manufacturing process is performed 1305b on the workpiece(s) held on the selected workpiece support. In an embodiment, prior to performing the process step of the manufacturing process, a subset of the tool piece storage units are extracted from the ASRS structure and delivered to the manufacturing cell using one of the RSRVs. In an embodiment, prior to performing the process step of the manufacturing process a select one of the tool pieces from the subset of the tool piece storage units is attached to a robotic worker of the manufacturing cell according to the requirements of the manufacturing process to be performed on the workpiece(s) by the robotic worker.

In an embodiment, the workpiece storage unit(s) comprises two workpiece storage units. In this embodiment, the two workpiece storage units are delivered to two respective holding areas of the manufacturing cell. Two workpieces are respectively transferred from the two workpiece storage units parked at the two respective holding areas onto the selected workpiece support.

In an embodiment, after transferring the workpiece(s) from the workpiece storage unit(s) onto the selected workpiece support, an unneeded or empty one of the workpiece storage units from which a selected workpiece is removed and from which no further workpieces are required for the manufacturing process at the manufacturing cell, is removed from the manufacturing cell. In this embodiment, using one of the RSRVs, an additional workpiece storage unit containing one or more additional workpieces needed at the manufacturing cell is delivered to the manufacturing cell. In an embodiment, the additional workpiece(s) is for use in a different manufacturing process to be performed at the same manufacturing cell. In an embodiment, the unneeded or empty one of the workpiece storage units is removed using a different RSRV from that which delivers the additional workpiece storage unit to the manufacturing cell. In an embodiment, the different RSRV is configured to remove the unneeded or empty one of the workpiece storage units after having dropped off a different one of the workpiece storage units at a different manufacturing cell to supply contents of the different one of the workpiece storage units to the different manufacturing cell. After the process step of the manufacturing process is performed on the workpiece(s) held on the selected workpiece support, the selected workpiece support and the workpiece(s) thereon that were processed are removed from the manufacturing cell; another workpiece support is delivered to the manufacturing cell for use in the different manufacturing process using one of the RSRVs; the workpiece support is supported in the working position; the additional workpiece(s) is transferred from the additional workpiece storage unit onto the workpiece support; and one or more process steps of the different manufacturing process are performed on the additional workpiece(s).

In the method disclosed herein, after completion of a finished good by processing of the workpiece(s) at one or more manufacturing cells, the finished good is inducted into the ASRS structure on one of the RSRVs. In an embodiment, the finished good is inducted into the ASRS structure on a final workpiece support on which one or more final process steps were carried out to complete the finished good. In an embodiment, the final workpiece support is the same selected workpiece support onto which the workpiece(s) was transferred.

Figure 14A:
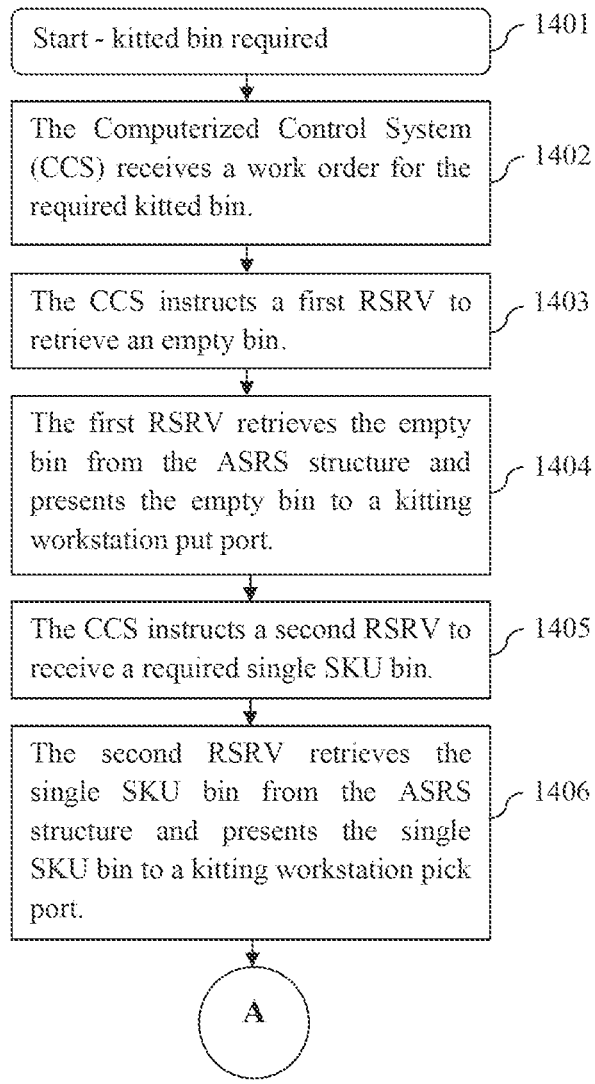
FIGS. 14A-14B, in combination, illustrate a flowchart of a method for executing a kitting operation of a workflow in the manufacturing system, according to an embodiment herein.
Figure 14B:
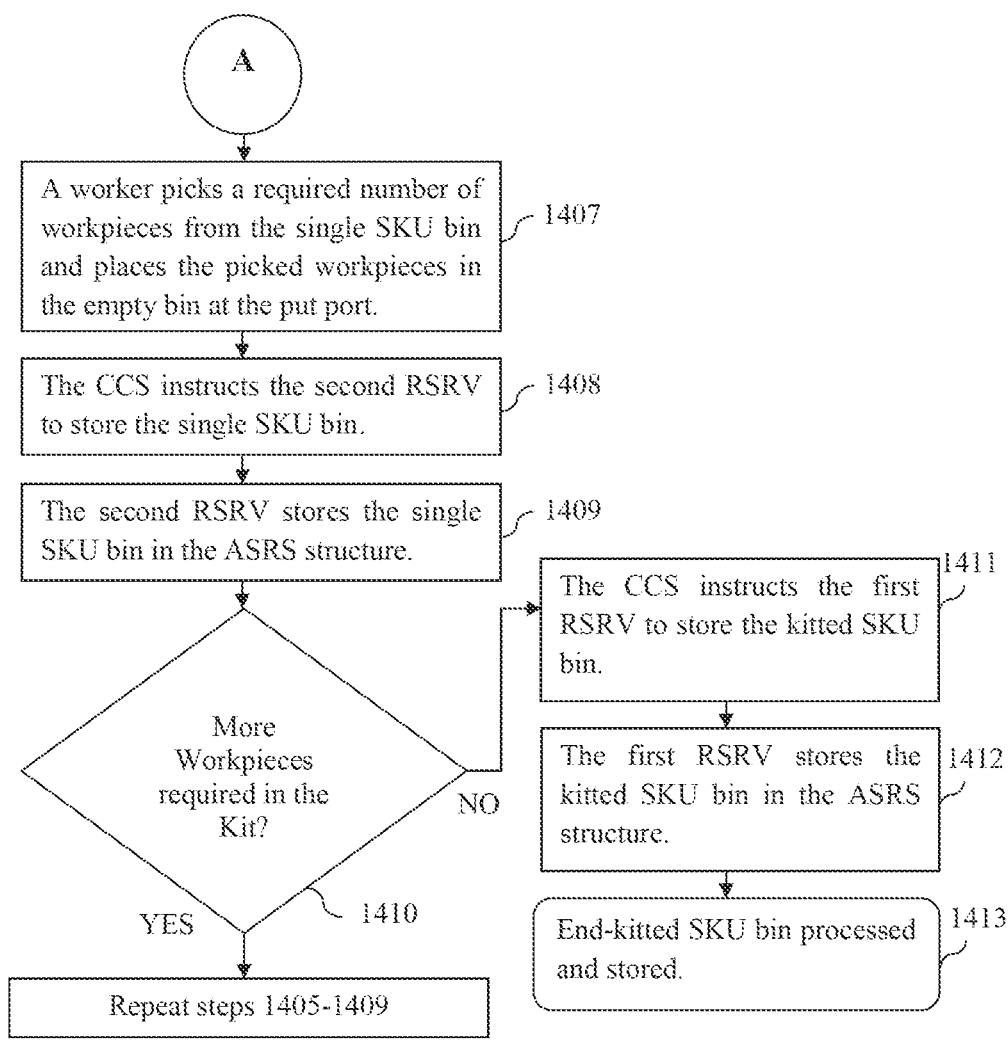
Figure 15A:
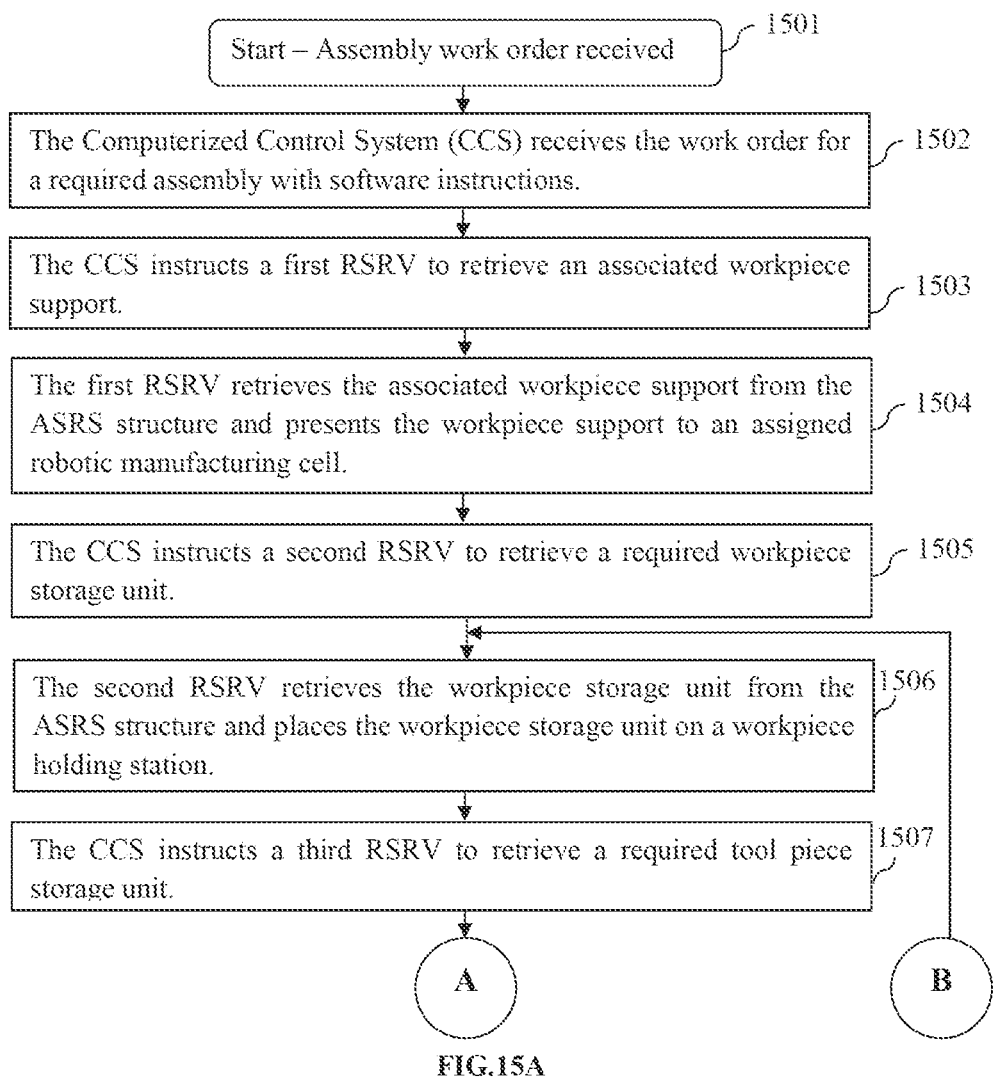
FIGS. 15A-15D, in combination, illustrate a flowchart of a method for executing a manufacturing operation using workpiece storage units for fulfilling a work order in the manufacturing system, according to an embodiment herein.
Figure 15B:
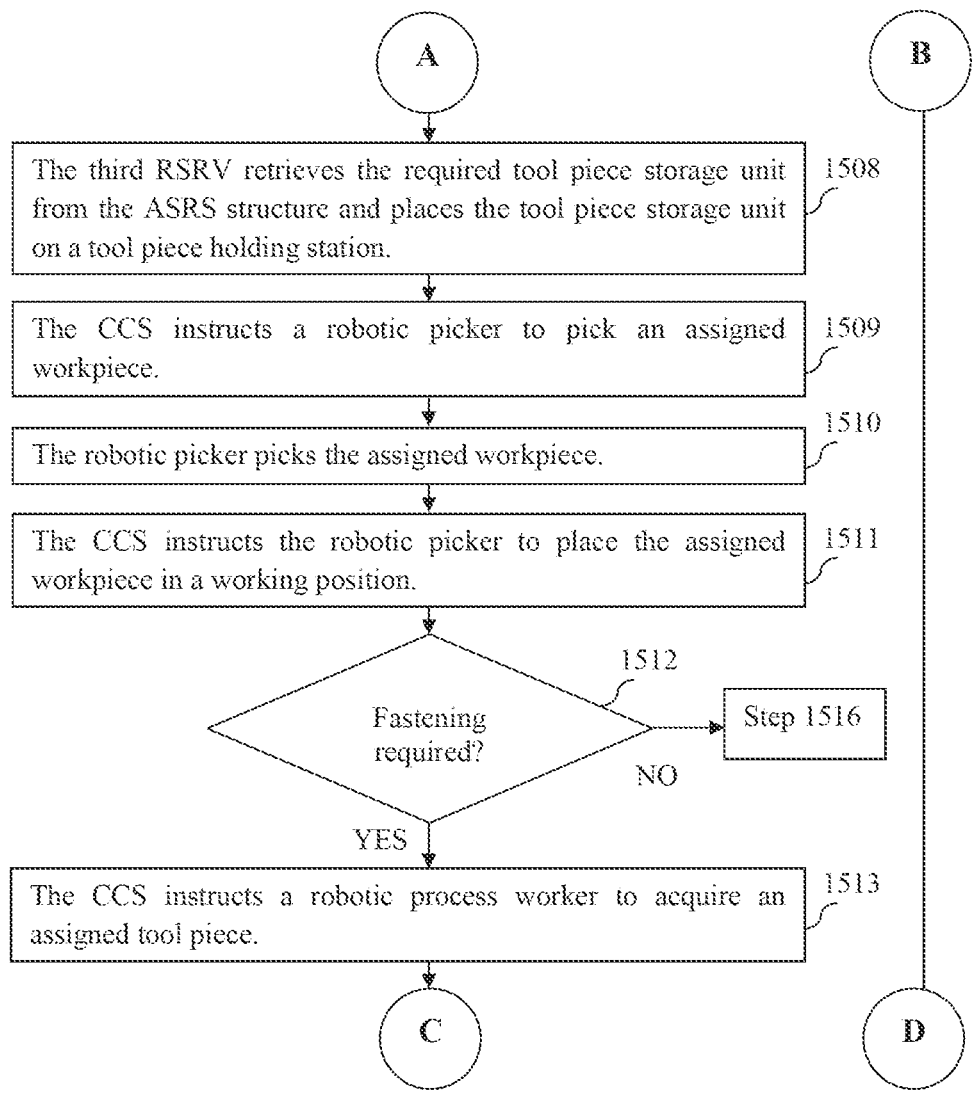
Figure 15C:
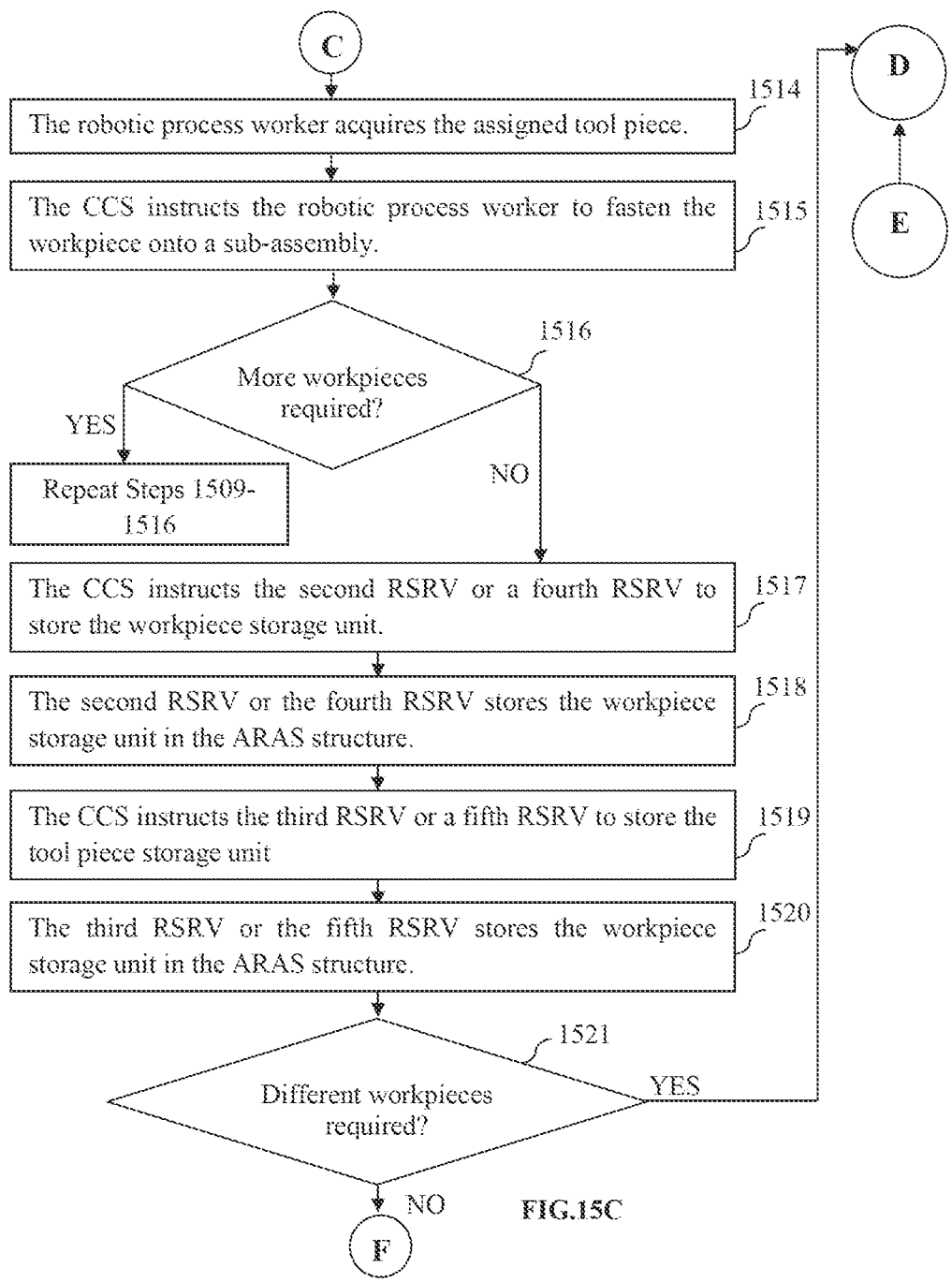
Figure 15D:
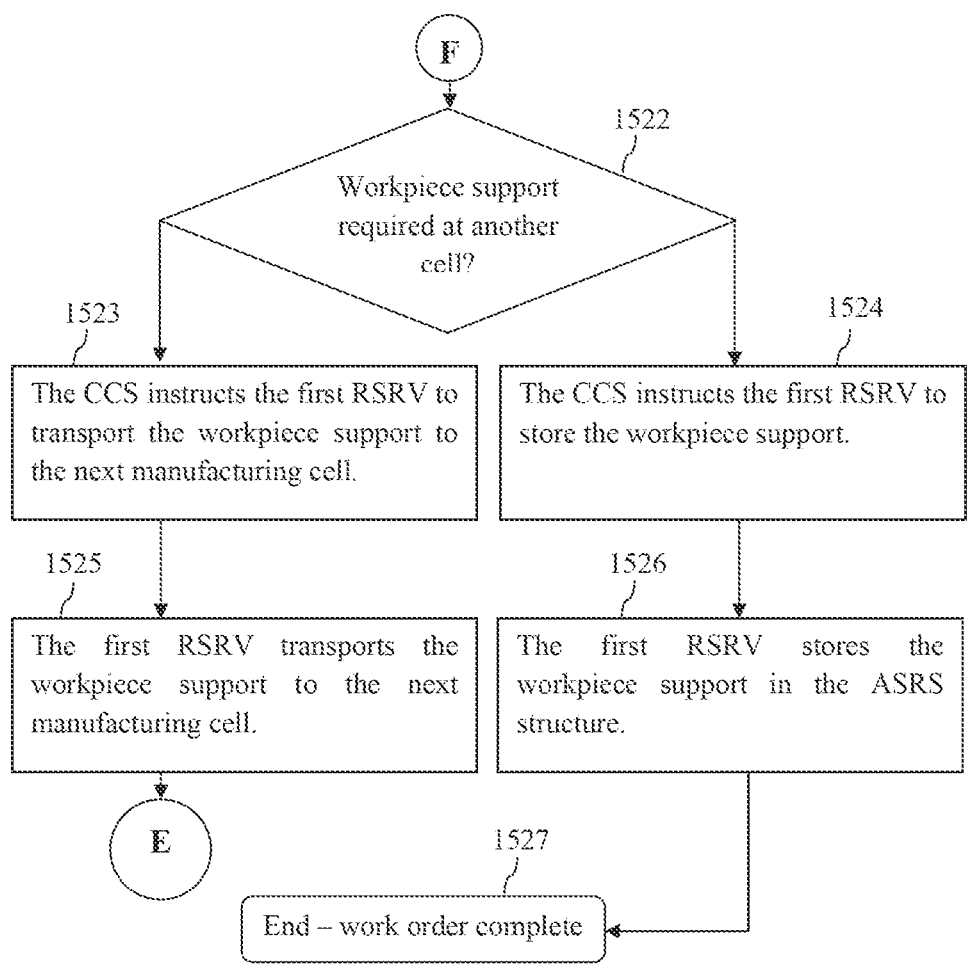

FIGS. 14A and 14B, in combination, illustrate a flowchart of a method for executing a kitting operation of a workflow in the manufacturing system, according to an embodiment herein. Consider an example where a work order for a kit storage unit, herein referred to as a "kitted bin", is received. At step 1401, the kitting operation starts on receiving the work order. At step 1402, the computerized control system (CCS) of the manufacturing system receives the work order for the required kitted bin. At step 1403, the CCS instructs a first robotic storage/retrieval vehicle (RSRV) to retrieve an empty storage unit, herein referred to as an "empty bin". At step 1404, the first RSRV retrieves the empty bin from the automated storage and retrieval system (ASRS) structure and presents the empty bin to a put port or a placement-access port of a kitting workstation in the kitting area of the manufacturing system. At step 1405, the CCS instructs a second RSRV to retrieve a required workpiece storage unit, for example, a required single stock keeping unit (SKU) bin. At step 1406, the second RSRV retrieves the single SKU bin from the ASRS structure and presents the single SKU bin to a pick port or a picking-access port of the kitting workstation. At step 1407, a worker, that is, a human worker or a robotic worker, picks a required number of workpieces from the single SKU bin and places the picked workpieces in the empty bin that is being kitted at the put port of the kitting workstation. At step 1408, the CCS instructs the second RSRV to store the single SKU bin. At step 1409, the second RSRV stores the single SKU bin in the ASRS structure. At step 1410, the CCS determines whether there are more workpieces required in the kitted bin based on the work order. If there are more workpieces required in the kitted bin, the steps 1405 to 1409 of the method disclosed herein are repeated until there are no more workpieces required in the kitted bin. If there are no more workpieces required in the kitted bin, at step 1411, the CCS instructs the first RSRV to store the kitted SKU bin. At step 1412, the first RSRV stores the kitted SKU bin in the ASRS structure. The kitting operation ends 1413 when the kitted SKU bin is processed and stored. In an embodiment, the above kitting operation is also performed for tool pieces to create kitted tool piece bins or tool piece kit storage units.

FIGS. 15A-15D, in combination, illustrate a flowchart of a method for executing a manufacturing operation using workpiece storage units for fulfilling a work order in the manufacturing system, according to an embodiment herein. At step 1501, the manufacturing operation starts when the manufacturing system receives a work order for assembly. At step 1502, the computerized control system (CCS) of the manufacturing system receives the work order for the required assembly with software instructions. At step 1503, on executing the software instructions, the CCS instructs a first robotic storage/retrieval vehicle (RSRV) to retrieve a work support associated with the manufacturing operation to be performed. At step 1504, the first RSRV retrieves the associated workpiece support from the automated storage and retrieval system (ASRS) structure and presents the workpiece support to an assigned fully automated or robotic manufacturing cell at the manufacturing centre of the manufacturing system. At step 1505, the CCS instructs a second RSRV to retrieve a required workpiece storage unit. At step 1506, the second RSRV retrieves the required workpiece storage unit from the ASRS structure and places the workpiece storage bin on a workpiece holding station at the assigned robotic manufacturing cell. At step 1507, the CCS instructs a third RSRV to retrieve a required tool piece storage unit. At step 1508, the third RSRV retrieves the required tool piece storage unit from the ASRS structure and places the tool piece storage unit on a tool piece holding station at the assigned robotic manufacturing cell.

At step 1509, the CCS instructs a robotic worker, that is, a robotic picker operably coupled to another mounting base at the assigned robotic manufacturing cell, to pick an assigned workpiece. At step 1510, the robotic picker picks the assigned workpiece from the workpiece storage unit. At step 1511, the CCS instructs the robotic picker to place the assigned workpiece in a working position. At step 1512, the CCS determines whether the assigned workpiece is to be fastened onto a subassembly positioned on the workpiece support based on the work order. If fastening is not required, the manufacturing operation proceeds to step 1516 disclosed below. If the assigned workpiece is to be fastened onto the subassembly positioned on the workpiece support, at step 1513, the CCS instructs another robotic worker, that is, a robotic process worker operably coupled to a mounting base at the assigned robotic manufacturing cell, to acquire or pick an assigned tool piece from the tool piece storage unit. At step 1514, the robotic process worker acquires the assigned tool piece from the tool piece storage unit. At step 1515, the CCS instructs the robotic process worker to fasten the workpiece onto the subassembly using the acquired tool piece. At step 1516, the CCS determines whether more workpieces are required in the subassembly. If more workpieces are required in the subassembly, the steps 1509 to 1515 of the method disclosed herein are repeated until no more workpieces are required. If no more workpieces are required in the subassembly, at step 1517, the CCS instructs the second RSRV or a fourth RSRV to store the workpiece storage unit. In an embodiment, the CCS instructs the same second RSRV that delivered the workpiece storage unit to the manufacturing cell, to store the workpiece storage unit. In another embodiment, the CCS instructs another RSRV, that is, the fourth RSRV, to store the workpiece storage unit. At step 1518, the second RSRV or the fourth RSRV stores the workpiece storage unit in the ASRS structure. At step 1519, the CCS instructs the third RSRV or a fifth RSRV to store the tool piece storage unit. In an embodiment, the CCS instructs the same third RSRV that delivered the tool piece storage unit to the manufacturing cell, to store the tool piece storage unit. In another embodiment, the CCS instructs another RSRV, that is, the fifth RSRV, to store the tool piece storage unit. At step 1520, the third RSRV or the fifth RSRV stores the tool piece storage unit in the ASRS structure. At step 1521, the CCS determines whether different workpieces are required in the subassembly. If different workpieces are required in the subassembly, the steps 1505 to 1520 of the method disclosed herein are repeated until different workpieces are not required in the subassembly. At step 1522, the CCS determines whether the workpiece support is required at another manufacturing cell of the manufacturing centre. If the workpiece support is required at another manufacturing cell, at step 1523, the CCS instructs the first RSRV to transport the workpiece support with the subassembly to the next manufacturing cell. At step 1524, the first RSRV transports the workpiece support with the subassembly to the next manufacturing cell, where steps similar to the steps 1505 to 1522 are performed. If the workpiece support is not required at another manufacturing cell, at step 1525, the CCS instructs the first RSRV to store the workpiece support with the finished subassembly. At step 1526, the first RSRV stores the workpiece support with the finished subassembly for the work order in the ASRS structure. The manufacturing operation ends 1527 when the work order is complete.

Figure 16A:
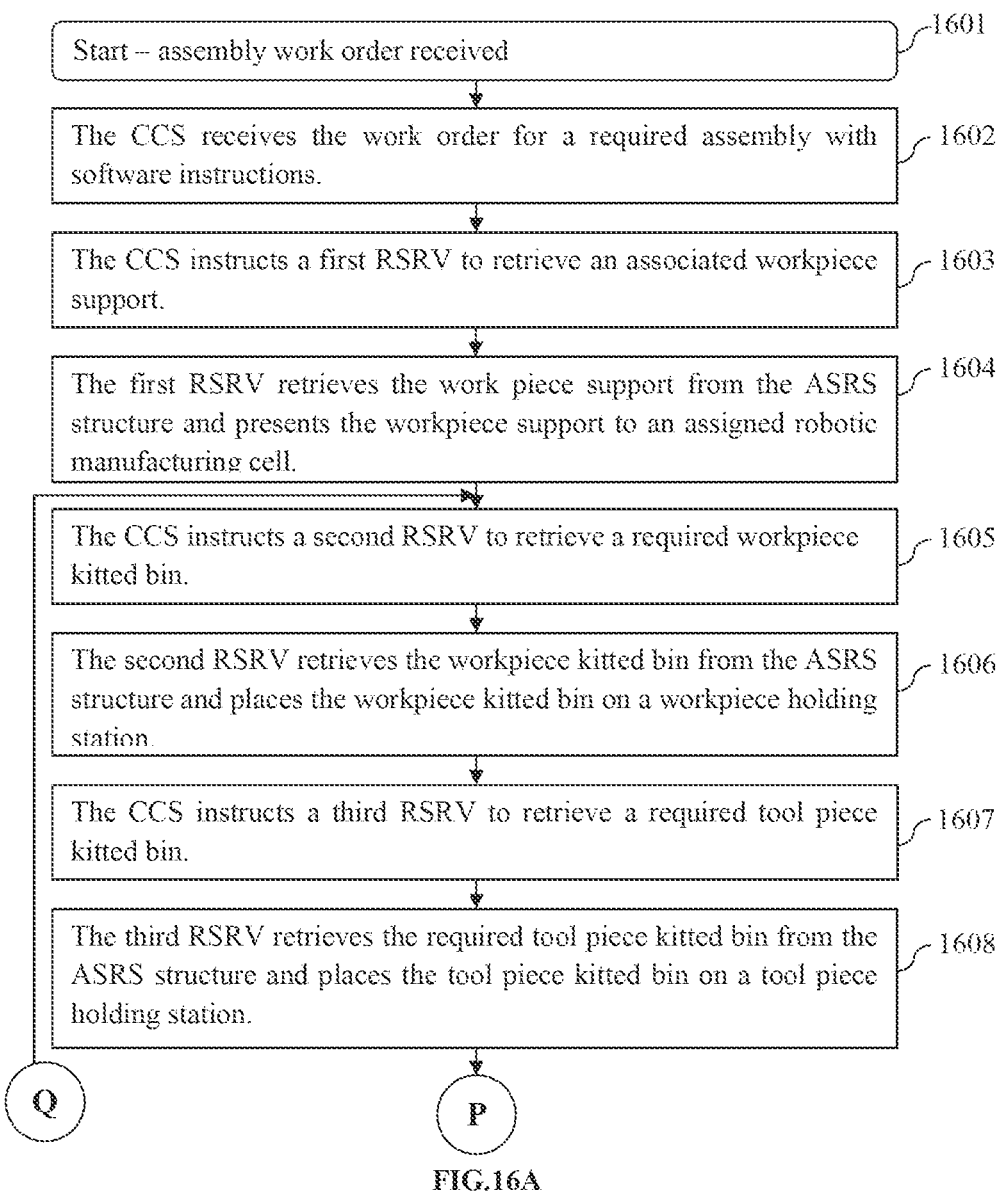
FIGS. 16A-16C illustrate a flowchart of a method for executing a manufacturing operation using kit storage units for fulfilling a work order in the manufacturing system, according to an embodiment herein.
Figure 16B:
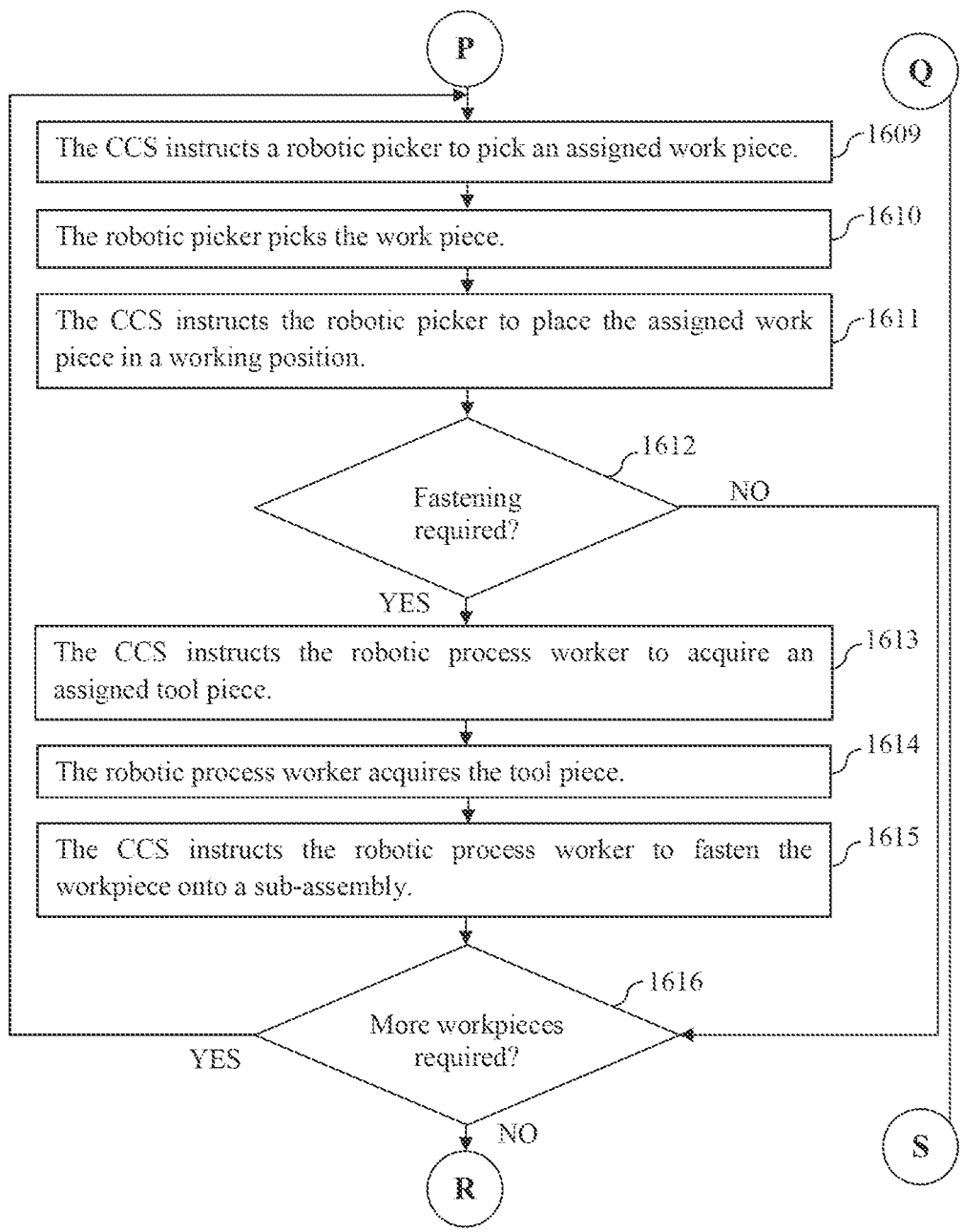
Figure 16C:
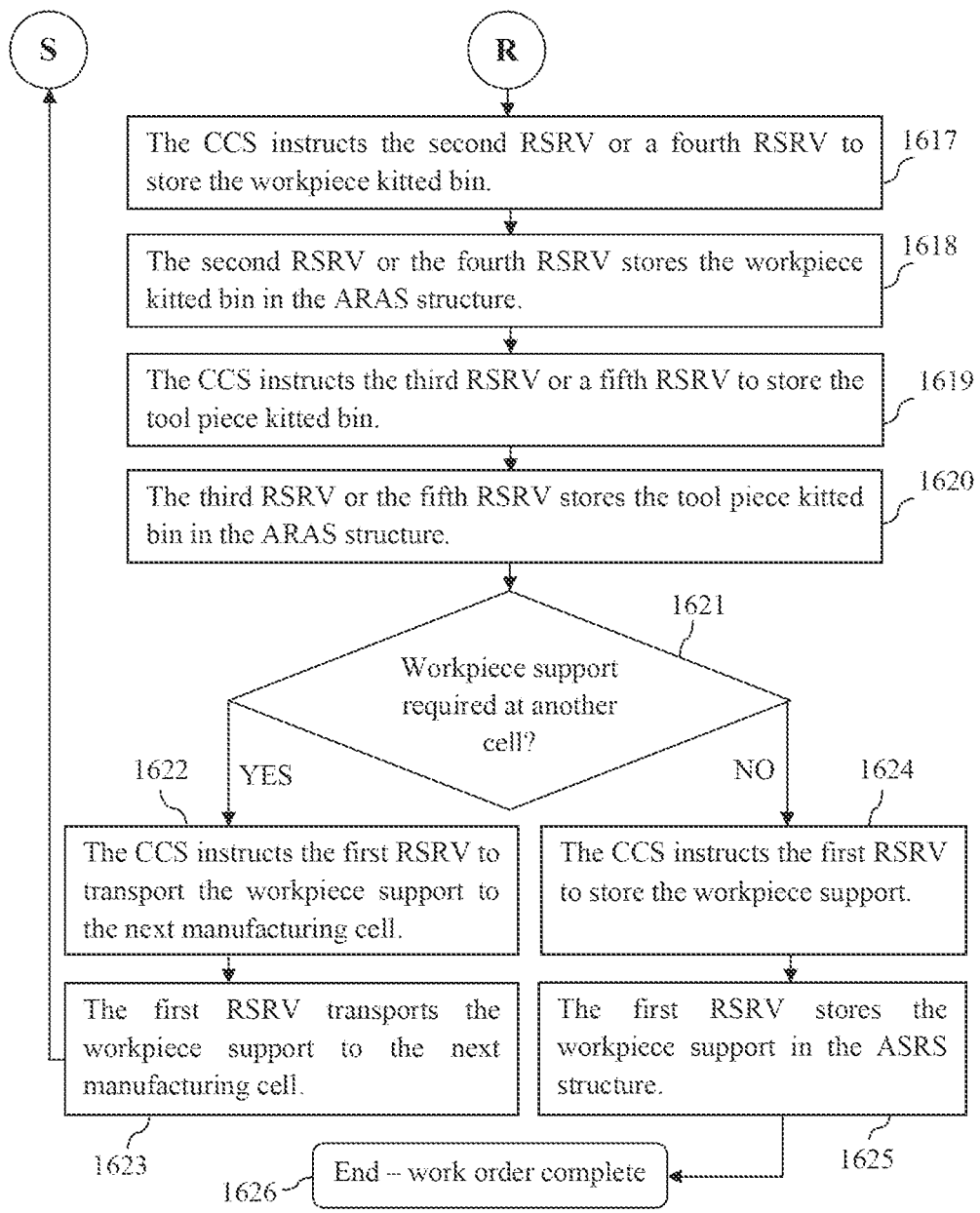

FIGS. 16A-16C illustrate a flowchart of a method for executing a manufacturing operation using kit storage units for fulfilling a work order in the manufacturing system, according to an embodiment herein. At step 1601, the manufacturing operation starts when the manufacturing system receives a work order for assembly. At step 1602, the computerized control system (CCS) of the manufacturing system receives the work order for the required assembly with software instructions. At step 1603, on executing the software instructions, the CCS instructs a first robotic storage/retrieval vehicle (RSRV) to retrieve a work support associated with the manufacturing operation to be performed. At step 1604, the first RSRV retrieves the associated workpiece support from the automated storage and retrieval system (ASRS) structure and presents the workpiece support to an assigned fully automated or robotic manufacturing cell at the manufacturing centre of the manufacturing system. At step 1605, the CCS instructs a second RSRV to retrieve a required workpiece kit storage unit, also referred to as a "workpiece kitted bin". At step 1606, the second RSRV retrieves the required workpiece kitted bin from the ASRS structure and places the workpiece kitted bin on a workpiece holding station at the assigned robotic manufacturing cell. At step 1607, the CCS instructs a third RSRV to retrieve a required tool piece kit storage unit, also referred to as a "tool piece kitted bin". At step 1608, the third RSRV retrieves the required tool piece kitted bin from the ASRS structure and places the tool piece kitted bin on a tool piece holding station at the assigned robotic manufacturing cell.

At step 1609, the CCS instructs a robotic worker, that is, a robotic picker operably coupled to another mounting base at the assigned robotic manufacturing cell, to pick an assigned workpiece. At step 1610, the robotic picker picks the assigned workpiece from the workpiece kitted bin. At step 1611, the CCS instructs the robotic picker to place the assigned workpiece in a working position. At step 1612, the CCS determines whether the assigned workpiece is to be fastened onto a subassembly positioned on the workpiece support based on the work order. If fastening is not required, the manufacturing operation proceeds to step 1616 disclosed below. If the assigned workpiece is to be fastened onto the subassembly positioned on the workpiece support, at step 1613, the CCS instructs another robotic worker, that is, a robotic process worker operably coupled to a mounting base at the assigned robotic manufacturing cell, to acquire or pick an assigned tool piece from the tool piece kitted bin. At step 1614, the robotic process worker acquires the assigned tool piece from the tool piece kitted bin. At step 1615, the CCS instructs the robotic process worker to fasten the workpiece onto the subassembly using the acquired tool piece. At step 1616, the CCS determines whether more workpieces are required in the subassembly. If more workpieces are required in the subassembly, the steps 1609 to 1615 of the method disclosed herein are repeated until no more workpieces are required. If no more workpieces are required in the subassembly, at step 1617, the CCS instructs the second RSRV or a fourth RSRV to store the workpiece kitted bin. In an embodiment, the CCS instructs the same second RSRV that delivered the workpiece kitted bin to the manufacturing cell, to store the workpiece kitted bin. In another embodiment, the CCS instructs another RSRV, that is, the fourth RSRV, to store the workpiece kitted bin. At step 1618, the second RSRV or the fourth RSRV stores the workpiece kitted bin in the ASRS structure. At step 1619, the CCS instructs the third RSRV or a fifth RSRV to store the tool piece kitted bin. In an embodiment, the CCS instructs the same third RSRV that delivered the tool piece kitted bin to the manufacturing cell, to store the tool piece kitted bin. In another embodiment, the CCS instructs another RSRV, that is, the fifth RSRV, to store the tool piece kitted bin. At step 1620, the third RSRV or the fifth RSRV stores the tool piece kitted bin in the ASRS structure. At step 1621, the CCS determines whether the workpiece support is required at another manufacturing cell of the manufacturing centre. If the workpiece support is required at another manufacturing cell, at step 1622, the CCS instructs the first RSRV to transport the workpiece support with the subassembly to the next manufacturing cell. At step 1623, the first RSRV transports the workpiece support with the subassembly to the next manufacturing cell, where steps similar to the steps 1605 to 1621 are performed. If the workpiece support is not required at another manufacturing cell, at step 1624, the CCS instructs the first RSRV to store the workpiece support with the finished subassembly. At step 1625, the first RSRV stores the workpiece support with the finished subassembly for the work order in the ASRS structure. The manufacturing operation ends 1626 when the work order is complete.

Figure 17A:
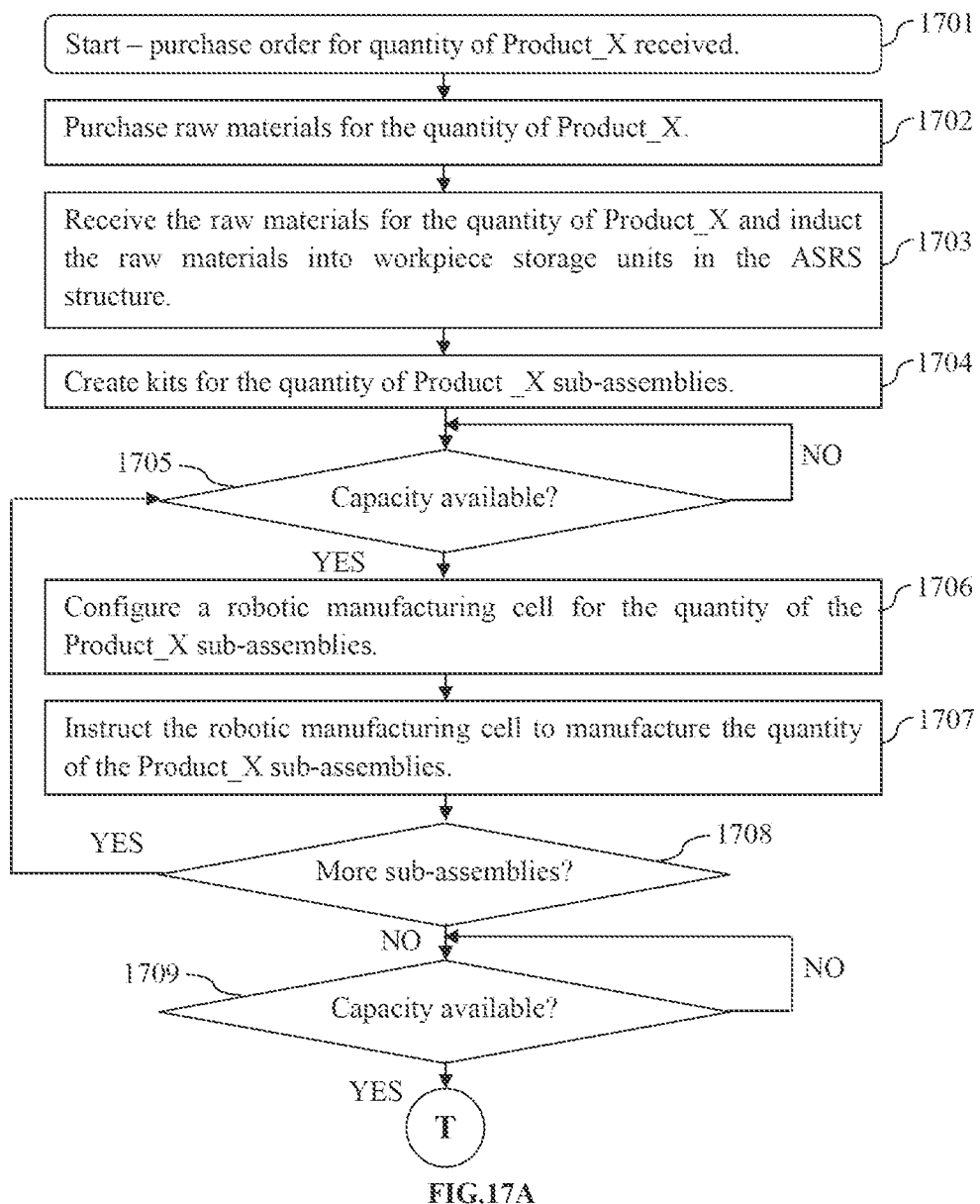
FIGS. 17A-17B, in combination, illustrate a flowchart of a method for manufacturing a product in the manufacturing system, according to an embodiment herein.
Figure 17B:
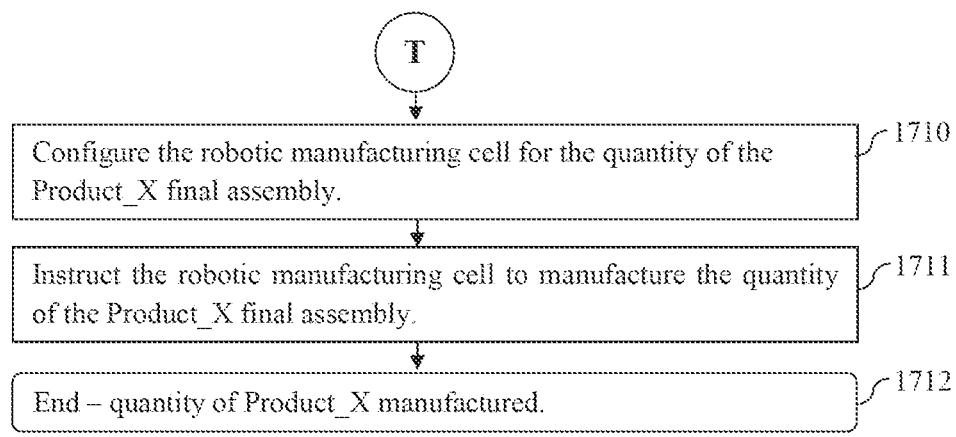

FIGS. 17A-17B, in combination, illustrate a flowchart of a method for manufacturing a product in the manufacturing system, according to an embodiment herein. Consider an example where the manufacturing system receives 1701 a purchase order for a predetermined quantity of a product, Product_X, and proceeds to purchase 1702 raw materials required for manufacturing Product_X in the predetermined quantity. When the raw materials for manufacturing Product_X are received at the manufacturing system, at step 1703, the raw materials are inducted into workpiece storage units in the automated storage and retrieval system (ASRS) structure. At step 1704, the computerized control system (CCS) of the manufacturing system triggers a kitting operation at the kitting area of the manufacturing system as disclosed in the detailed description of FIG. 14, for creating kits or kit storage units comprising workpieces of one or more types for manufacturing a quantity of each of a plurality of subassemblies that constitute Product_X. At step 1705, the CCS determines whether the manufacturing centre has capacity available for manufacturing the quantity of each of the Product_X subassemblies. If there is capacity available, at step 1706, the CCS configures one of the fully automated or robotic manufacturing cells of the manufacturing centre for manufacturing the quantity of each of the Product_X subassemblies. At step 1707, the CCS instructs the robotic manufacturing cell to manufacture the quantity of each of the Product_X subassemblies. The robotic manufacturing cell manufactures the quantity of each of the Product_X subassemblies by executing the manufacturing operation as disclosed in the detailed description of FIGS. 16A-16C. After the manufacture of each of the Product_X subassemblies, at step 1708, the CCS determines whether more Product_X subassemblies need to be manufactured to reach the required quantity. If there are more subassemblies that need to be manufactured to reach the required quantity, the steps 1705 to 1707 are repeated until the required quantity is reached. If the required quantity is reached, at step 1709, the CCS determines whether the manufacturing centre has capacity available for manufacturing Product_X in the predetermined quantity. If there is capacity available, at step 1710, the CCS configures one of the fully automated or robotic manufacturing cells of the manufacturing centre for manufacturing the predetermined quantity of the Product_X final assembly. At step 1711, the CCS instructs the robotic manufacturing cell to manufacture the predetermined quantity of the Product_X final assembly using the Product_X subassemblies. The manufacturing operation ends 1712 when the quantity of Product_X is manufactured. The manufacturing system disclosed herein allows the manufacture of a large number of variants and models of a product in variable quantities.

FIG. 18 illustrates an architectural block diagram of the manufacturing system 100, showing communication between the computerized control system (CCS) 131 and components of the manufacturing system 100, according to an embodiment herein. The components of the manufacturing system 100 comprise the automated storage and retrieval system (ASRS) structure 101, the fleet of robotic storage/retrieval vehicles (RSRVs) 306, kitting workstations 103, 104, and the manufacturing cells 106, 107 of the manufacturing centre 105 illustrated in FIGS. 1-2. The CCS 131 is in operable communication with the fleet of RSRVs 306, human-machine interfaces (HMIs) 138 and a light guiding system 139 of the kitting workstations 103, 104, the robotic workers 123a, 123b at the fully automated or robotic manufacturing cells 106, and HMIs 140 at the human-attended manufacturing cells 107. The HMIs 138 of the kitting workstations 103, 104 comprise display screens for displaying instructions to human workers 703 for performing kitting operations at the kitting area 102 of the manufacturing system 100 as illustrated in FIGS. 1-2 and FIG. 7. The light guidance system 139 comprises, for example, a put-to-light guidance system and a pick-to-light guidance system. The CCS 131 comprises a network interface 134 coupled to a communication network and at least one processor 132 coupled to the network interface 134. As used herein, "communication network" refers, for example, to one of the internet, a wireless network, a communication network that implements Bluetooth® of Bluetooth Sig, Inc., a network that implements Wi-Fi® of Wi-Fi Alliance Corporation, an ultra-wideband (UWB) communication network, a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, a public telephone network, etc., a local area network, a wide area network, an internet connection network, an infrared communication network, etc., or a network formed from any combination of these networks. The network interface 134 enables connection of the CCS 131 to the communication network. In an embodiment, the network interface 134 is provided as an interface card also referred to as a line card. The network interface 134 is, for example, one or more of infrared interfaces, interfaces implementing Wi-Fi® of Wi-Fi Alliance Corporation, universal serial bus interfaces, FireWire® interfaces of Apple Inc., Ethernet interfaces, frame relay interfaces, cable interfaces, digital subscriber line interfaces, token ring interfaces, peripheral controller interconnect interfaces, local area network interfaces, wide area network interfaces, interfaces using serial protocols, interfaces using parallel protocols, Ethernet communication interfaces, asynchronous transfer mode interfaces, high speed serial interfaces, fiber distributed data interfaces, interfaces based on transmission control protocol/internet protocol, interfaces based on wireless communications technology such as satellite technology, radio frequency technology, near field communication, etc.

In an embodiment, the CCS 131 is a computer system that is programmable using high-level computer programming languages. The CCS 131 is implemented using programmed and purposeful hardware. In the manufacturing system 100 disclosed herein, the CCS 131 interfaces with the ASRS structure 101, the RSRVs 306, the kitting workstations 103, 104, and the manufacturing cells 106, 107, and therefore more than one specifically programmed computing system is used for executing a workflow in the manufacturing system 100. The CCS 131 further comprises a non-transitory, computer-readable storage medium, for example, a memory unit 137, communicatively coupled to the processor(s) 132. As used herein, "nontransitory, computer-readable storage medium" refers to all computer-readable media that contain and store computer programs and data. Examples of the computer-readable media comprise hard drives, solid state drives, optical discs or magnetic disks, memory chips, a read-only memory (ROM), a register memory, a processor cache, a random-access memory (RAM), etc. The processor 132 refers to any one or more microprocessors, central processing unit (CPU) devices, finite state machines, computers, microcontrollers, digital signal processors, logic, a logic device, an application specific integrated circuit (ASIC), a field-programmable gate array (FPGA), a chip, etc., or any combination thereof, capable of executing computer programs or a series of commands, instructions, or state transitions. In an embodiment, the processor 132 is implemented as a processor set comprising, for example, a programmed microprocessor and a math or graphics co-processor. The CCS 131 is not limited to employing the processor 132. In an embodiment, the CCS 131 employs controllers or microcontrollers. The processor 132 executes the modules, for example, 137a-137d of the CCS 131.

The memory unit 137 is used for storing program instructions, applications, and data. The memory unit 137 stores computer program instructions defined by modules, for example, 137a-137d of the CCS 131. The memory unit 137 is operably and communicatively coupled to the processor 132 for executing the computer program instructions defined by the modules, for example, 137a-137d of the CCS 131 for executing a workflow in the manufacturing system 100. The memory unit 137 is, for example, a random-access memory (RAM) or another type of dynamic storage device that stores information and instructions for execution by the processor 132. The memory unit 137 also stores temporary variables and other intermediate information used during execution of the instructions by the processor 132. In an embodiment, the CCS 131 further comprises read only memories (ROMs) or other types of static storage devices that store static information and instructions for execution by the processor 132, in an embodiment, the modules, for example, 137a-137e of the CCS 131 are stored in the memory unit 137.

The memory unit 137 is configured to store computer program instructions, which when executed by the processor(s) 132, cause the processor(s) 132 to activate one or more of the RSRVs 306 to perform one or more of (a) navigating within the ASRS structure 101 and/or through the manufacturing cells 106, 107; (b) retrieving one or more of the workpieces contained in one or more storage units from the storage locations of the ASRS structure 101; (c) delivering one or more of the workpieces contained in one or more storage units to at least one kitting workstation 103, 104 for kitting into one or more kit storage units; (d) picking up one or more kit storage units from the kitting workstation(s) 103, 104; returning and storing one or more kit storage units to the storage locations of the ASRS structure 101; (f) retrieving at least one of one or more kit storage units and one or more of the workpieces contained in another one or more of the storage units, one or more tool pieces contained in another one or more storage units, and one or more workpiece supports from the same ASRS structure 101; (g) delivering at least one of one or more kit storage units and one or more of the workpieces contained in the other one or more of the storage units, one or more tool pieces contained in the other one or more storage units, and one or more workpiece supports to the manufacturing cells 106, 107 for the manufacture of the goods, and (h) inducting the goods into the ASRS structure 101 on a final workpiece support.

As illustrated in FIG. 18, the CCS 131 further comprises a data bus 136, a display unit 133, and common modules 135. The data bus 136 permits communications between the modules, for example, 132, 133, 134, 135, and 137 of the CCS 131. The display unit 133, via a graphical user interface (GUI) 133a, displays information, display interfaces, user interface elements such as checkboxes, input text fields, etc., for example, for allowing a user such as a system administrator to trigger an update to digital records for work orders, enter inventory information, update database tables, etc., for executing a workflow in the manufacturing system 100. The CCS 131 renders the GUI 133a on the display unit 133 for receiving inputs from the system administrator. The GUI 133a comprises, for example, an online web interface, a web-based downloadable application interface, a mobile-based downloadable application interface, etc. The display unit 133 displays the GUI 133a. The common modules 135 of the CCS 131 comprise, for example, input/output (I/O) controllers, input devices, output devices, fixed media drives such as hard drives, removable media drives for receiving removable media, etc. Computer applications and programs are used for operating the CCS 131. The programs are loaded onto fixed media drives and into the memory unit 137 via the removable media drives. In an embodiment, the computer applications and programs are loaded into the memory unit 137 directly via the communication network.

In an exemplary implementation illustrated in FIG. 18, the CCS 131 comprises an order management module 137a, a kitting management module 137b, a storage unit assignment module 137c, a robot activation module 137d, and a facility database 137e. The order management module 137a defines computer program instructions for receiving work orders with software instructions for executing a workflow in the manufacturing system 100. The order management module 137a is configured to update digital records for work orders in the facility database 137e. The kitting management module 137b defines computer program instructions for executing kitting operations at the kitting area 102 of the manufacturing system 100 based on work order and manufacturing requirements. The kitting management module 137b transmits instructions and notifications to HMIs 138 at the kitting area 102 for viewing by human workers 703 who are attending at least one kitting workstation 103. In an embodiment, the kitting management module 137b also controls the light guidance system 139 that guides picking and placement operations at the kitting area 102. The storage unit assignment module 137c defines computer program instructions for assigning storage units for storing workpieces, particular combinations of workpieces, workpiece supports, tool pieces, particular combinations of tool pieces, etc., at addressed storage locations in the ASRS structure 101. The robot activation module 137d activates one or more of the RSRVs 306 for performing various storage, retrieval, delivery, and return operations during kitting operations at the kitting area 102 and during manufacturing workflows in the manufacturing cells 106, 107 of the manufacturing centre 105 as disclosed above.

The processor 132 of the CCS 131 retrieves instructions defined by the order management module 137a, the kitting management module 137b, the storage unit assignment module 137c, and the robot activation module 137d for performing respective functions disclosed above. The processor 132 retrieves instructions for executing the modules, for example, 137a-137d, from the memory unit 137. The instructions fetched by the processor 132 from the memory unit 137 after being processed are decoded. After processing and decoding, the processor 132 executes their respective instructions, thereby performing one or more processes defined by those instructions. An operating system of the CCS 131 performs multiple routines for performing a number of tasks required to assign the input devices, the output devices, and the memory unit 137 for execution of the modules, for example, 137a-137e. The tasks performed by the operating system comprise, for example, assigning memory to the modules, for example, 137a-137e, etc., and to data used by the CCS 131, moving data between the memory unit 137 and disk units, and handling input/output operations. The operating system performs the tasks on request by the operations and after performing the tasks, the operating system transfers the execution control back to the processor 132. The processor 132 continues the execution to obtain one or more outputs.

For purposes of illustration, the detailed description refers to the modules, for example, 137a-137e, being run locally on a single computer system; however the scope of the manufacturing system 100 and the method disclosed herein is not limited to the modules, for example, 137a-137e, being run locally on a single computer system via the operating system and the processor 132, but may be extended to run remotely over the communication network by employing a web browser and a remote server, a mobile phone, or other electronic devices. In an embodiment, one or more computing portions of the manufacturing system 100 disclosed herein are distributed across one or more computer systems (not shown) coupled to the communication network.

The non-transitory, computer-readable storage medium disclosed herein stores computer program instructions executable by the processor 132 for executing a workflow in the manufacturing system 100. The computer program instructions implement the processes of various embodiments disclosed above and perform additional steps that may be required and contemplated for executing a workflow in the manufacturing system 100. When the computer program instructions are executed by the processor 132, the computer program instructions cause the processor 132 to perform the steps of the method for executing a workflow in the manufacturing system 100 as disclosed above. In an embodiment, a single piece of computer program code comprising computer program instructions performs one or more steps of the method disclosed above. The processor 132 retrieves these computer program instructions and executes them.

A module, or an engine, or a unit, as used herein, refers to any combination of hardware, software, and/or firmware. As an example, a module, or an engine, or a unit may include hardware, such as a microcontroller, associated with a non-transitory, computer-readable storage medium to store computer program codes adapted to be executed by the microcontroller. Therefore, references to a module, or an engine, or a unit, in an embodiment, refer to the hardware that is specifically configured to recognize and/or execute the computer program codes to be held on a non-transitory, computer-readable storage medium. The computer program codes comprising computer readable and executable instructions can be implemented in any programming language, for example, C, C++, C#, Java®, JavaScript®, Fortran, Ruby, Perl®, Python®, Visual Basic®, hypertext pre-processor (PHP), Microsoft® .NET, Objective-C®, etc. Other object-oriented, functional, scripting, and/or logical programming languages can also be used. In an embodiment, the computer program codes or software programs are stored on or in one or more mediums as object code. In another embodiment, the term "module" or "engine" or "unit" refers to the combination of the microcontroller and the non-transitory, computer-readable storage medium. Often module or engine or unit boundaries that are illustrated as separate commonly vary and potentially overlap. For example, a module or an engine or a unit may share hardware, software, firmware, or a combination thereof, while potentially retaining some independent hardware, software, or firmware. In various embodiments, a module or an engine or a unit includes any suitable logic.

In the manufacturing system 100 disclosed herein, connecting scalable manufacturing cells distributed on the gridded track structure to the two-dimensional (2D) gridded lower track layout of the ASRS structure 101 allows each manufacturing cell to have access to an abundance of workpieces and workpiece kits along with associated tool pieces, tool piece kits, and workpiece supports. This allows each manufacturing cell to be configurable on-the-fly for a wide variety of manufacturing processes on-demand using the CCS software alone. The just-in-time delivery of the workpieces, the tool pieces, and the workpiece support by the RSRVs 306 to the manufacturing cells allows just-in-time manufacturing of subassemblies at any stage of the manufacturing process. The ability to store each subassembly in the ASRS structure 101 between manufacturing processes allows maximum flexibility since any manufacturing step can be completed as capacity becomes available.

Moreover, in the manufacturing system 100 disclosed herein, all components or componentry delivered to the manufacturing cells use a standardized storage unit footprint. The use of a standardized storage unit footprint in a single automation solution for all manufacturing workflows allows all goods and materials for all manufacturing processes to be densely stored and predictably managed by a single entity as a single collaborative system with any number of manufacturing processes. The manufacturing system 100 disclosed herein allows all manufacturing processes including receiving, kitting, building sub-assemblies and the final assembly, etc., to be completed by one automated material handling system that does not require conveyors or ground transport, with the manufacturing cells being software configurable as needed. The disclosed invention allows all manufacturing processes to be completed by one automated material handling system that does not require conveyors or ground transport, with manufacturing cells being software configurable as needed.

The manufacturing system 100 disclosed herein allows configuration of manufacturing operations on-demand and transportation of goods between all manufacturing cells, in any sequence, since the lower 2D grid interconnects all manufacturing cells. This allows any number of processes to be completed in any order and multiple times, if needed, for example, for reworking sub-assemblies to new specifications, etc. This, along with the ability to configure manufacturing cells with software commands, allows new manufacturing processes to be easily and flexibly added as factory manufacturing requirements change. As customer expectations are rapidly increasing towards customized products, manufacturers aim to differentiate themselves by focusing on customer experience. The manufacturing system 100 disclosed herein adapts to changing conditions and product types easily and flexibly without wait times and without lost production or manufacturing time.

Moreover, in the manufacturing system 100 disclosed herein, the same storage medium, that is, the ASRS structure 101 can be used by all interconnected processes at the kitting area 102 and all the manufacturing cells 106 to buffer any differences in process flow. This allows maximum flexibility to a manufacturer and minimizes the operational sensitivity to outside circumstances since material can be indefinitely stored. Furthermore, since all manufacturing cells 106 are interconnected and managed by the same fleet of RSRVs 306, and also connected to the ASRS structure 101 that is navigated by the same fleet of RSRVs 306, system logic is simplified with no need to physically transfer componentry from one service area to another service area. Consequently, inventory does not have to be received and identified, for example, using a bar code scan, a radio frequency identification (RFID) scan, etc., by each process to complete the logical transfer of custody between entities, that is, between the ASRS structure 101, the kitting area 102, and the manufacturing cells 106 of the manufacturing centre 105.

Furthermore, the manufacturing system 100 disclosed herein rectifies the problem of a relatively large footprint provided by conventional automated solutions by integrating vertical storage above the lower 2D grid used for inter-service area conveyance, which maximizes storage density and substantially reduces wasted vertical space. As a result, end-to-end manufacturing solutions are a fraction of the size of conventional solutions and require substantially less real estate to achieve the same deliverables. This allows manufacturers to consolidate storage within their existing facilities to expand their business.

The above disclosed embodiments of the manufacturing system 100 and method form a large shift in the way manufacturing is achieved and provide "virtual conveyor" and sortation capabilities of an automation system. The 2D gridded track structure of the technology allows the RSRVs 306 to convey goods between any manufacturing cells attached to the 2D gridded track structure. The movements of the RSRVs 306 on the 2D gridded track structure are orchestrated by the CCS 131, which allows storage units to be presented just-in-time, grouped by work order, and even delivered in specific sequences to the manufacturing cells. Without this capability, solving complex processes with a single integrated automated solution would not be possible, since conventional ASRS equipment relies on downstream sortation solutions to deliver goods to service areas at the right time and sequence. Subsequently, the CCS 131 configures the manufacturing cells and conducts manufacturing operations with software commands. The manufacturing system 100 disclosed herein increases scalability of the total capacity, where the size of the manufacturing system 100 can be expanded modularly. The manufacturing system 100 disclosed herein provides flexibility in support of standardized manufacturing equipment and componentry delivered in a repeatable manner.

The embodiments disclosed herein are not limited to a particular computer system platform, processor, operating system, or communication network. One or more of the embodiments disclosed herein are distributed among one or more computer systems, for example, servers configured to provide one or more services to one or more client computers, or to perform a complete task in a distributed system. For example, one or more of embodiments disclosed herein are performed on a client-server system that comprises components distributed among one or more server systems that perform multiple functions according to various embodiments. These components comprise, for example, executable, intermediate, or interpreted code, which communicate over a network using a communication protocol. The embodiments disclosed herein are not limited to be executable on any particular system or group of systems, and are not limited to any particular distributed architecture, network, or communication protocol.

The foregoing examples and illustrative implementations of various embodiments have been provided merely for explanation and are in no way to be construed as limiting of the embodiments disclosed herein. While the embodiments have been described with reference to various illustrative implementations, drawings, and techniques, it is understood that the words, which have been used herein, are words of description and illustration, rather than words of limitation. Furthermore, although the embodiments have been described herein with reference to particular means, materials, techniques, and implementations, the embodiments herein are not intended to be limited to the particulars disclosed herein; rather, the embodiments extend to all functionally equivalent structures, methods and uses, such as are within the scope of the appended claims. It will be understood by those skilled in the art, having the benefit of the teachings of this specification, that the embodiments disclosed herein are capable of modifications and other embodiments may be effected and changes may be made thereto, without departing from the scope and spirit of the embodiments disclosed herein.

What is claimed is:

1. A manufacturing system comprising:
   a storage arrangement comprising:
      an automated storage and retrieval system (ASRS) structure comprising a three-dimensional array of storage locations distributed throughout a two-dimensional footprint of the ASRS structure at a plurality of storage levels within the ASRS structure;
      a supply of workpieces, toolpieces, and workpiece supports stored within the storage locations of the ASRS structure for use in manufacturing goods; and a fleet of robotic storage/retrieval vehicles, wherein each of the robotic storage/retrieval vehicles is navigable within the ASRS structure in three dimensions to access the storage locations in the three-dimensional array, each of the robotic storage/retrieval vehicles configured to carry storage units of compatible size and shape for storage in the storage locations of the ASRS structure, the storage units configured to hold at least the workpieces and the tool pieces;

a plurality of manufacturing cells configured in a continuous arrangement outside the ASRS structure, wherein the storage units are transferred to and from the storage locations of the ASRS structure and between the manufacturing cells, free of identification or scanning of the storage units, based on the continuous arrangement of the manufacturing cells; and a computerized control system in operable communication with each of the storage/retrieval vehicles, the computerized control system configured to orchestrate movement of the storage/retrieval vehicles on a two-dimensional gridded track structure interconnecting each of the manufacturing cells and the ASRS structure, the computerized control system further configured to deliver the storage units just-in-time, grouped based on a work order, and in a specific sequence to the manufacturing cells for just-in-time manufacturing of subassemblies at any stage a manufacturing process;

the manufacturing system configured to facilitate transportation of the workpieces, toolpieces, and workpiece supports between the manufacturing cells in any order and any sequence, instead of linearly with conveyors, thereby allowing any number of manufacturing processes to be completed multiple times in any order.

2. The manufacturing system of claim 1, wherein each of the manufacturing cells is configured to receive the workpieces a plurality of times for performance of one or more of a plurality of process steps of the manufacturing process.

3. The manufacturing system of claim 1, wherein the workpieces are received at a first one of the manufacturing cells for performance of a plurality of process steps of the manufacturing process and subsequently stored in the storage locations of the ASRS structure and retrieved from the storage locations of the ASRS structure for the transfer of the workpieces to a second one of the manufacturing cells.

4. The manufacturing system of claim 1, further comprising a track structure attached to the ASRS structure and extending beyond the two-dimensional footprint of the ASRS structure to define an extension thereof, wherein the track structure is configured to define travel paths on which the robotic storage/retrieval vehicles are navigable and along which the manufacturing cells are distributed.

5. The manufacturing system of claim 1, wherein the toolpieces are stored within and retrieved from the ASRS structure in the storage units, and delivered to the manufacturing cells by the fleet of robotic storage/retrieval vehicles.

6. The manufacturing system of claim 1, wherein the storage units are configured to be carried by the robotic storage/retrieval vehicles for transfer of the storage units to and from the storage locations and to and from the manufacturing cells, and wherein the storage units comprise:
workpiece storage units, each configured to hold the workpieces; and
toolpiece storage units, each configured to hold the toolpieces.

7. The manufacturing system of claim 6, wherein the workpiece storage units comprise inventory storage units and kit storage units, wherein each of the inventory storage units is configured to contain a collection of inventory workpieces, and wherein each of the kit storage units is configured to contain a kit of mixed workpieces picked from the inventory storage units according to a manufacturing process to be performed on the mixed workpieces delivered to one of the manufacturing cells.

8. The manufacturing system of claim 7, further comprising at least one kitting workstation configured to accept delivery of the inventory storage units from the ASRS structure by the robotic storage/retrieval vehicles for allowing picking of the inventory workpieces from the inventory storage units at the at least one kitting workstation.

9. The manufacturing system of claim 8, wherein the at least one kitting workstation is configured to receive a drop-off of the workpiece storage units and a travel of the workpiece storage units therethrough by the fleet of robotic storage/retrieval vehicles.

10. The manufacturing system of claim 6, wherein each of the manufacturing cells comprises at least one workpiece holding area configured to hold the workpieces awaiting processing at corresponding manufacturing cells, wherein the at least one workpiece holding area is configured to accept placement of one of the workpiece storage units thereon.

11. The manufacturing system of claim 1, wherein each of the workpiece supports is configured to hold the workpieces in predetermined positions during manufacture of goods, and wherein the workpiece supports are stored in the ASRS structure, and wherein the workpiece supports are retrievable from the ASRS structure and deliverable to the manufacturing cells by the fleet of robotic storage/retrieval vehicles.

12. The manufacturing system of claim 11, wherein each of the workpiece supports is of a common footprint of a standardized shape and size as each of the storage units configured to fit within the storage locations of the ASRS structure, and wherein each of the workpiece supports comprises a base of a standardized shape and size configured to fit within the storage locations of the ASRS structure.

13. The manufacturing system of claim 12, wherein the each of the workpiece supports and the each of the storage units are configured to have a matching layout of interface features by which the robotic storage/retrieval vehicles interact with the workpiece supports and the storage units to allow loading and unloading of the workpiece supports and the storage units to and from the robotic storage/retrieval vehicles.

14. The manufacturing system of claim 1, wherein each of the manufacturing cells comprises at least one workpiece holding area configured to hold the workpieces awaiting processing therein.

15. The manufacturing system of claim 14, wherein each of the manufacturing cells comprises two workpiece holding areas, and wherein each of the two workpiece holding areas is configured to hold a respective set of workpieces required therein.

16. The manufacturing system of claim 14, wherein the manufacturing cells are positioned at a two-dimensional gridded track structure, and wherein the two-dimensional gridded track structure comprises sets of intersecting rails on which the robotic storage/retrieval vehicles are navigable in two dimensions, and wherein a width of the at least one workpiece holding area in each of the two dimensions is generally equal to a whole number multiple of a distance measured between two adjacent parallel rails of the two-dimensional gridded track structure.

17. The manufacturing system of claim 14, wherein the width of the at least one workpiece holding area in each of the two dimensions does not exceed a distance measured between the two adjacent parallel rails of the two-dimensional gridded track structure.

18. The manufacturing system of claim 14, wherein each of the manufacturing cells comprises at least one robotic picker operable to pick the workpieces from the at least one workpiece holding area, and wherein each of the manufacturing cells further comprises a working area to which picked workpieces are transferred from the at least one workpiece holding area by the at least one robotic picker.

19. The manufacturing system of claim 1, wherein at least a subset of the manufacturing cells is positioned at the two-dimensional gridded track structure, and wherein each of the manufacturing cells in the subset comprises at least one tool holding area configured to hold the toolpieces required therein, and wherein a width of the at least one tool holding area in each of the two dimensions is equal to a distance measured between the two adjacent parallel rails of the two-dimensional gridded track structure.

20. The manufacturing system of claim 19, wherein the width of the at least one tool holding area in each of the two dimensions does not exceed a distance measured between the two adjacent parallel rails of the two-dimensional gridded track structure.

21. The manufacturing system of claim 19, wherein the width of the mounting base in each of the two dimensions is generally equal to a whole number multiple of a distance measured between the two adjacent parallel rails of the two-dimensional gridded track structure.

22. The manufacturing system of claim 19, wherein the width of the mounting base in each of the two dimensions does not exceed a distance measured between the two adjacent parallel rails of the two-dimensional gridded track structure.

23. The manufacturing system of claim 16, wherein the two-dimensional gridded track structure comprises square spots, and wherein each of the square spots is delimited by a first pair of parallel rails of the two-dimensional gridded track structure lying in a first direction and a second pair of parallel rails of the two-dimensional gridded track structure lying in a second direction perpendicular to the first direction, and wherein each of the manufacturing cells occupies a cell space of an area equal to a predetermined number of the square spots.

24. The manufacturing system of claim 23, wherein the cell space is a square space whose area is divisible into nine square subspaces, and wherein each of the nine square subspaces is equal in area to one of the square spots of the two-dimensional gridded track structure, and wherein four corner subspaces of the nine square subspaces are configured as holding areas for holding supplies needed by the manufacturing cells, and wherein a first pair of mid-perimeter subspaces positioned between the four corner subspaces at a first pair of opposing perimeter sides of the cell space is occupied by robotic workers, and wherein a central subspace positioned between the robotic workers is configured as a working area to which the workpieces are transferred and processed by the robotic workers.

25. The manufacturing system of claim 24, wherein the working area is neighbored by a second pair of mid-perimeter subspaces positioned between the four corner subspaces at a second pair of opposing perimeter sides of the cell space, and wherein at least one of the second pair of mid-perimeter subspaces is an unoccupied open area by which the robotic storage/retrieval vehicles are configured to enter and exit the working area.

26. The manufacturing system of claim 25, wherein both of the mid-perimeter subspaces in the second pair are unoccupied open areas, whereby the robotic storage/retrieval vehicles travel fully through corresponding manufacturing cells.

27. The manufacturing system of claim 1, wherein the plurality of manufacturing cells is configured in a multi-level structure comprising a plurality of levels of the manufacturing cells.

28. The manufacturing system of claim 27, wherein each of the plurality of levels includes the two-dimensional gridded track structure, wherein the two-dimensional gridded track structure comprises the sets of intersecting rails on which the robotic storage/retrieval vehicles are navigable in the two dimensions; and the multi-level structure comprises upright frame members interconnecting the intersecting rails of the plurality of levels.

29. The manufacturing system of claim 28, wherein the upright frame members are configured for traversal of the robotic storage/retrieval vehicles thereon in an ascending direction and/or a descending direction to transition between the plurality of levels.

30. The manufacturing system of claim 29, wherein the two-dimensional gridded track structure at one of the plurality of levels of the multi-level structure is attached to a corresponding one of the storage levels in the ASRS structure at which the robotic storage/retrieval vehicles transition between the ASRS structure and the multi-level structure.

31. The manufacturing system of claim 1, wherein the manufacturing cells include fully automated manufacturing cells and human-attended manufacturing cells configured with respect to the two-dimensional gridded track structure comprising the sets of intersecting rails on which the robotic storage/retrieval vehicles are navigable in the two dimensions, wherein the fully automated manufacturing cells are positioned at distributed locations throughout a main internal area of the two-dimensional gridded track structure, and the human-attended manufacturing cells are positioned at an outer perimeter area of the two-dimensional gridded track structure.

32. The manufacturing system of claim 1, wherein the computerized control system comprises a network interface coupled to a communication network, at least one processor coupled to the network interface, and a non-transitory, computer-readable storage medium communicatively coupled to the at least one processor, wherein the non-transitory, computer-readable storage medium is configured to store computer program instructions, which when executed by the at least one processor, cause the at least one processor to activate the robotic storage/retrieval vehicles to:
  (a) navigate within the ASRS structure and/or through the manufacturing cells;
  (b) retrieve the workpieces contained in the storage units stored at the storage locations of the ASRS structure;
  (c) deliver the workpieces contained in the storage units to the at least one kitting workstation for kitting into the kit storage units;
  (d) pick up the kit storage units from the at least one kitting workstation;
  (e) return and store the kit storage units to the storage locations of the ASRS structure;
  (f) retrieve at least one of the kit storage units and the workpieces contained in the storage units, the toolpieces contained in the storage units, and the workpiece supports from the ASRS structure;

(g) deliver the kit storage units and the workpieces contained in the storage units, the toolpieces contained in the storage units, and the workpiece supports to the manufacturing cells for manufacture of goods; and (h) induct the goods into the ASRS structure on a final workpiece support.

33. A manufacturing system comprising:
a storage arrangement comprising:
an automated storage and retrieval system (ASRS) structure comprising a three-dimensional array of storage locations distributed throughout a two-dimensional footprint of the ASRS structure at a plurality of storage levels within the ASRS structure, wherein the ASRS structure further comprises at least one track-equipped level comprising a two-dimensional gridded track layout;
a supply of workpieces, toolpieces, and workpiece supports stored within the storage locations of the ASRS structure for use in manufacturing goods; and
a fleet of robotic storage/retrieval vehicles navigable within the ASRS structure in at least two dimensions on the two-dimensional gridded track layout, each of said robotic storage/retrieval vehicles configured to carry storage units of compatible size and shape for storage in the storage locations of the ASRS structure, the storage units configured to hold at least the workpieces and tool pieces;
a plurality of manufacturing cells positioned outside the ASRS structure, wherein each of the manufacturing cells comprises a plurality of modular components, the manufacturing cells configured in a continuous arrangement outside the ASRS structure, wherein the storage units are transferred to and from the storage locations of the ASRS structure and between the manufacturing cells, free of identification or scanning of the storage units, based on the continuous arrangement of the manufacturing cells;
a track structure connected to the ASRS structure and laying out travel paths traversable by the robotic storage/retrieval vehicles from the ASRS structure, wherein at least a subset of the manufacturing cells is positioned along the track structure; and
a computerized control system in operable communication with each of the storage/retrieval vehicles, the computerized control system configured to orchestrate movement of the storage/retrieval vehicles on a two-dimensional gridded track structure interconnecting each of the manufacturing cells and the ASRS structure, the computerized control system further configured to deliver the storage units just-in-time, grouped based on a work order, and in a specific sequence to the manufacturing cells for just-in-time manufacturing of subassemblies at any stage a manufacturing process:
the manufacturing system configured to facilitate transportation of the workpieces, toolpieces, and workpiece supports between the manufacturing cells in any order and any sequence, instead of linearly with conveyors, thereby allowing any number of manufacturing processes to be completed multiple times in any order.

34. The manufacturing system of claim 33, wherein the track structure is a gridded track structure comprising sets of intersecting rails on which the robotic storage/retrieval vehicles are navigable in the at least two dimensions.

35. The manufacturing system of claim 34, wherein each of the modular components comprises a footprint whose width, in at least one of the two dimensions, is equal to a whole number multiple of a distance measured between two adjacent parallel rails of the gridded track structure.

36. The manufacturing system of claim 34, wherein the width of the footprint, in each of the two dimensions, does not exceed a distance measured between the two adjacent parallel rails of the gridded track structure.

37. The manufacturing system of claim 33, wherein the toolpieces are stored within the ASRS structure in the storage units, and wherein the toolpieces are retrievable from the ASRS structure and deliverable to the manufacturing cells by the fleet of robotic storage/retrieval vehicles.

38. The manufacturing system of claim 33, wherein each of the modular components comprises holding station modules configured to hold supplies required by each of the manufacturing cells.

39. The manufacturing system of claim 38, wherein the storage units are configured to be carried by the robotic storage/retrieval vehicles for the transfer of the storage units to and from the storage locations and to and from the manufacturing cells, and wherein the holding station modules are configured to receive the storage units.

40. The manufacturing system of claim 33, wherein the storage units comprise:
workpiece storage units, each of the workpiece storage units configured to hold the workpieces; and
toolpiece storage units, each of the toolpiece storage units configured to store the toolpieces.

41. The manufacturing system of claim 33, wherein the track structure is an extension of the two-dimensional gridded track layout of the track-equipped level of the ASRS structure.

42. A method for executing a workflow in a manufacturing system, the method comprising:
(i) in an automated storage and retrieval system (ASRS) structure of the manufacturing system, storing workpieces, toolpieces, and workpiece supports in respective storage locations of the ASRS structure, wherein the workpieces are stored in workpiece storage units at the storage locations, and the toolpieces are stored in toolpiece storage units at the storage locations;
(j) using a fleet of robotic storage/retrieval vehicles navigable within the ASRS structure, extracting the workpiece storage units and selected workpiece supports from the ASRS structure according to requirements of manufacturing processes to be performed at manufacturing cell, positioned outside the ASRS structure and in a neighboring relation to the ASRS structure, and separately delivering the workpiece storage units and the selected workpiece supports to the manufacturing cells, free of identification or scanning of the storage units, based on the continuous arrangement of the manufacturing cells;
(k) at each of the manufacturing celli, positioning the selected workpiece supports in working positions accessible by workers of the manufacturing cells; and
(l) at each of the manufacturing cells, with the selected workpiece supports maintained in the working position:
(i) transferring the workpieces from the workpiece storage units onto the selected workpiece supports, and
(ii) performing process steps of the manufacturing processes on the workpieces held on the selected workpiece supports;
(m) orchestrating, by a computerized control system, movement of the storage/retrieval vehicles on a two-dimensional gridded track structure interconnecting each of the manufacturing cells and the ASRS structure and deliver the storage units just-in-time, group based on a work order, and in a specific sequence to the manufacturing cells for just-in-time manufacturing of subassemblies at any stage a manufacturing process; and (n) facilitating transportation of the workpieces, tool pieces, and workpiece supports between the manufacturing cells in any order and any sequence, instead of linearly with conveyors, thereby allowing any number of manufacturing processes to be completed multiple times in any order.

43. The method of claim 42, wherein the step of using the fleet of robotic storage/retrieval vehicles navigable within the ASRS structure, includes a step of using the robotic storage/retrieval vehicles to perform extraction and delivery of both the workpiece storage units and the selected workpiece supports from the ASRS structure to the manufacturing cells.

44. The method of claim 42, wherein:
the step of storing the workpieces, the toolpieces and the workpiece supports in the respective storage locations of the ASRS structure further includes, storing toolpiece storage units in the ASRS structure, wherein the toolpiece storage units are configured to hold the toolpieces for use in the manufacturing process; and
performing the process steps of the manufacturing processes on the workpieces held on the selected workpiece supports, using one of the robotic storage/retrieval vehicles to extract a subset of the toolpiece storage units from the ASRS structure and deliver the subset of the toolpiece storage units to the manufacturing cells.

45. The method of claim 44, wherein the step of performing the process steps of the manufacturing processes on the workpieces held on the selected workpiece supports further includes, prior to performing the process steps of the manufacturing processes, attaching a select one of the toolpieces from the subset of the toolpiece storage units to robotic workers of the manufacturing cells according to the requirements of the manufacturing processes to be performed on the workpieces by the robotic workers.

46. The method of claim 42, wherein the step of extracting the workpiece storage unit further includes delivering at least two workpiece storage units to two respective holding areas of a manufacturing cell, and transferring two workpieces respectively from the two workpiece storage units parked at two respective holding areas onto a selected workpiece support.

47. The method of claim 42, further comprising:
removing from the manufacturing cells, unneeded or empty workpiece storage units from which selected workpieces are already removed and from which no further workpieces are required for the manufacturing processes at the manufacturing cells; and
using one of the robotic storage/retrieval vehicles to deliver to the manufacturing cells additional workpiece storage units containing additional workpieces.

48. The method of claim 47, wherein the additional workpieces are for use in a different manufacturing process to be performed at the manufacturing cell, and wherein the method further comprises:
removing from the manufacturing cell the selected workpiece support and the workpieces mounted thereon;
using one of the robotic storage/retrieval vehicles to deliver another workpiece support to the manufacturing cell for use in the different manufacturing process;
supporting the another workpiece support in a working position;
transferring the additional workpieces from an additional workpiece storage unit delivered to the manufacturing cell, onto the another workpiece support; and
performing process steps of the different manufacturing process on the additional workpieces.

49. The method of claim 48, further comprising removing the unneeded or empty workpiece storage units using a robotic storage/retrieval vehicle different from the robotic storage/retrieval vehicle that delivered the additional workpiece storage unit to the manufacturing cell.

50. The method of claim 42, further comprising, after completion of a finished good by processing of the workpieces at the manufacturing cells, inducting the finished good into the ASRS structure on one of the robotic storage/retrieval vehicles.

51. The method of claim 50, further comprising inducting the finished good into the ASRS structure on a final workpiece support on which final process steps were carried out to complete the finished good.

52. The method of claim 42, further comprising, filling each of the workpiece storage units with a kit of different workpieces according to the requirements of the manufacturing processes.

53. The method of claim 52, wherein the filling of each of the workpiece storage units is performed at a kitting workstation connected to the ASRS structure, and wherein at the kitting workstation:
the fleet of robotic storage/retrieval vehicles is configured to deliver inventory storage units retrieved from respective storage locations in the ASRS structure, wherein the inventory storage units are configured to contain inventory workpieces;
the different workpieces of the kit are picked from the inventory workpieces stored in the inventory storage units, and compiled into the workpiece storage units; and
each of the workpiece storage units is carried away from the kitting workstation by the robotic storage/retrieval vehicles and deposited into a respective one of the storage locations in the ASRS structure for subsequent retrieval from the ASRS structure.

* * * * *